(12) United States Patent
Sperling

(10) Patent No.: US 12,496,134 B2
(45) Date of Patent: Dec. 16, 2025

(54) METHOD FOR OPTIMIZATION OF ORTHOPEDIC COMPONENT DESIGN

(71) Applicant: Mayo Foundation for Medical Education and Research, Rochester, MN (US)

(72) Inventor: John W. Sperling, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 488 days.

(21) Appl. No.: 17/765,159

(22) PCT Filed: Sep. 30, 2020

(86) PCT No.: PCT/US2020/053464
§ 371 (c)(1),
(2) Date: Mar. 30, 2022

(87) PCT Pub. No.: WO2021/067390
PCT Pub. Date: Apr. 8, 2021

(65) Prior Publication Data
US 2022/0370141 A1 Nov. 24, 2022

Related U.S. Application Data

(60) Provisional application No. 62/908,055, filed on Sep. 30, 2019.

(51) Int. Cl.
*A61B 17/80* (2006.01)
*A61B 17/72* (2006.01)
(Continued)

(52) U.S. Cl.
CPC .............. *A61B 34/10* (2016.02); *A61B 17/72* (2013.01); *A61B 17/8057* (2013.01);
(Continued)

(58) Field of Classification Search
CPC ............ A61B 17/7291; A61B 17/8061; A61B 17/0642
See application file for complete search history.

(56) References Cited

U.S. PATENT DOCUMENTS 5,304,180 A * 4/1994 Slocum .............. A61B 17/8061
606/282
6,096,040 A * 8/2000 Esser ................. A61B 17/8061
606/280

(Continued)

FOREIGN PATENT DOCUMENTS

EP 2451372 B1 9/2016
WO 9747251 A1 12/1997
(Continued)

OTHER PUBLICATIONS

PCT International Search Report and Written Opinion, PCT/US2020/053464, Jan. 29, 2021, 19 pages.
(Continued)

*Primary Examiner* — Anu Ramana
(74) *Attorney, Agent, or Firm* — Quarles & Brady LLP

(57) ABSTRACT

Methods for understanding external and internal anatomy of bones through the use of imaging data and 3D modeling to facilitate the design of anatomically correct plates, devices and implants are disclosed. In one aspect the method results in an implant or plate that includes at least one curved surface wherein a contour of the at least one curved surface corresponds to an anatomic shape of a subject. The anatomic shape of the subject being determined based on an image of the bone.

32 Claims, 45 Drawing Sheets

(51) Int. Cl.
*A61B 34/10* (2016.01)
*B33Y 10/00* (2015.01)
*B33Y 50/02* (2015.01)
*B33Y 80/00* (2015.01)
*A61B 17/00* (2006.01)

(52) U.S. Cl.
CPC ............. *B33Y 10/00* (2014.12); *B33Y 50/02* (2014.12); *B33Y 80/00* (2014.12); *A61B 2017/00526* (2013.01); *A61B 2034/104* (2016.02); *A61B 2034/105* (2016.02); *A61B 2034/108* (2016.02)

(56) References Cited

U.S. PATENT DOCUMENTS

| | | | |
|---|---|---|---|
| 7,452,381 B2 | 11/2008 | Steinmann | |
| 7,537,604 B2 * | 5/2009 | Huebner | A61B 17/8061 606/281 |
| 7,740,634 B2 * | 6/2010 | Orbay | A61B 17/8052 606/279 |
| 7,850,737 B2 | 12/2010 | Morrey | |
| 7,905,910 B2 * | 3/2011 | Gerlach | A61B 17/8014 606/915 |
| 8,105,367 B2 * | 1/2012 | Austin | A61B 17/8014 606/280 |
| 8,177,819 B2 * | 5/2012 | Huebner | A61B 17/8061 606/281 |
| 8,182,517 B2 | 5/2012 | Sixto, Jr. et al. | |
| 8,192,472 B2 | 6/2012 | Sixto, Jr. et al. | |
| 8,197,521 B2 | 6/2012 | Sixto, Jr. et al. | |
| 8,382,807 B2 * | 2/2013 | Austin | A61B 17/8605 606/293 |
| 8,439,955 B2 | 5/2013 | Sixto, Jr. et al. | |
| 8,617,223 B2 * | 12/2013 | Matityahu | A61B 17/8047 606/290 |
| 8,808,333 B2 | 8/2014 | Kuster et al. | |
| 8,864,802 B2 * | 10/2014 | Schwager | A61B 17/8057 606/286 |
| 8,992,581 B2 * | 3/2015 | Austin | A61B 17/8014 606/291 |
| 9,138,269 B2 | 9/2015 | Cavallazzi et al. | |
| 9,259,217 B2 * | 2/2016 | Fritzinger | A61B 17/0401 |
| 9,345,523 B2 | 5/2016 | Segina et al. | |
| 9,408,614 B2 | 8/2016 | Duncan | |
| 9,522,066 B2 | 12/2016 | Segina et al. | |
| 9,668,794 B2 | 6/2017 | Kuster et al. | |
| 10,335,210 B2 * | 7/2019 | Ricker | A61B 17/8014 |
| 10,478,236 B2 * | 11/2019 | Tacktill | A61L 31/124 |
| 10,687,874 B2 * | 6/2020 | Langdale | A61B 17/7241 |
| 10,856,920 B2 * | 12/2020 | Tiongson | A61B 17/8061 |
| 11,071,570 B2 * | 7/2021 | Laird, Jr. | A61B 17/8061 |
| 11,076,898 B2 * | 8/2021 | Langdale | A61B 17/8061 |
| 11,096,730 B2 * | 8/2021 | Tiongson | A61B 17/8057 |
| 11,123,118 B2 | 9/2021 | Kuster et al. | |
| 11,197,682 B2 * | 12/2021 | Langdale | A61B 17/7283 |
| 11,931,083 B2 * | 3/2024 | Langdale | A61B 17/8052 |
| 12,042,194 B2 * | 7/2024 | Tiongson | A61B 17/8014 |
| 2002/0156474 A1 * | 10/2002 | Wack | A61B 17/8047 606/291 |
| 2005/0015089 A1 * | 1/2005 | Young | A61B 17/8052 606/915 |
| 2005/0049594 A1 * | 3/2005 | Wack | A61B 17/1728 606/281 |
| 2005/0234458 A1 * | 10/2005 | Huebner | A61B 17/8061 606/71 |
| 2007/0123873 A1 | 5/2007 | Czartoski et al. | |
| 2007/0225819 A1 | 9/2007 | Eva | |
| 2008/0051786 A1 * | 2/2008 | Jensen | A61B 17/8057 606/86 A |
| 2008/0195240 A1 * | 8/2008 | Martin | A61B 17/8061 700/98 |
| 2009/0118768 A1 | 5/2009 | Sixto, Jr. et al. | |
| 2010/0030277 A1 | 2/2010 | Haidukewych et al. | |
| 2010/0030327 A1 | 2/2010 | Haidukewych et al. | |
| 2010/0114326 A1 | 5/2010 | Winslow et al. | |
| 2010/0262194 A1 | 10/2010 | Wagner et al. | |
| 2010/0318086 A1 | 12/2010 | Winemaker | |
| 2011/0029089 A1 | 2/2011 | Giuliani et al. | |
| 2011/0137314 A1 | 6/2011 | Kuster et al. | |
| 2011/0313422 A1 * | 12/2011 | Schwager | A61B 17/8057 606/71 |
| 2014/0336713 A1 | 11/2014 | Kuster et al. | |
| 2015/0190143 A1 | 7/2015 | Tarabichi et al. | |
| 2015/0190237 A1 | 7/2015 | Bonin, Jr. et al. | |
| 2016/0000481 A1 * | 1/2016 | Ehmke | A61B 17/8863 29/434 |
| 2016/0000482 A1 * | 1/2016 | Ehmke | A61B 17/8863 606/71 |
| 2017/0007304 A1 | 1/2017 | Kuroda et al. | |
| 2017/0056081 A1 | 3/2017 | Langdale et al. | |
| 2017/0215931 A1 * | 8/2017 | Cremer | A61B 17/8052 |
| 2018/0085153 A1 | 3/2018 | Kuster et al. | |
| 2019/0090920 A1 * | 3/2019 | Ehmke | A61B 17/8085 |
| 2020/0163703 A1 | 5/2020 | Sperling | |

FOREIGN PATENT DOCUMENTS

| | | |
|---|---|---|
| WO | 2013110259 A1 | 8/2013 |
| WO | 2019018397 A1 | 1/2019 |

OTHER PUBLICATIONS

European Patent Office, Communication Pursuant to Article 94(3) EPC, Application No. 20803330.8, Apr. 17, 2024, 9 pages.

* cited by examiner

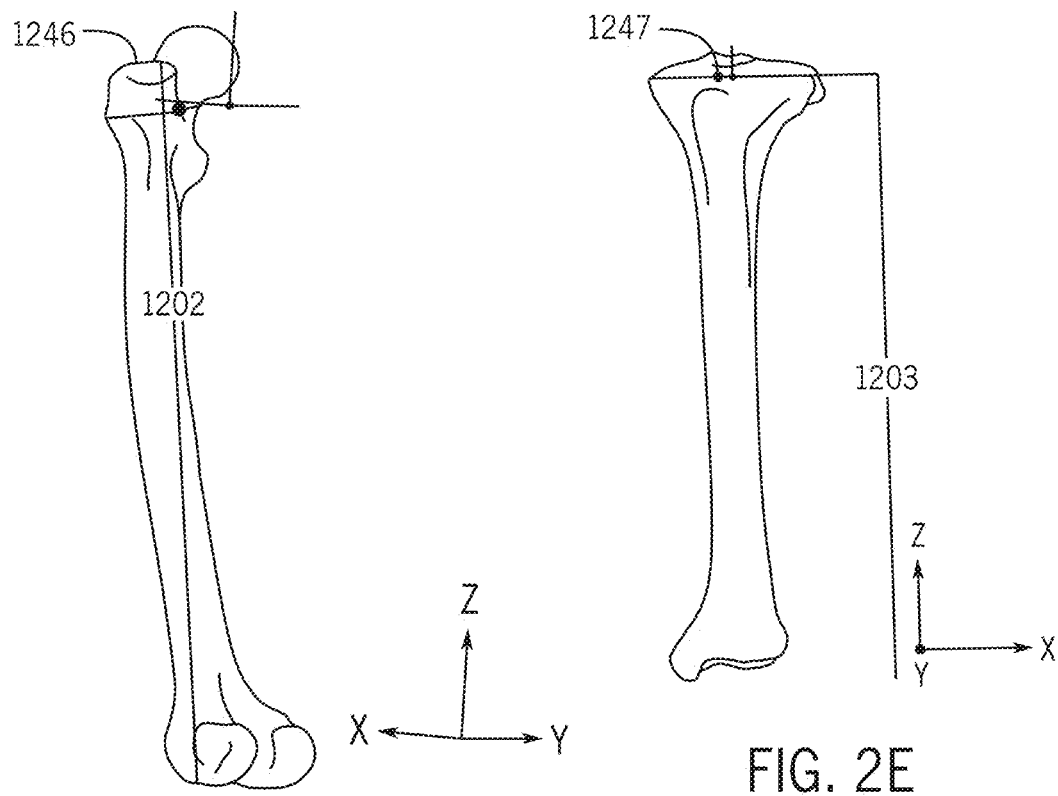
FIG. 2D
FIG. 2E
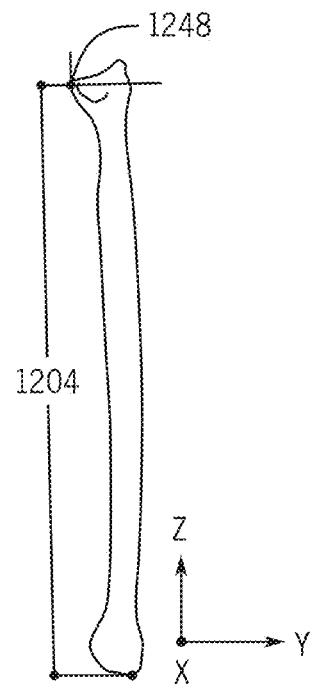
FIG. 2F

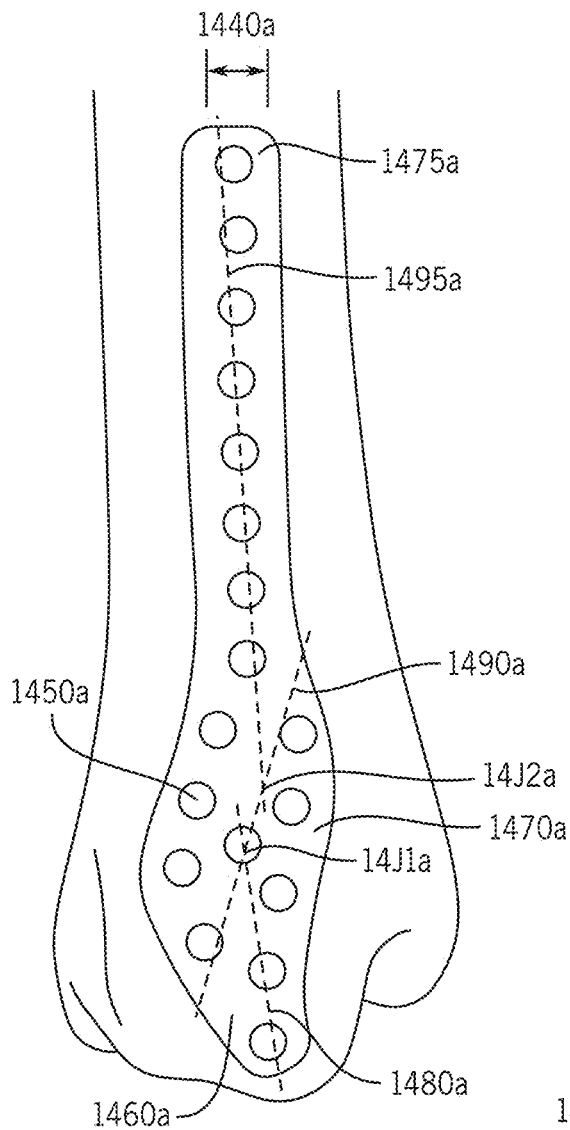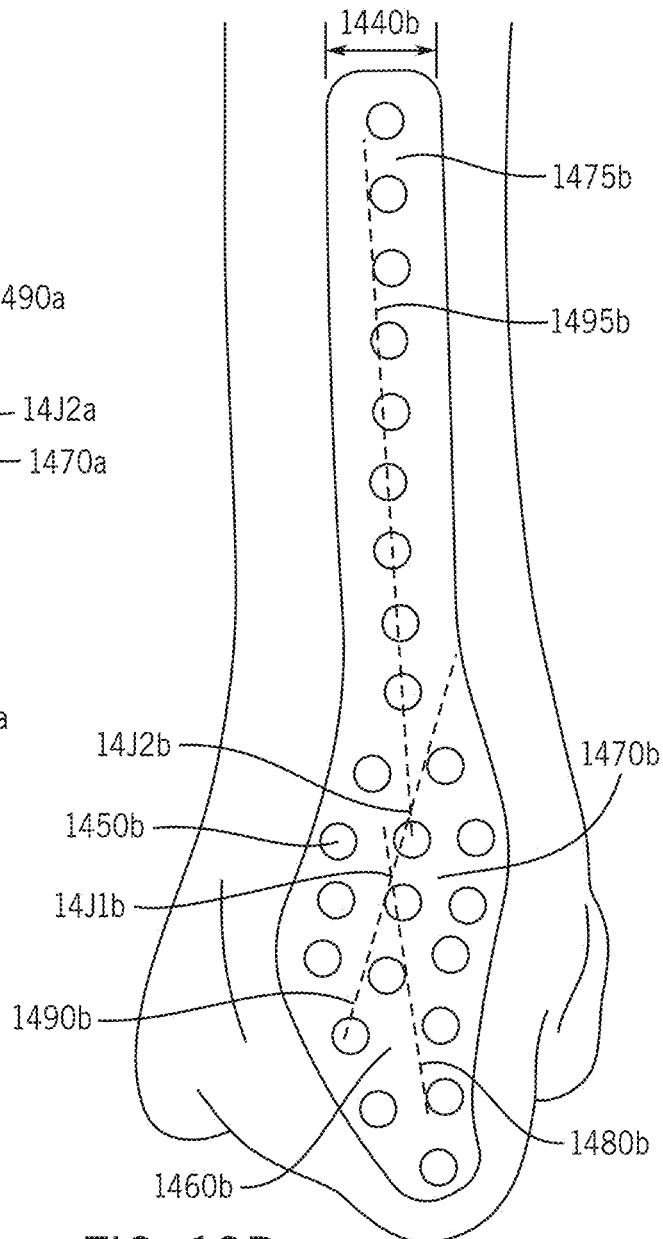
FIG. 13A
FIG. 13B

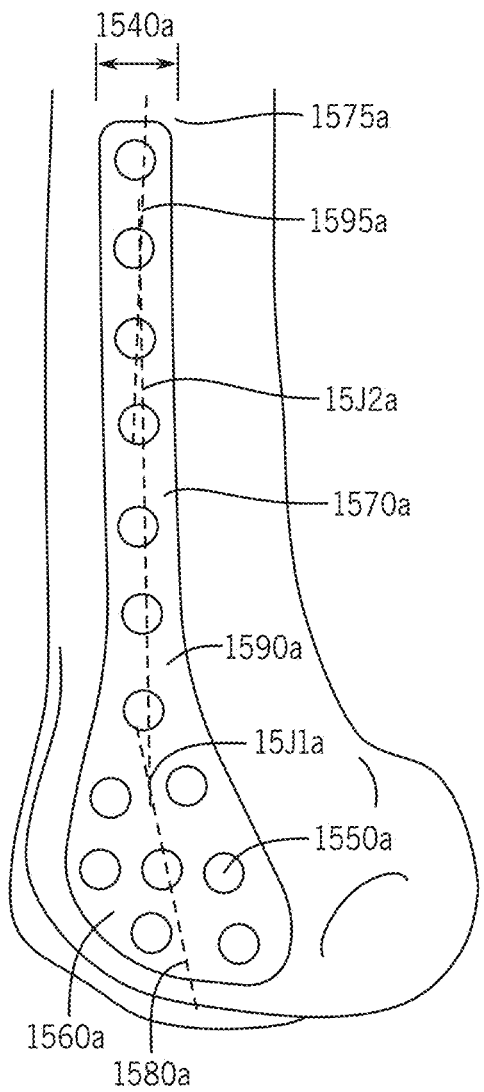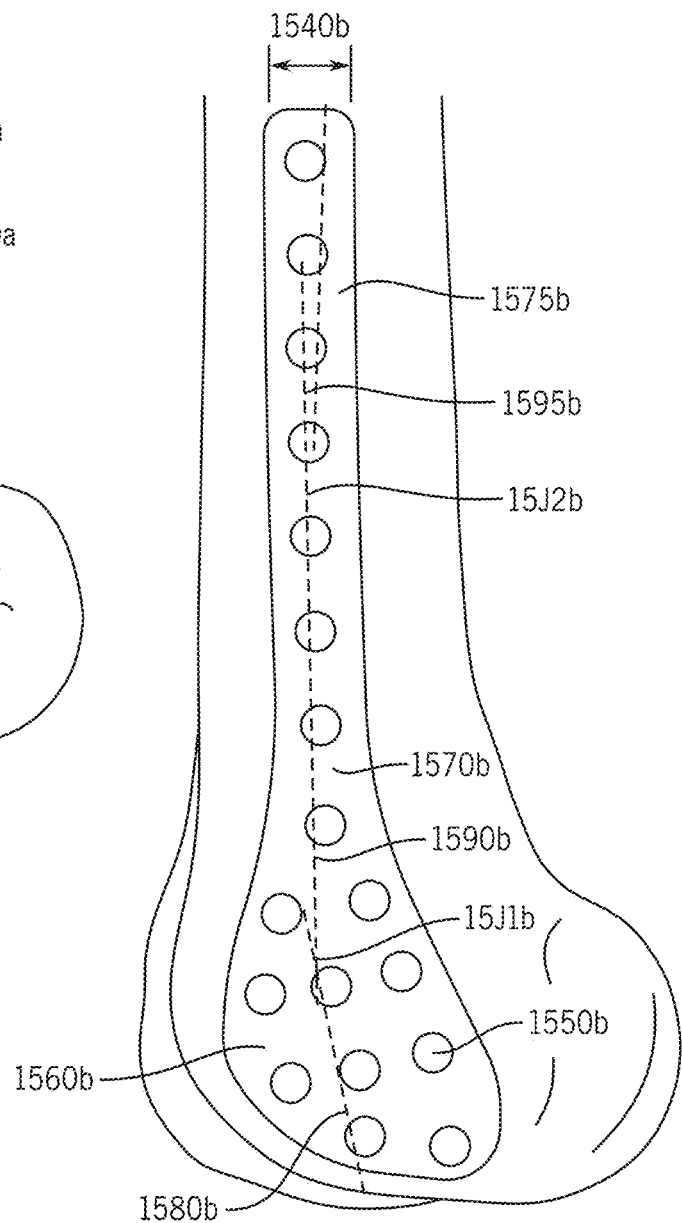
FIG. 14A
FIG. 14B

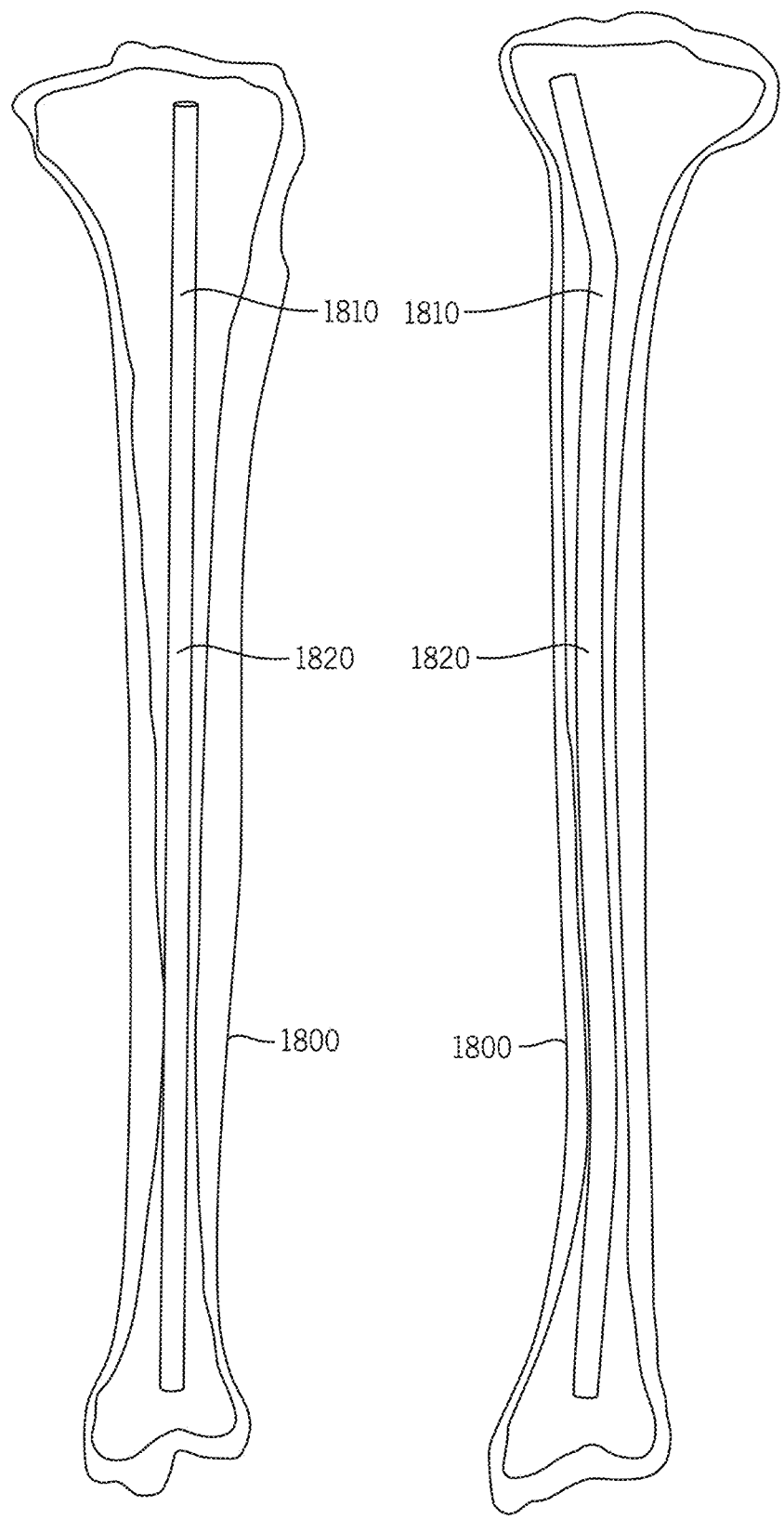

METHOD FOR OPTIMIZATION OF ORTHOPEDIC COMPONENT DESIGN

CROSS-REFERENCES TO RELATED APPLICATIONS

This application claims the benefit of U.S. Provisional Patent Application Ser. No. 62/908,055 filed on Sep. 30, 2019 and entitled "Method for Optimization of Orthopedic Component Design," which is incorporated herein by reference as if set forth in its entirety for all purposes.

STATEMENT REGARDING FEDERALLY SPONSORED RESEARCH

Not Applicable.

BACKGROUND OF THE INVENTION

1. Field of the Invention

The invention relates to a method for modeling anatomy for femur, tibia and fibula bones and the like that facilitates the design of product offerings for joint surgery, manufacturing a plate or a periprosthetic implant for repairing a part of a bone in a subject, and a method for the optimization of periprosthetic bone plates and intramedullary nails through the use of medical imaging data from lower extremity periprosthetic fractures.

2. Description of the Related Art

There has been a dramatic growth in the number of fractures worldwide with an aging population and proliferation of motor vehicles. There has also been increased patient expectation in regard to function and outcome after sustaining a fracture. Together, these factors have dramatically driven more operative intervention for fractures worldwide. However, current designs of plates and intra-medullary nails are not anatomic in shape and the sizes available are not based on an anatomic distribution.

There is a range of complications in fracture treatment associated with trauma fixation devices that are not anatomically correct. This includes further fracturing the bone when trying to place an intramedullary device that is not in an anatomic shape as well as catastrophic early failure when contact with native bone is not optimized. When looking at plates, current plating systems do not provide for an anatomic offering. For example, the large majority of proximal and distal plates currently on the market have only one plate width. This results in a plate that is too wide in a significant percentage of the population resulting in soft tissue irritation due to plate overhang. In addition, this results in a plate that is too small in many patients thereby failing to maximize bony fixation and increasing the risk of failure. The rapid growth of international markets with patients representing a spectrum of patient sizes has exacerbated this problem.

Along with the dramatic increase of joint replacements worldwide, there has been an increased incidence of periprosthetic fractures around these implants. Treatment of these fractures is difficult due to the fact that the medullary canal can be filled with an arthroplasty stem making fixation challenging. In addition to fractures around arthroplasty components, similar challenges can occur when fractures occur around intramedullary nails.

In regard to lower extremity arthroplasty, there has also been a rapid increase in the number of product offerings with different stem lengths. In addition to different stem lengths, there are cemented as well as uncemented options for stem fixation. These factors have resulted in different fracture patterns, which were previously not well understood.

In the past, some companies have designed trauma devices by simply overlaying a design over imaging of cadaveric specimens rather than developing a true scientific basis and anatomic rationale for the shape and size distribution of plates and intramedullary devices. In the past, this design process was based on a "best fit" leaving a significant proportion of the population on either side of a bell shape curve with an implant that is either too big or too small.

Current designs of plates and intra-medullary nails are not anatomic in shape and the sizes available are not based on an anatomic distribution. Secure fixation with current non-anatomic plates can be very challenging due to inappropriate plate shape, plate length, and screw hole positions that are not optimized to capture the remaining bone. Some periprosthetic plates tend to be much larger and not anatomically correct for the extremity in need of repair. Use of these larger extremity plates for the extremity needing repair can necessitate increased soft tissue stripping which can impact healing. Moreover, the use of plates that are not anatomically correct and do not fit correctly can result in impingement on soft tissues and prominence leading to patient discomfort with the need for additional revision surgery.

Therefore, there exists a need for a methodology to improve understanding of periprosthetic fractures and the associated anatomy to facilitate the design and selection of anatomically correct periprosthetic bone plates and intramedullary nails.

SUMMARY OF THE INVENTION

The femur, tibia, and fibula are not straight and the use of non-anatomically correct devices can result in catastrophic early device loosening when contact with native bone is not optimized, iatrogenic fractures, and increased risk of future fractures due to stress risers. The present invention addresses the foregoing needs by providing methods to improve understanding of the associated anatomy, such as for the femur, tibia, and fibula. This methodology describes the interaction of anatomical features of bones such as the femur, tibia, and fibula, and how these features change based on the specific locations in the bones. Additionally, the methodology has demonstrated that the shape of the bones are side specific. Therefore, having right and left specific devices with an anatomic shape in a true population based distribution may further facilitate and improve device design. The methodology can optimize loading and fit at the bone-device interface. This methodology can be used to facilitate the design of total and partial arthroplasty, intramedullary nails, revision length stems for arthroplasty, plates for periprosthetic fractures, mid-shaft bone fractures and distal as well as proximal bone fractures. The methodology and associated data set can further help define the appropriate size, shape, distribution of product offerings for these devices.

In addition to understanding the associated anatomy, studying and analysis of periprosthetic fractures may facilitate the design and selection of anatomically correct periprosthetic bone plates.

In one aspect, the disclosure provides a method where improved understanding of anatomy is gained through the use of CT scan data and 3D modeling. Whereas previous reports noted the potential bending of a bone in one plane, the current methodology notes that the anatomy has specific three dimensional architecture for each bone. The methodology, therefore, can facilitate the design of anatomically correct implants that minimize potential complications.

In one configuration, a device is provided for treating a fracture in a bone of a subject. The device includes a first section having a first longitudinal axis and a second section having a second longitudinal axis. The first section is connected to the second section at a base of the second section, thereby defining a first junction between the first section and the second section. The first longitudinal axis and the second longitudinal axis form an oblique angle at the junction and the second section has a terminal end section having a width greater than the first section. The first section and the second section of the device may be configured to provide fixation to a region of the bone and includes a plurality of screw holes.

In some configurations of the device, the bone is at least one of a tibia, femur, or fibula and the second end section is adapted to conform to an outer surface of a proximal end section of the bone. A perimeter of the terminal end of the second section may be dimensioned to conform to a tibial plateau of the proximal end section of the tibia. The oblique angle formed at the junction may be configured to match an angle of a tibial plateau from a centerline of the tibia. A length of the device may also be determined by a length of the bone.

When the bone is the tibia, the first junction may be located at greater than 20 millimeters (mm) and less than 52 mm from the tibial plateau. In some configurations, the junction may be located at 35 mm from the tibial plateau. In some configurations, the first junction may be located at greater than 21 mm and less than 40 mm from a tibial plateau. In some configurations, the junction is located at 30 mm from the tibial plateau.

In some configurations of the device, a width of the first section is configured to provide fixation for a fracture in the bone. A plurality of screw holes may be provided on the device and the number of screw holes may be correlated to the width of the terminal end of the second section. The device may also be configured to be specific for a left side and a right side of the subject.

In some configurations, the device further includes a third section having a third longitudinal axis. The first section is connected to the third section at a second junction line between the first section and the third section. The first longitudinal axis and the third longitudinal axis may form an oblique angle at the second junction.

In some configurations, the bone is a tibia, femur, or fibula and the second end section is adapted to conform to an outer surface of a distal end section of the bone. A perimeter of the terminal end of the second section may be dimensioned to conform to at least one of a condyle, a medial malleolus, or an anterolateral surface of the distal end section of the bone. The oblique angle formed at the first junction may be configured to match an angle of at least one of a condyle, a medial malleolus, or an anterolateral surface from a centerline of the bone. The oblique angle formed at the second junction may be configured to match an angle of at least one of a condyle, a medial malleolus, or an anterolateral surface from a centerline of the bone. A length of the device may be determined by a length of the bone. A length of the third section may be configured to provide fixation for a fracture in the bone.

When the bone is the tibia, the first junction may be located at greater than 17 mm and less than 34 mm from the most distal end of the tibia. In some configurations, the junction may be located at 25 mm from the most distal end of the tibia. In some configurations, the first junction may be located at greater than 17 mm and less than 36 mm from the most distal end of the tibia. In some configurations, the junction is located at 26 mm from the most distal end of the tibia. When the bone is the femur, the first junction may be located at greater than 37 mm and less than 76 mm from a most distal end of the femur. In some configurations, the junction is located at 55 mm from the most distal end of the femur. When the bone is the fibula, the first junction may be located at greater than 12 mm and less than 29 mm from a most distal end of the fibula. In some configurations, the junction is located at 20 mm from the most distal end of the fibula.

In one configuration, a device for treating a fracture in a bone is provided. The device includes a first section having a first longitudinal axis and a second section having a second longitudinal axis. The first section is connected to the second section at a base of the second section defining a first junction between the first section and the second section. The first junction forms a transition portion dimensioned to provide a curvature connecting the first section to the second section.

In some configurations, the location of the first junction is determined by a location of greatest deviation from a straight centerline of the bone. The first section has a length that may be greater than a length of the second section.

In some configurations, the device may include an intramedullary (IM) nail and the bone may be at least one of a tibia, femur, or a fibula. The location of the first junction may be between 30-90 percent of the length of the bone. The location of the first junction may also be at 35 percent of the length of the tibia, 50 percent of the length of the femur, or 50 percent of the length of the fibula.

In some configurations, the device includes a third section having a third longitudinal axis. The second section may be connected to the third section at a second junction between the second section and the third section. The second junction forms a transition portion dimensioned to provide a curvature connecting the second section to the third section. The location of the second junction may be determined by a location of deviation from a straight centerline of the bone. The second section has a length that may be greater than a length of the third section and the first section. The device may be an intramedullary (IM) nail. The location of the second junction may be between 10-30 percent of the length of the bone or may be at 20 percent of the length.

In one configuration, a method is provided for manufacturing an orthopedic implant for repairing a part of a bone in a subject. The method includes forming the implant to include at least one bend wherein the at least one bend corresponds to an anatomic shape. The anatomic shape may be determined by a number of steps, which may include: (i) obtaining an image of the bone from at least one viewing plane; (ii) orienting on the image a first reference line indicating a maximum width of a feature of the bone from a first border of the bone to an opposite second border of the bone; (iii) orienting on the image a second reference line perpendicular to the first reference line and extending from a midpoint of the first reference line to an edge of the bone indicating a length of the feature of the bone; (iv) orienting on the image a third reference line indicating a length from a centerline of the bone to the midpoint of the first reference line; and (v) determining an angle between the third reference line and the second reference line to determine the at least one bend of the implant.

In some configurations, the method includes where the implant is at least one of a periprosthetic bone plate, a proximal plate, a distal plate, an intramedullary nail, or a stem. The centerline used in the method may be: a line with a constant equal distance between the first border and the second border of the bone, which are cortical bone borders; or a line with a constant equal distance between the first border and the second border of the bone, which are cancellous bone borders, or a straight longitudinal bone axis centerline.

In some configurations, the bone used in the method is the tibia. When bone is the tibia, the feature may be a tibial plateau, and the first reference line indicates a width of the tibial plateau on the tibia. At least one bend of the implant may correspond to an angle of the tibial plateau from the centerline of the tibia. When the bone is the tibia, the feature may be a medial malleolus, and the first reference line indicates a width of the medial malleolus. At least one bend of the implant may correspond to an angle of the medial malleolus from the centerline of the tibia.

In some configurations, the bone is the femur, and the feature may be a condyle and the first reference line indicates a width of the condyle. At least one bend of the implant may correspond to an angle of the condyle from the centerline of the femur.

In some configurations, the bone is the fibula and the feature is a lateral malleolus, and the first reference line indicates a width of the lateral malleolus. At least one bend of the implant corresponds to an angle of the lateral malleolus from the centerline of the fibula.

In some configurations, a length of the implant is determined by measuring a length of the at least one of tibia, femur, or fibula. In some configurations, the image is a computed tomography scan slice. In some configurations, the method includes determining a thickness of the bone to determine a screw hole location on the implant. The method may be automated, such that images are sent to a control system having a processor configured to execute a program stored thereon to automatically extract measurements of the bone of the subject. The automated measurements of the bone may be referenced to manufacture a plate using an additive manufacturing system.

In one configuration, a method is provided for manufacturing an orthopedic implant for repairing a part of a bone in a subject. The method may include forming the implant to include at least two bends. The bends may correspond to an anatomic shape determined by: (i) obtaining an image of the bone from at least one viewing plane; (ii) orienting on the image a first reference line indicating a maximum width of a first feature of the bone from a first border of the bone to an opposite second border of the bone; (iii) orienting on the image a second reference line indicating a maximum width of a second feature of the bone from a first border of the bone to an opposite second border of the bone; (iv) orienting on the image a third reference line perpendicular to the first reference line and extending from a midpoint of the first reference line to a midpoint of the second reference line; (v) orienting on the image a fourth reference line perpendicular to the second reference line and extending from a midpoint of the second reference line to an edge of the bone indicating a length of the second feature of the bone; (vi) orienting on the image a fifth reference line indicating a length from a centerline of the bone to the midpoint of the first reference line; (vii) determining an angle between the third reference line and the fourth reference line to determine at least one bend of the implant; and (viii) determining an angle between the third reference line and the fifth reference line to determine at least one bend of the implant.

In some configurations, the implant may be one of a periprosthetic bone plate, a proximal plate, a distal plate, an intramedullary nail, or a stem. In some configurations, the centerline may be one of a line with a constant equal distance between the first border and the second border of the bone wherein the first border and the second border are of cortical bone borders; a line with a constant equal distance between the first border and the second border of the bone wherein the first border and the second border are of cancellous bone borders; or a straight longitudinal bone axis centerline.

In one configuration, a method is provided for manufacturing an orthopedic implant for repairing a part of a bone in a subject. The method includes forming the implant to include at least one bend where the bend corresponds to an anatomic shape determined by: (i) obtaining an image of the bone from at least one viewing plane; (ii) orienting on the image a first reference line indicating a maximum width of a feature of the bone from a first border of the bone to an opposite second border of the bone; (iii) orienting on the image a second reference line perpendicular to the first reference line and extending from a midpoint of the first reference line to a centerline of the bone indicating a length of the feature of the bone; and (iv) determining an angle between the second reference line and the centerline to determine the at least one bend of the implant.

In one aspect, the disclosure provides a method for manufacturing an orthopedic implant for repairing a part of a bone in a subject. The method may include forming the implant to include at least one curved surface, a contour of the at least one curved surface corresponds to an anatomic shape. The anatomic shape can be determined by a number of steps which may include (i) obtaining an image of the bone from at least one viewing plane, where viewing planes may include sagittal, coronal, and axial viewing planes. (ii) orienting on the image a proximal aspect line that extends from a first border of the bone to an opposite second border of the bone, (iii) orienting on the image a longitudinal bone axis extending from the proximal aspect line along a length of the bone between the first border and second border, (iv) orienting on the image a plurality of lateral lines at different distances from the proximal aspect line, each of the plurality of lateral lines extending perpendicularly from one of a plurality of first intersection points on the first border of the bone to one of a plurality of second intersection points intersecting the longitudinal bone axis at one of a plurality of second intersection points, and (v) extrapolating the anatomic shape based on the plurality of first intersection points and the plurality of second intersection points.

In some configurations, the implant may be a periprosthetic bone plate, a proximal plate, a distal plate, an intramedullary nail, or a stem. The longitudinal bone axis line may extend longitudinally from the intersection of the proximal aspect line with a centerline; where the proximal aspect line may extend from the first border of the bone at the most proximal and lateral aspect of the bone to the second border, and the centerline may extend longitudinally along the bone with a constant equal distance between the first border and the second border. The longitudinal bone axis line may extend longitudinally from the intersection of the proximal aspect line with a bone cut line; where the proximal aspect line extends from the first border of the bone at the most proximal and lateral aspect of the bone to the second border, and the bone cut line extends from the first border of the bone to the opposite second border of the bone. The longitudinal bone axis line may extend longitudinally from the intersection of the proximal aspect line with a proximal bone line; where the proximal aspect line extends from the first border of the bone at the most proximal and lateral aspect of the bone to the second border, and the proximal bone line extends from the most superior aspect of the proximal bone to the most distal aspect of the bone.

In some aspects, the plurality of lateral lines can be placed at equidistant intervals distally from the proximal aspect line, or from a bone cut line. The equidistant interval can be in a range of 0.1 to 50 millimeters.

In some aspects, the viewing plane includes one of sagittal, coronal, or axial viewing planes. Forming the implant may include determining at least one contour from the sagittal viewing plane, determining at least one contour from the coronal viewing plane, and determining at least one contour from the axial viewing plane. In some aspects, the bone is the tibia and the contour is of a tibial plateau. At least one curved surface of the implant may correspond to an angle of the tibial plateau from the longitudinal bone axis. In some aspects, the bone is the tibia and the contour is of a medial malleolus. At least one contour of the implant may correspond to an angle of the medial malleolus from the longitudinal bone axis. In some aspects, the bone is the femur and the contour is of a condyle. At least one contour of the implant may correspond to an angle of the condyle from the longitudinal bone axis. In some aspects, the bone is the fibula, and the contour is of a lateral malleolus. At least one contour of the implant may correspond to an angle of the lateral malleolus from the longitudinal bone axis.

In some aspects, the plurality of lateral lines include at least three lines. In some aspects, the image can be a computed tomography scan slice.

In some aspects, extrapolating the anatomic shape can further include measuring a first reference distance of a first line of the at least three lateral lines, the first line extending perpendicularly from a first point of the plurality of first intersection points to a first point of the plurality of second intersection points; measuring a second reference distance of a second line of the at least three lateral lines, the second line extending perpendicularly from a second point of the plurality of first intersection points to a second point of the plurality of second intersection points; measuring a third reference distance of a third line of the at least three lateral lines, the third line extending perpendicularly from a third point of the plurality of first intersection points to a third point of the plurality of second intersection points; and extrapolating the anatomic shape of the first border based on the first reference distance, the second reference distance, and the third reference distance.

In some aspects, extrapolating the anatomic shape can further include extrapolating a first curvature of the anatomic shape between the first point of the plurality of first intersection points and the second point of the plurality of first intersection points based on the first reference distance and the second reference distance; and extrapolating a second curvature of the anatomic shape between the second point of the plurality of first intersection points and the third point of the plurality of first intersection points based on the second reference distance and the third reference distance.

In some aspects, extrapolating the anatomic shape can further include extrapolating a curvature of the anatomic shape with data from the sagittal viewing plane, or extrapolating a curvature of the anatomic shape with data from the coronal viewing plane, or extrapolating a curvature of the anatomic shape with data from the axial viewing plane. Any combination of one or more viewing planes may be used to determine the curvature of the anatomy, and the viewing planes used may be obtained at non-orthogonal angles to each other.

In some aspects, the bone includes a periprosthetic fracture with the implant being formed to fit the anatomic shape of the bone and to correct the periprosthetic fracture. The periprosthetic fracture may be characterized by at least one of (i) determining a geometry of the implant, (ii) determining a fixation of the implant, (iii) determining the fracture pattern, (iv) determining if the fracture pattern is comminuted, (v) determining the amount of angulation and displacement, and (vi) classifying the displacement.

In some aspects, the implant is a periprosthetic plate formed having a length, width, and a shape, the length, width, and shape being determined by the characterized periprosthetic fracture. The periprosthetic plate may be a proximal short periprosthetic plate formed for a short stem with a minimal distal fracture extension. The periprosthetic plate may be a proximal long periprosthetic plate formed for at least one of short stems with a distal fracture extension and a regular length stem with a minimal distal extension. The periprosthetic plate may be a short distal periprosthetic plate formed for a short stem used with a total arthroplasty, with a minimal proximal fracture extension. The periprosthetic plate may be a long distal periprosthetic plate, formed for a short stem used with at least one of a total arthroplasty with a proximal fracture extension and a regular length stem used with a total arthroplasty with a minimal proximal fracture extension. The periprosthetic plate may be a midshaft periprosthetic plate formed for at least one of a regular length stem with a minimal fracture extension or a midshaft non-periprosthetic fracture. The periprosthetic plate may be a full-length periprosthetic plate formed for fractures that encompass a significant portion of the bone, including highly comminuted fractures.

These and other features, aspects, and advantages of the present invention will become better understood upon consideration of the following detailed description, drawings, and appended claims.

BRIEF DESCRIPTION OF THE DRAWINGS

FIG. 2D shows a coronal viewing plane of a non-limiting example femur with measurement lines shown.

FIG. 2E shows a coronal viewing plane of a non-limiting example tibia with measurement lines shown.

FIG. 2F shows a coronal viewing plane of a non-limiting example fibula with measurement lines shown.

FIG. 13A shows a non-limiting example plate for use with an anteromedial distal tibia.

FIG. 13B shows a larger size of the non-limiting example plate of FIG. 13A for use with an anteromedial distal tibia.

FIG. 14A shows a non-limiting example plate for use with a distal femur.

FIG. 14B shows a larger size of the non-limiting example plate of FIG. 14A for use with a distal femur.

FIG. 17A shows an embodiment of another non-limiting example tibia nail.

FIG. 17B is another view of the non-limiting example tibia nail of FIG. 17A.

Like reference numerals will be used to refer to like parts from Figure to Figure in the following description of the drawings.

DETAILED DESCRIPTION OF THE INVENTION

In one aspect of the present disclosure, a novel methodology to improve understanding of external and internal anatomy of bones through the use of CT scan data and 3D modeling is provided. A retrospective review was undertaken of the consecutive series of lower extremity periprosthetic fractures to improve understanding of periprosthetic fractures. This review further reinforced the need as well as benefit of a truly anatomic plating system that can be adaptable to address periprosthetic fractures. While the methodology is described in detail for the femur, tibia, and fibula, this methodology is applicable to other bones including, but not limited to the radius, ulna, vertebral bodies, etc. This methodology describes the interaction of anatomical features of the external and internal femur, tibia, and fibula and how these features change based on the specific location in the bone. In one aspect of the present disclosure, in order to drive efficiency, automated measurements were performed and this automation may be applicable to any bone.

In one aspect of the present disclosure, plate and intramedullary nail models were created to test the methodology and the interaction of the anatomic features and their interdependence on each other. The models had specific features for improved anatomic fracture fixation for intramedullary nails as well as plates. The results of the testing validated that the methodology significantly improved fit compared to currently available designs. The methodology can optimize and facilitate the design of truly anatomic trauma fixation devices in an anatomic shape as well as size distribution.

Figure 1:
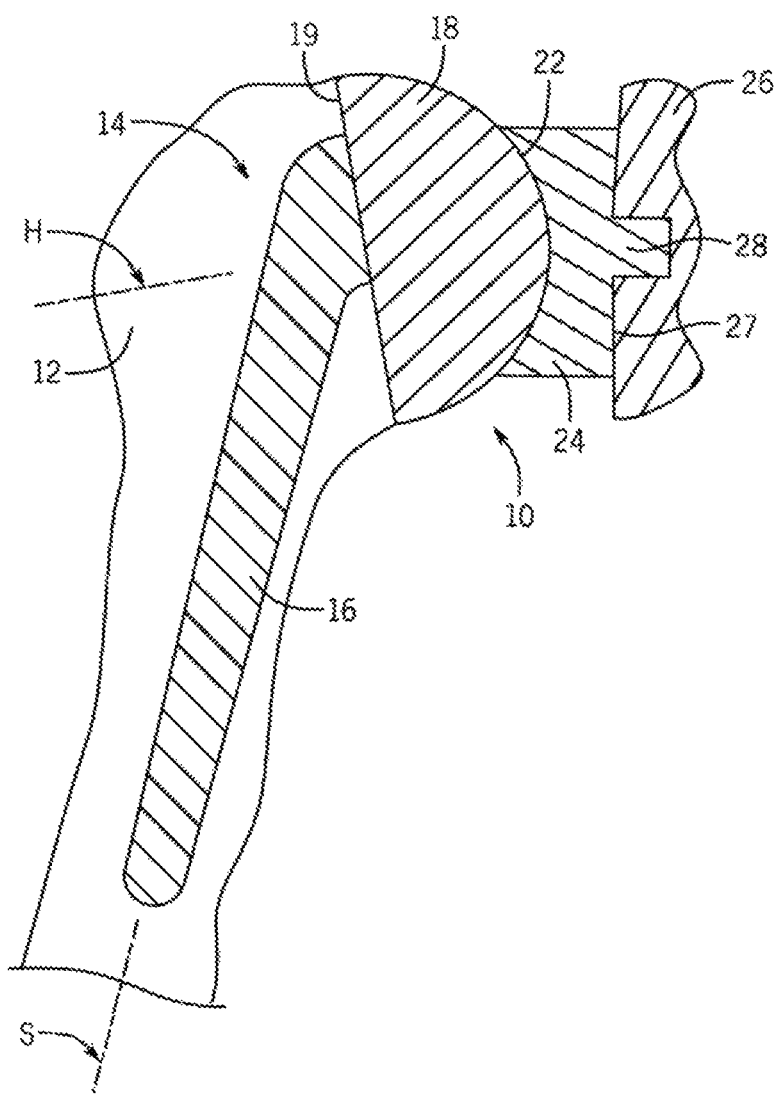
FIG. 1 is a cross-sectional view of one embodiment of a prior art prosthesis.

Looking first at FIG. 1, there is shown one example embodiment of a prior art anatomic total shoulder prosthesis 10. One skilled in the art will appreciate that other prostheses, such as reverse shoulder arthroplasty, hemi arthroplasty, stemless shoulder arthroplasty, resurfacing, elbow prostheses and the like may be suitable for use with the present disclosure. The upper portion of the humerus 12 is replaced by a humeral component 14 including a stem 16 that extends into a bore formed within the humerus 12. Typically, the stem 16 is fixed within the bore formed within the humerus 12. The stem 16 has a longitudinal stem axis S. A generally hemispherical head 18 is connected to the stem 16. The stem 16 can be monolithic with the head 18, or the stem 16 and the head 18 can formed as separate parts. The hemispherical head 18 has a base surface 19 and a longitudinal head axis H. The hemispherical head 18 of the humeral component 14 articulates with a complementary concave section 22 of a glenoid component 24 that is fixed within the glenoid cavity of the scapula 26 (shown cutaway) using cemented or uncemented posts 28. The glenoid component 24 includes a base surface 27 opposite the concave section 22 that serves as an articular surface of the glenoid component 24.

A unique database of consecutive high resolution thin cut two dimensional and three dimensional CT scans of the entire femur, tibia, and fibula, with a custom designed bone stock protocol of patients was available for study. This custom designed protocol was specifically developed at the Mayo Clinic for a detailed understanding of the anatomy of these patients. In addition, 3D modeling of each of these patients was performed. A method for understanding external and internal bone anatomy was subsequently developed using this unique resource and underwent validation. This data set facilitated developing a methodology to understand the anatomy for each bone and facilitate the design of anatomically correct plates and implants.

In non-limiting examples, the method facilitates the design of total and partial arthroplasty, intramedullary nails for the lower extremities, revision length stems for arthroplasty, plates for periprosthetic fractures, mid-shaft bone fractures, proximal bone fractures, and distal bone fractures.

Proper design and/or selection of a periprosthetic plate can be achieved using a method of this disclosure. The proper design and selection of a periprosthetic plate was facilitated by review of a large volume of lower extremity prosthetic replacements. Patients with periprosthetic fractures around an arthroplasty were identified. This data set facilitated understanding the specific fracture location, fracture pattern, and remaining bone stock. Accordingly, in one aspect, a method of designing and manufacturing a periprosthetic implant for repairing a part of a bone in a subject was developed. Specifically, a method for designing and manufacturing a periprosthetic implant for periprosthetic fractures around lower extremity arthroplasty was developed.

Periprosthetic Fractures Around Lower Extremity Arthroplasty

A prosthetic implant present in a subject can be characterized by a number of parameters. A fixation mechanism of the implant could be determined to be uncemented or cemented. A lower extremity fracture in a subject can have a variety of patterns. The length and width of the implant as well as associated stems can be measured in millimeters. The fracture can also be determined as proximal and/or distal to the implant, and as a comminuted or not comminuted fracture. It is also important to determine if the implant has become loose. The fracture pattern can be further characterized as transverse, oblique, or spiral, and amounts of angulation and displacement can also be assessed. Angulation was classified as mild (15°), moderate (15° to 30°), or severe (>30°). Displacement was classified as mild (within one-third of the diameter of the bone shaft), moderate (one-third to two-thirds of the diameter of the bone shaft), or severe (beyond two-thirds of the diameter of the bone shaft), or complete displacement. The bone was assessed to determine if an adequate amount of quality bone was present for plate or intramedullary nail fixation. Treatment was determined as surgical or non-surgical and treatment type was also determined.

CT Scans

The methodology for facilitating the design and manufacturing of anatomically correct plates and implants may involve analysis of medical imaging data, such as from computerized tomography (CT) scans, and may also include the use of 3D models. In one aspect, a periprosthetic implant can be formed to include at least one curved surface that can have contours that correspond to anatomic shapes of the subject. A contour of the at least one curved surface can correspond to an anatomic shape having been determined during analysis of CT scans of the subject.

Figure 2:
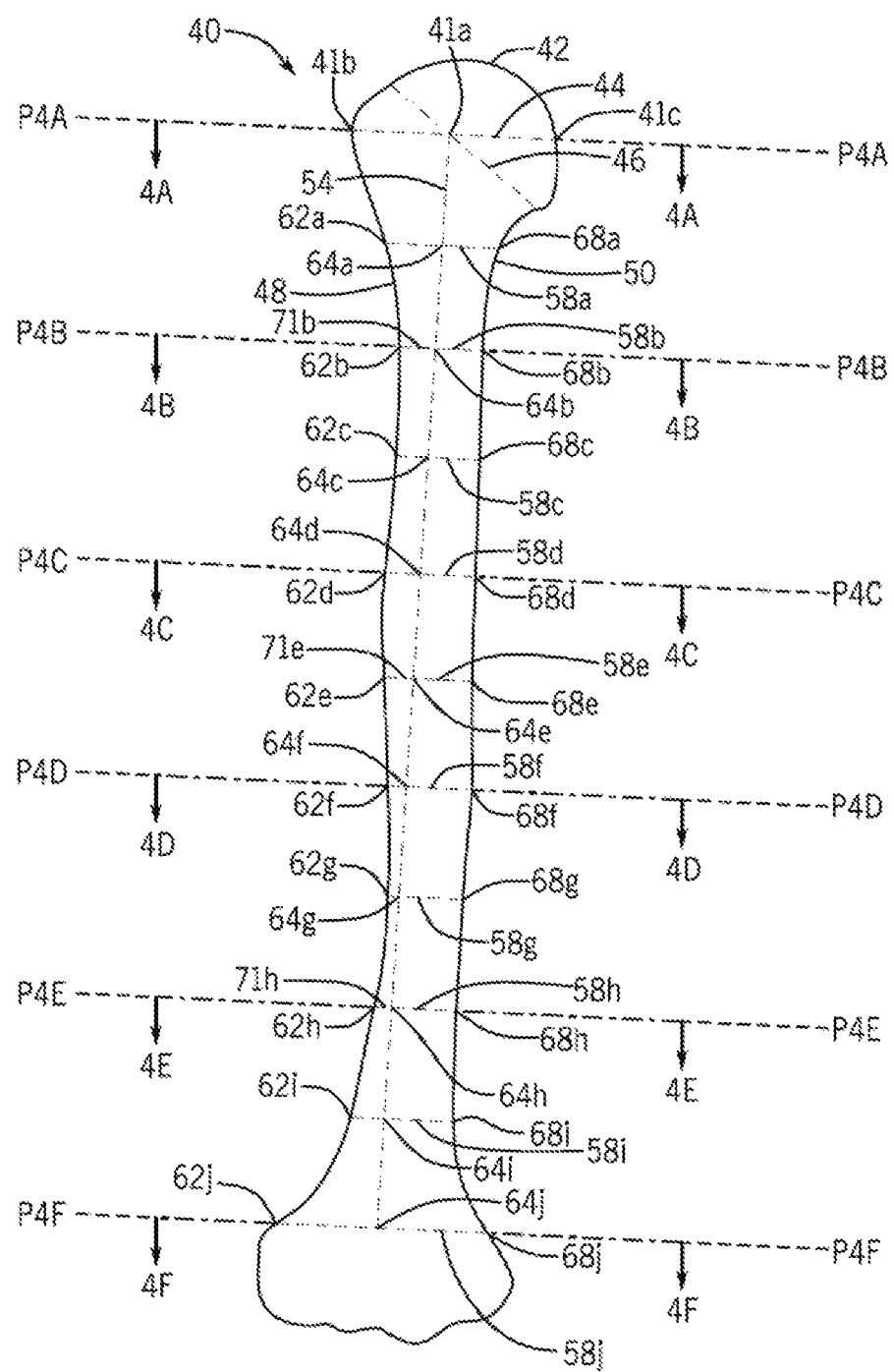
FIG. 2 shows a traced computed tomography (CT) two-dimensional (2D) CT slice in a coronal viewing plane of a bone with measurement lines shown in dashed lines.
Figure 2A:
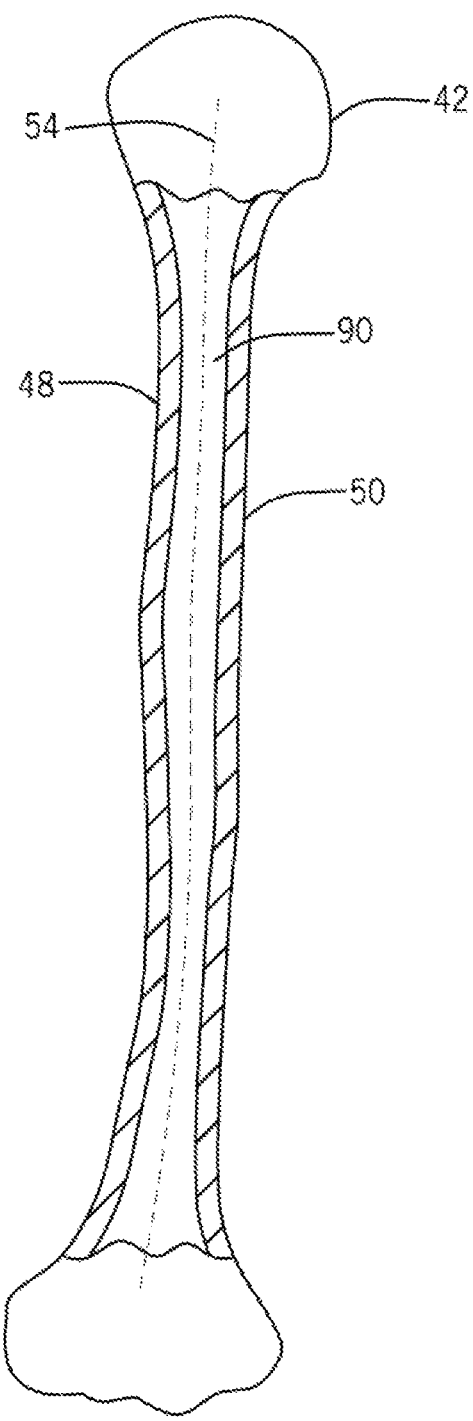
FIG. 2A shows a traced computed tomography (CT) two-dimensional (2D) CT slice in a coronal viewing plane of the bone in FIG. 2.

Looking at FIG. 2, the anatomic shape can be determined by a number of steps. An image 40 of a bone 42 of a subject can be obtained, in some embodiments the image 40 can be a CT image, in other embodiments the image can be an X-ray image, an ultrasonic image, a magnetic resonance image (MRI), a positron emission tomography (PET) image, or the like. The bone can be a femur, tibia, fibula, and the like. In other embodiments the bone can be a radius, an ulna, or any other bone. A bone cut line 46 can be oriented on the image 40 that can extend from a first border 48 of the bone 42 to an opposite second border 50 of the bone 42. In some embodiments, the bone cut line 46 can be oriented angularly across a region of a head of the bone of a subject. A longitudinal bone axis 54 can be oriented on the image 40. The longitudinal bone axis 54 may extend longitudinally from a proximal aspect of the bone. In another embodiment, the longitudinal bone axis 54 may extend longitudinally from an intersection 41A of a proximal aspect line, such as proximal bone head line 44 with the bone cut line 46, where the proximal bone head line 44 is oriented on the image 40 by extending perpendicularly from a first intersection point 41B on the first border 48 of the bone 42 at the most proximal and lateral aspect of a greater tuberosity through a second intersection point 41A where the proximal bone head line 44 intersects the bone cut line 46, and further extends to a third intersection point 41C on the second border 50 of the bone 42. In some embodiments, the bone 42 can be the femur, or the tibia, or the fibula. FIG. 2A shows one embodiment where the longitudinal bone axis 54 can follow the centerline of bone 42, defined as being a constant equal distance between the first border 48 and the second border 50. When bone axis 54 is the centerline of the bone 42, the nonlinear shape of the axis line 54 defines the radius of curvature for the bone 42, which can be assessed at various points along the length of the bone axis line 54. The nonlinear shape of the axis line 54 can provide a number of different radii of curvature. When bone axis 54 is the centerline, the intersection of axis line 54 with proximal bone head line 44 may determine intersection point 41A. In one non-limiting example, a first radius of curvature can transition to a second radius of curvature, and the second radius of curvature can transition to a third radius of curvature. The first radius of curvature and the third radius of curvature can be concave, while the second radius of curvature can be convex. Each radius of curvature can feature a different radius. Any number of changes in radius of curvature can be provided such that the axis line 54 is a constant equal distance between the first border 48 and the second border 50 within the intramedullary canal 90 of the cancellous bone.

In another embodiment the longitudinal bone axis 54 does not follow the centerline, but may be linear and can extend from the bone cut line 46, or may extend linearly from intersection point 41A that was established from the intersection of a centerline with proximal bone head line 44, along a length of the bone between the first border 48 and second border 50. A plurality of lateral lines 58a, 58b, 58c, 58d, 58e, 58f, 58g, 58h, 58i, 58j can be oriented on the image 40 at different distances from the intersection point 41a, or from a proximal aspect line, such as proximal bone head line 44, or from the bone cut line 46. Each of the plurality of lateral lines 58a to 58j can extend perpendicularly from one of a plurality of first intersection points 62a, 62b, 62c, 62d, 62e, 62f, 62g, 62h, 62i, 62j on the first border 48 of the bone 42 to one of a plurality of second intersection points 64a, 64b, 64c, 64d, 64e, 64f, 64g, 64h, 64i, 64j intersecting the longitudinal bone axis 54 at one of a plurality of second intersection points 64a to 64j. Each of the plurality of lateral lines 58a to 58j can further extend perpendicularly from one of a plurality of second intersection points 64a to 64j on the longitudinal bone axis 54 to one of a plurality of third intersection points 68a, 68b, 68c, 68d, 68e, 68f, 68g, 68h, 68i, 68j on the second border 50 of the bone 42. The anatomic shape of the bone 42 can be extrapolated based on determining the first intersection point 41B of the proximal bone head line 44 along with the plurality of first intersection points 62a to 62j, and measuring the distances to the corresponding second intersection points, which for intersection point 41B would be intersection point 41A of the proximal bone head line 44, and subsequently the plurality of second intersection points 64a to 64j from the first intersection points 62a to 62j. Specifically, the anatomic shape of the first border 48 of the bone 42 can be extrapolated from the first intersection point 41B of the proximal bone head line 44 and with the plurality of first intersection points 62*a* to 62*j* with the plurality of second intersection points 41*a* and 64*a* to 64*j*. The anatomic shape of the second border 50 of the bone 42 can be extrapolated in a similar manner as above by using the third intersection point 41C of the proximal bone head line 44 with the plurality of third intersection points 68*a* to 68*j* and measuring the distances to the corresponding second intersection points 41*a* and 64*a* to 64*j*.

In some embodiments, the plurality of lateral lines 58*a* to 58*j* can be placed at equidistant intervals distally from intersection point 41*a*, or from a proximal aspect line, such as proximal bone head line 44, or from the bone cut line 46. In some embodiments, the equidistant interval can be in a range from 0.1 to 50 millimeters. In a non-limiting embodiment, the equidistant interval can be 25 millimeters. As such, example measurements can be made at 25 millimeters, 50 millimeters, 75 millimeters, 100 millimeters, 125 millimeters, 150 millimeters, 175 millimeters, and 200 or more millimeters distal to the intersection point 41*a*, or from a proximal aspect line, such as proximal bone head line 44, or from the bone cut line 46. One can add more lines to provide for determining the contour of the bone with higher resolution.

In a non-limiting example embodiment, a first reference distance can be measured for a first line 71*b* extending perpendicularly from a first point 62*b* of the plurality of first intersection points 62*a* to 62*h* to a first point 64*b* of the plurality of second intersection points 64*a* to 64*h*. A second reference distance can be measured of a second line 71*e* extending perpendicularly from a second point 62*e* of the plurality of first intersection points 62*a* to 62*h* to a second point 64*e* of the plurality of second intersection points 64*a* to 64*h*. A third reference distance can be measured of a third line 71*h* extending perpendicularly from a third point 62*h* of the plurality of first intersection points 62*a* to 62*h* to a third point 64*h* of the plurality of second intersection points 64*a* to 64*h*.

The anatomic shape of the first border 48 can be extrapolated based on the first reference distance of the first line 71*b*, the second reference distance of the second line 71*e*, and the third reference distance of the third line 71*h*. A first curvature of the anatomic shape can be extrapolated between the first point 62*b* of the plurality of first intersection points 62*a* to 62*h* and the second point 62*e* of the plurality of first intersection points 62*a* to 62*h* based on the first reference distance and the second reference distance. A second curvature of the anatomic shape can be extrapolated between the second point 62*e* of the plurality of first intersection points 62*a* to 62*h* and the third point 62*h* of the plurality of first intersection points 62*a* to 62*h* based on the second reference distance and the third reference distance.

In another version of the method of the disclosure, the anatomic shape of the first border 48 and the second border 50 together can be extrapolated based on a fourth reference distance of the lateral line 58*b*, a fifth reference distance of the lateral line 58*e*, and a sixth reference distance of the lateral line 58*h*. A first curvature of the anatomic shape can be extrapolated between the first point 62*b* of the plurality of first intersection points 62*a* to 62*j* and the second point 62*e* of the plurality of first intersection points 62*a* to 62*j* based on the fourth reference distance and the fifth reference distance. A second curvature of the anatomic shape can be extrapolated between the second point 62*e* of the plurality of first intersection points 62*a* to 62*j* and the third point 62*h* of the plurality of first intersection points 62*a* to 62*j* based on the fifth reference distance and the sixth reference distance.

Referring to FIGS. 2D, 2E and 2F, various femur, tibia, and fibula length measurements may be obtained in order to facilitate not only orthopedic plate or implant designs, but also to provide appropriate size groupings for such plates or implants to appropriately fit a patient population. In some embodiments, the overall length of the bone 1246 is determined.

Referring to FIG. 2D, the bone is the femur. The overall length 1202 of the bone is determined by measuring from the highest point of the greater trochanter 1246 to the most distal point of the lateral condyle. In one embodiment, calculating a percentage of a patient's measured overall femur length may be used to determine the size of plate or implant that a patient may need.

Referring to FIG. 2E, the bone is the tibia. The overall length 1203 of the bone is determined by measuring from below the center of the tibia plateau, such as ½ cm below the plateau 1247, to the most distal point of the medial malleolus in the Z plane. In one embodiment, calculating a percentage of a patient's measured overall tibia length may be used to determine the size of plate or implant that a patient may need.

Referring to FIG. 2F, the bone is the fibula. The overall length 1204 of the bone is determined by measuring from the level of the articular surface 1248 to the most distal point in the Z plane. In one embodiment, calculating a percentage of a patient's measured overall fibula length may be used to determine the size of plate or implant that a patient may need.

Figure 2B:
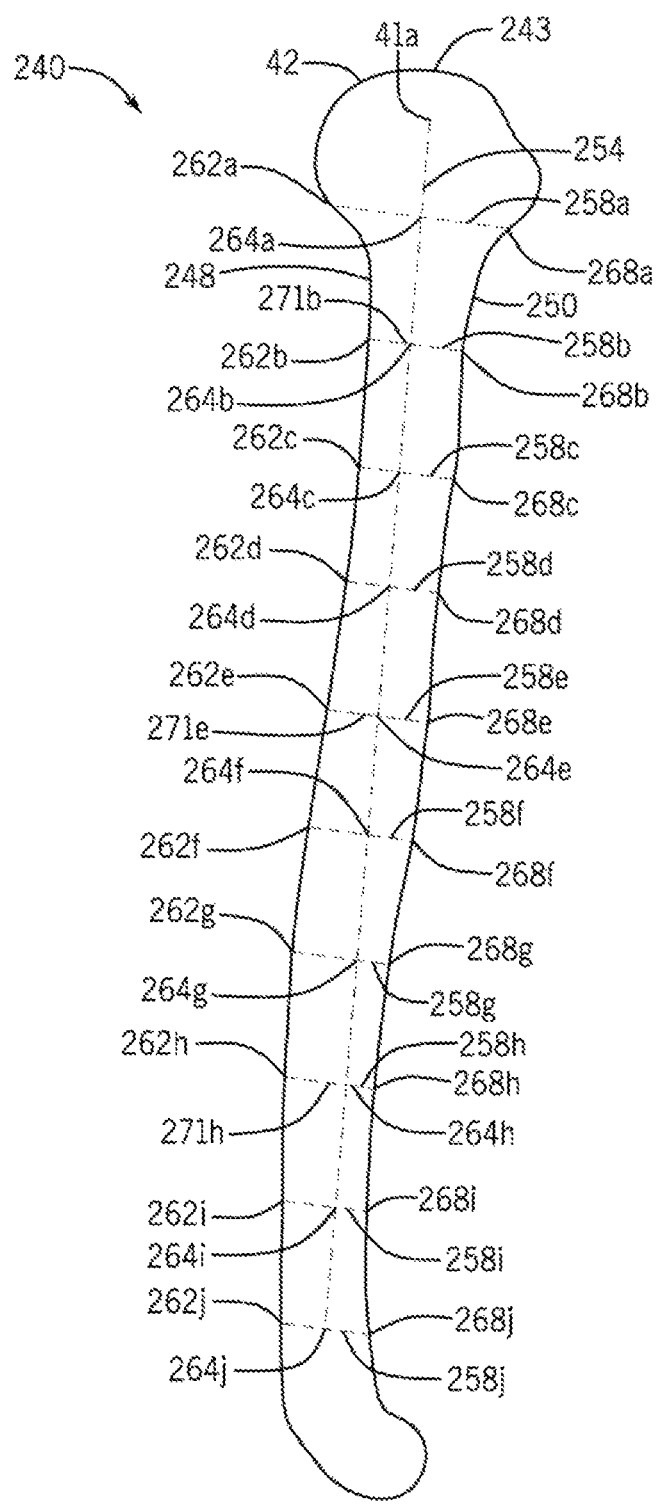
FIG. 2B shows a traced computed tomography (CT) two-dimensional (2D) CT slice in a sagittal viewing plane of the bone in FIG. 2 with measurement lines shown in dashed lines.
Figure 2C:
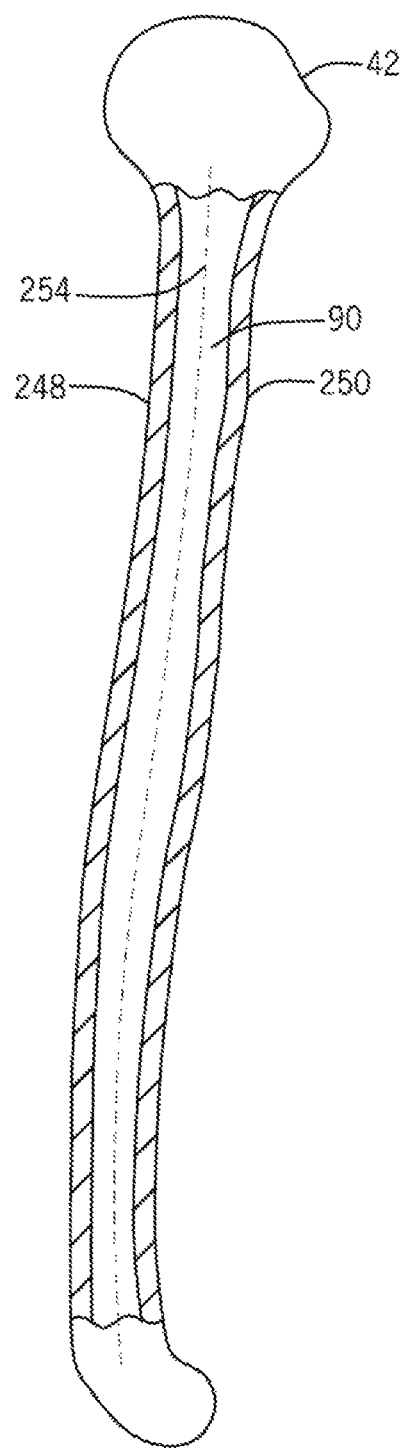
FIG. 2C shows a traced computed tomography (CT) two-dimensional (2D) CT slice in a sagittal viewing plane of the bone in FIG. 2.
Figure 2G:
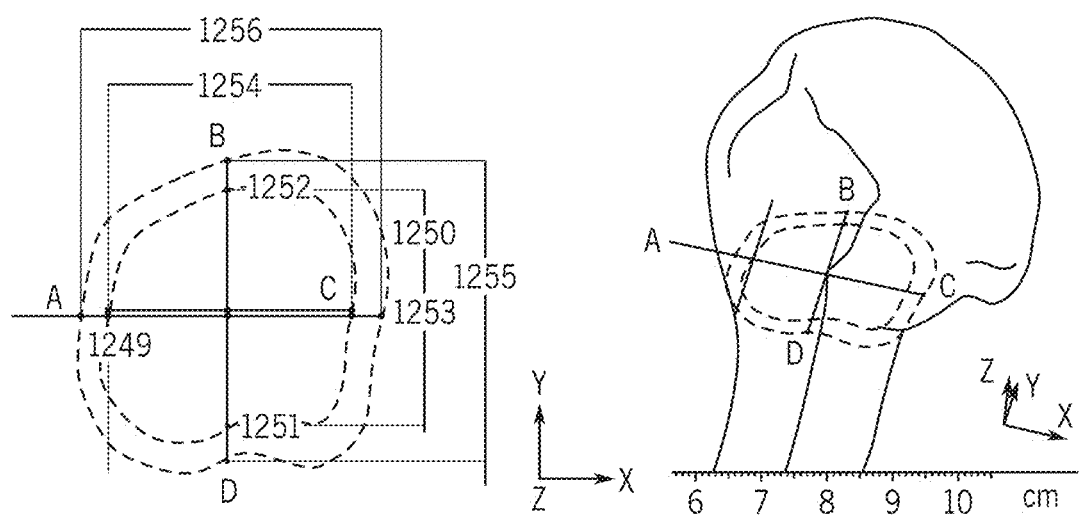
FIG. 2G shows an axial cross section of a bone and a depiction of the cross section's location on an image of the bone with measurement lines shown.

Referring to FIG. 2G, the plurality of lateral lines 58*a*, 58*b*, 58*c*, 58*d*, 58*e*, 58*f*, 58*g*, 58*h*, 58*i*, 58*j* from FIG. 2 may include being placed in multiple planes, such as A-C and D-B in FIG. 2E. The plurality of lateral lines may also include measurements of the thickness of the cortical and cancellous bone material. In the example provided, thicknesses for the cortical and cancellous bone is obtained in a 2D cross section of the femur, tibia, fibula, and the like. Cortical lateral thickness 1249, cortical medial thickness 1250, cortical anterior thickness 1251, and cortical posterior thickness 1252 may be determined. Cancellous anterior to posterior distance 1253, cancellous medial to lateral distance 1254, cortical anterior to posterior distance 1255, and cortical medial to lateral distance 1256 may also be determined. In some embodiments, any orientation for the planes may be used, such as a partially rotated anterior to a partially rotated posterior view, which may enable for fully 3D thickness measurements of the bone. In one embodiment, these measurements may be obtained in an automated fashion, where a medical image is provided to a computer system that automatically segments the bone, identifies the relevant anatomical landmarks, such as the head of the bone and performs the desired measurements. Non-limiting example graphical representations of these width measurements are shown in FIGS. 19A-19D for tibia, 20A-20D for femur, and 21A-21D for fibula measurements.

Referring to FIGS. 19A, 19B, 19C, and 19D, non-limiting example bone thickness data is shown for tibia measurements. Referring to FIGS. 20A, 20B, 20C, and 20D, non-limiting example bone thickness data is shown for femur measurements. Referring to FIGS. 21A, 21B, 21C, and 21D, non-limiting example bone thickness data is shown for fibula measurements. Bone thickness data may be used to determine placement of a plate or implant on/in a bone. Bone thickness is a surrogate metric for bone quality, and so thickness data such as presented in the current figures may also be used by a surgeon to determine which screw holes to use for a plate during implantation. A surgeon may select screw locations to correspond to higher quality, thicker bone, and may elect to not use screws in screw hole locations that correspond to thinner bone stock. Screws, pins, bolts, cerclages, and the like may be used to attach the implant to the bone and may use the screw holes. Screw hole locations, numbers, sizes, angles, and the like depicted in the figures are non-limiting examples only, and one skilled in the art will appreciate that other configurations may be possible, such as to provide for manufacturer flexibility. A plate may also be repositioned on the bone in order to maximize contact with thicker bone.

Proximal Tibia Measurements

The methods described above can facilitate the design of anatomically appropriate periprosthetic plates, proximal and distal plates, as well as mid-shaft bone plates for the femur, tibia, fibula, and the like with an appropriate shape, width, and length. In particular, the methods revealed a specific pattern and shape of the proximal tibia region as noted in Table 1 with non-limiting example lateral proximal tibia measurements. Table 2 includes non-limiting example medial proximal tibia measurements. Table 3 includes non-limiting example tibia shaft and plateau angle measurements. The width of the tibia was measured in the sagittal plane in select locations. The method also may define contours to the anatomy of the tibia that would be instrumental in designing anatomically correct implants and plates, such as mid-shaft and periprosthetic plates. The measurements in Table 1-3 are based upon CT scans of 50 subjects with the data presented in millimeters (mm) and were made according to FIGS. 3A-3K.

TABLE 1

| Lateral Proximal Tibia Measurements | | | | | | | |
|---|---|---|---|---|---|---|---|
| | 25% | 50% | 75% | Min | Max | Mean | STDEV |
| Total Tibia Length | 348.13 | 369.95 | 400.88 | 315.49 | 440.10 | 373.98 | 33.50 |
| LPT Width 1 [mm] | 23.70 | 27.43 | 30.26 | 19.67 | 39.43 | 27.73 | 4.39 |
| LPT Width 2 [mm] | 19.93 | 21.60 | 24.14 | 15.58 | 29.19 | 22.04 | 2.90 |
| LPT Width 3 [mm] | 21.33 | 23.74 | 27.66 | 17.23 | 31.06 | 24.35 | 3.71 |
| LPT Length 1 [mm] | 14.60 | 16.44 | 18.58 | 8.59 | 23.97 | 16.54 | 2.85 |
| LPT Length 2 [mm] | 16.74 | 18.81 | 20.75 | 12.07 | 27.63 | 19.06 | 3.84 |
| LPT Angle 1 [°] | 143.01 | 148.56 | 152.29 | 135.88 | 163.29 | 147.66 | 6.18 |
| LPT Angle 2 [°] | 147.42 | 154.75 | 159.54 | 135.49 | 166.57 | 153.85 | 8.23 |
| LPT ROC 1 [mm] | 23.92 | 28.46 | 32.93 | 9.43 | 43.37 | 28.03 | 6.96 |
| LPT ROC 2 [mm] | 45.68 | 53.28 | 64.58 | 29.97 | 124.46 | 56.97 | 17.23 |

The percentiles refer to the range of data.

As noted in Table 1, the tibia can be wide at the tibial plateau then narrows distally. The tibia can then start to widen, which can correspond to the ankle region. This method and 3D modeling can facilitate developing implants and devices that can optimize contact with native bone. In one aspect, the method may be used to facilitate the minimization of soft tissue stripping, and soft tissue irritation from plates that are not contoured to the normal anatomy. Moreover, the data from this methodology can define a true anatomic distribution and range of plates needed to manage these fractures.

TABLE 2

| Medial Proximal Tibia Measurements | | | | | | | |
|---|---|---|---|---|---|---|---|
| | 25% | 50% | 75% | Min | Max | Mean | STDEV |
| MPT Width 1 [mm] | 31.45 | 35.67 | 38.81 | 27.13 | 49.00 | 35.95 | 5.17 |
| MPT Width 2 [mm] | 30.75 | 34.66 | 39.75 | 26.49 | 47.82 | 35.72 | 5.55 |
| MPT Width 3 [mm] | 30.50 | 34.35 | 37.28 | 25.88 | 48.27 | 34.59 | 5.02 |
| MPT Length 1 [mm] | 13.27 | 14.74 | 16.01 | 10.86 | 20.08 | 14.92 | 2.21 |
| MPT Length 2 [mm] | 13.15 | 14.91 | 16.35 | 10.40 | 19.92 | 15.10 | 2.32 |
| MPT Angle 1 [°] | 155.34 | 159.91 | 163.70 | 144.87 | 172.67 | 159.84 | 6.59 |
| MPT Angle 2 [°] | 156.80 | 161.04 | 163.83 | 149.66 | 176.00 | 161.24 | 5.30 |
| MPT ROC 1 [mm] | 31.21 | 45.06 | 53.95 | 20.81 | 101.16 | 46.41 | 17.71 |
| MPT ROC 2 [mm] | 52.24 | 59.59 | 77.17 | 42.39 | 133.85 | 68.88 | 24.04 |

TABLE 3

Tibial Shaft and Plateau Angles

|  | 25% | 50% | 75% | Min | Max | Mean | STDEV |
| --- | --- | --- | --- | --- | --- | --- | --- |
| MTS Angle [°] | 91.37 | 93.76 | 95.66 | 90.39 | 99.61 | 93.96 | 2.53 |
| MTP Angle [°] | 72.34 | 74.89 | 77.69 | 58.00 | 83.19 | 74.33 | 4.90 |
| LTP Angle [°] | 76.35 | 78.84 | 81.55 | 69.43 | 87.29 | 78.69 | 4.05 |

The methodology also revealed a significant difference in width of the tibia comparing males and females. One may consider having different size and shapes of implants or plates for males/females as well as potentially side specific implants or plates (right and left).

The methodology resulted in discovery that the fracture location can be different for short compared to regular length stems. A six plate system may be employed comprising: (1) proximal short periprosthetic plate, which may be used primarily for stemless applications or for short length stems with minimal distal fracture extension; (2) proximal long periprosthetic plate, which may be used primarily for short stems with distal fracture extension, or regular length stems with minimal distal extension; (3) short distal periprosthetic plate, which may be used primarily for short stems with minimal proximal fracture extension; (4) long distal periprosthetic plate, which may be used primarily for short stems used with proximal fracture extension, or regular length stems with minimal proximal fracture extension; (5) midshaft periprosthetic plate, which may be used primarily for regular length stems with minimal fracture extension or with midshaft non-periprosthetic fractures; and (6) a full-length periprosthetic plate, which may be used primarily for fractures that encompass a significant portion of the bone, including highly comminuted fractures.

By understanding the fracture patterns and relative distributions, this method can then establish the distribution of plates required—short stem with a transverse fracture compared to a regular length stem with a distally extending spiral fracture. The methodology and the data set can drive accurate preoperative planning to determine the specific plate to be used at the time of surgery. This method allows for plate design that can be based upon anatomical considerations and also for taking into account fracture patterns which can then be used in preoperative planning to select the correct fracture plate needed.

To obtain plate fixation of the bone, one may consider tabs that are bendable to grab surrounding bone as well as multi-angular screws and screw holes that are adaptable to cables.

Lateral Proximal Tibia Measurements

Figure 3A:
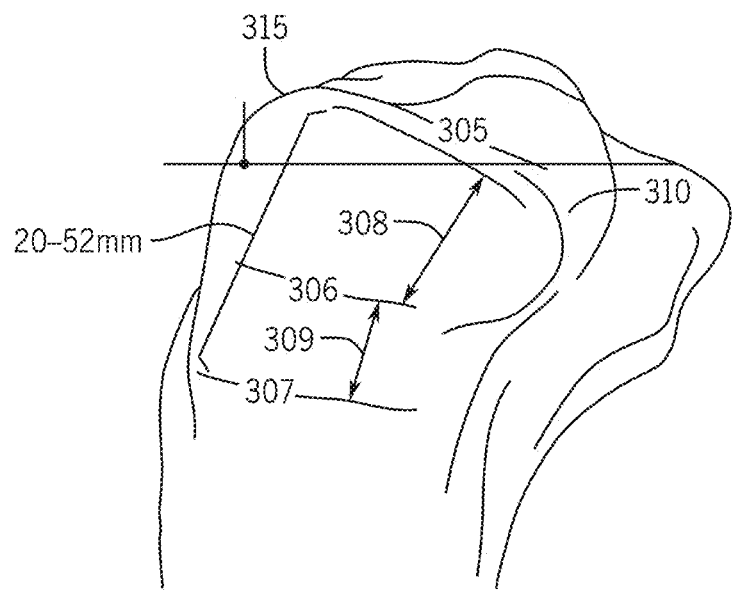
FIG. 3A is an image of a proximal section of a tibia with measurement lines shown.

Referring to FIG. 3A, lateral proximal tibia (LPT) measurements may be made according to one configuration. The width following the lateral tibial plateau 305 from the fibular facet 310 to the edge between the anterior and lateral sides 315 may be measured. Tibial plateau width 305 is listed as LPT Width 1 in Table 1. Second LPT width 306, LPT Width 2 in Table 1, may be measured following the boundary between the flat area extending up to Tibial plateau width 305 and the flat area angled down to third LPT width 307, which is LPT Width 3 in Table 1. Second LPT width 306 extends from the center of the fibular facet to the vertical ridge anterior. Third LPT width 307 may be measured from even with the lateral edge of the tibial tuberosity to the vertical ridge just distal to the fibular facet. This width is at the point where the shaft starts to transition into the tibia head.

The length between the midpoint of tibial plateau width 305 and second LPT width 306 may be measured as first LPT length 308, which is labelled as LPT length 1 in Table 1. The length between the midpoint of second LPT width 306 and third LPT width 307 may be measured as second LPT length 309, which is labelled as LPT length 2 in Table 1. Using the min and max data from Table 1, the range of values for an overall length of LPT length 308 added to second LPT length 309 may be 20-52 mm. This overall length value may be used to determine a location of a bend or junction in a plate or implant.

Figure 3B:
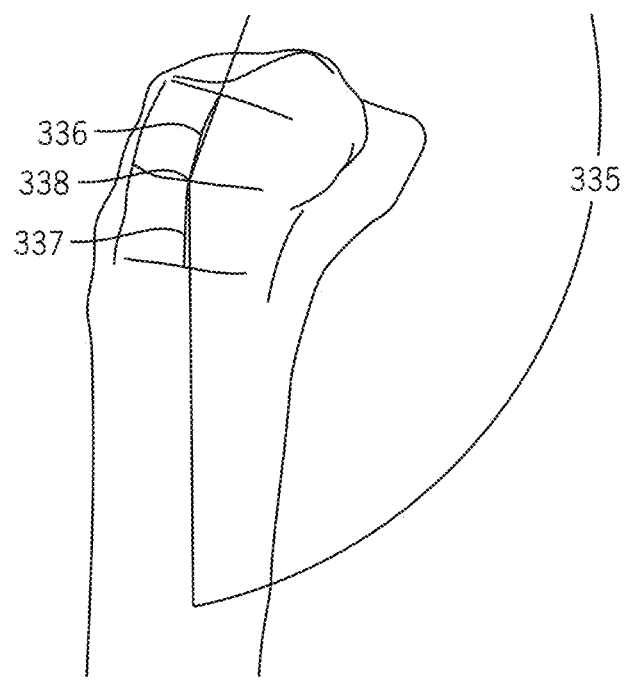
FIG. 3B is an image of a proximal section of a tibia with measurement lines shown.

Referring to FIG. 3B, the angle of the LPT may be measured. A perpendicular line 336 may be generated from the tibial plateau width 305 midpoint. A line along the slope of the cancellous centerline 337 may also be created. A point where these lines intersect may be determined as an Intersect Point 338. First LPT angle 335, listed as LPT angle 1 in Table 1, may be determined using tibial plateau width 305 midpoint, the Intersect Point 338, and to a point on the cancellous centerline.

Figure 3C:
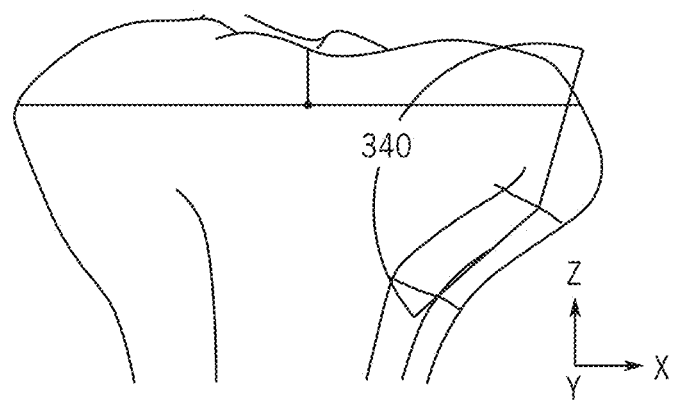
FIG. 3C is an image of a proximal section of a tibia with measurement lines shown.

Referring to FIG. 3C, the angle of the LPT in a coronal view, the XZ plane, may be measured. A second LPT angle 340, listed as LPT angle 2 in Table 1, may be created by determining the angle between the midpoint of tibial plateau width 305, the midpoint of second LPT width 306, and the midpoint of third LPT width 307.

Figure 3D:
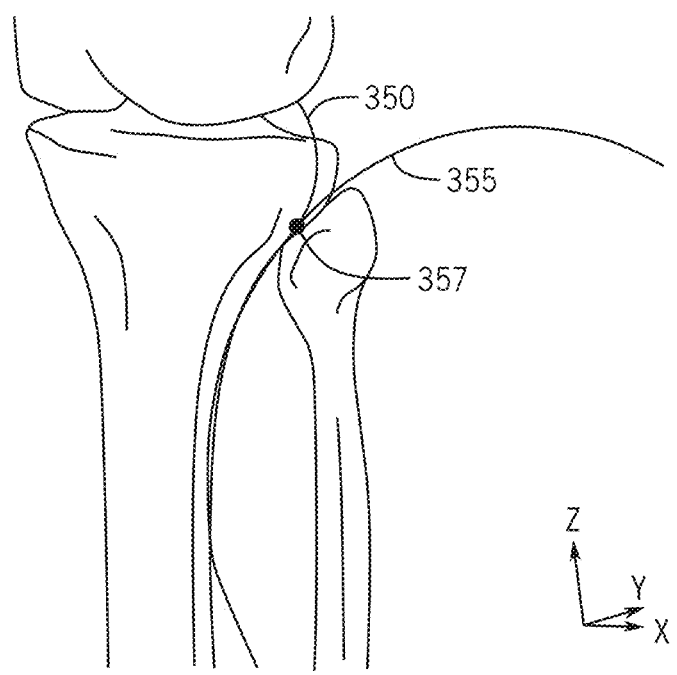
FIG. 3D is an image of a proximal section of a tibia with radius of curvature lines shown.

Referring to FIG. 3D, a radius of curvature analysis for the lateral tibial epicondyle is shown. Arc 350 defines the radius of curvature of the lateral tibial epicondyle on the coronal view, which is labeled as LPT ROC 1 in Table 1. Arc 355 defines the radius of curvature for the distal end of the lateral tibial epicondyle and the shaft following the fibular head, which is labeled as LPT ROC 2 in Table 1. The arc intersection point 357 is the intersection of arcs 350 and 355.

Medial Proximal Tibia Measurements

Figure 3E:
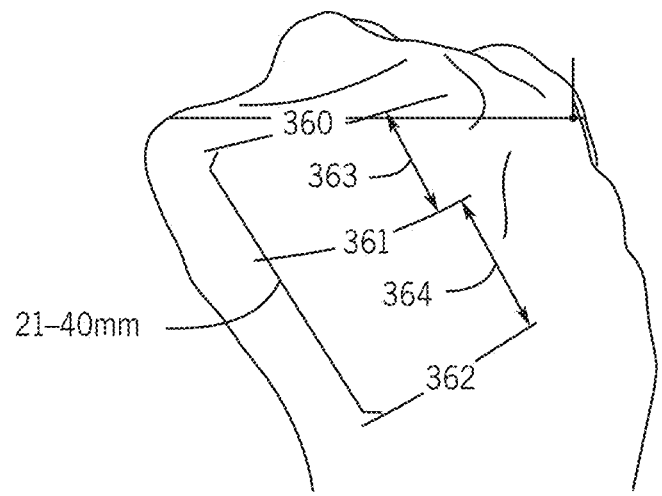
FIG. 3E is another image of a proximal section of a tibia with measurement lines shown.

Referring to FIG. 3E, medial proximal tibia (MPT) measurements may be made according to one configuration. The medial tibial plateau width 360, labelled as MPT width 1 in Table 2, extends from the most anterior point to the most medial point on the medial tibial plateau. Second MPT width 361, MPT width 2 in Table 2, may be located at the transition from the flat upper portion to the lower portion in line with Gerdy's tubercle. Third MPT width 362, MPT width 3 in Table 2, may be located at the transition area from the medial tibial head to the shaft, where a width is drawn in line with the center of the tibial tuberosity.

The length between the midpoint of medial tibial plateau width 360 and second MPT width 361 may be measured as first MPT length 363, which is labelled as MPT length 1 in Table 2. The length between the midpoint of second MPT width 361 and third MPT width 362 may be measured as second MPT length 364, which is labelled as MPT length 2 in Table 2. Using the min and max data from Table 2, the range of values for an overall length of first MPT length 363 added to second MPT length 364 may be 21-40 mm. This overall length value may be used to determine a location of a bend or junction in a plate or implant.

Figure 3F:
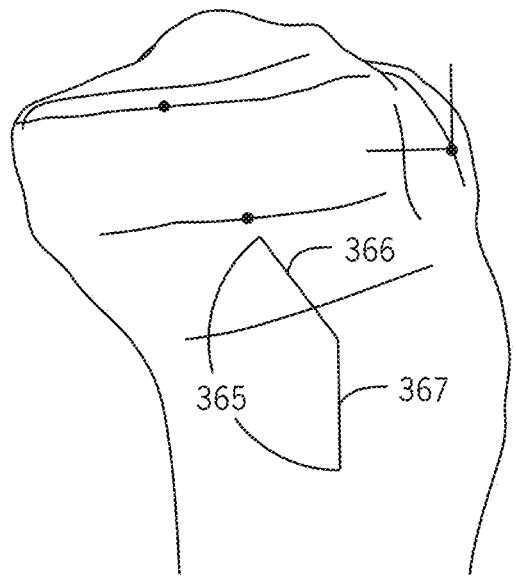
FIG. 3F is another image of a proximal section of a tibia with measurement lines shown.

Referring to FIG. 3F, the angle of the MPT 365 may be measured. A midpoint line 366 may be generated from the medial tibial plateau width 360 midpoint to the second MPT width 361 midpoint. A line along the shaft axis 367 may also be created. First MPT angle 335, listed as MPT angle 1 in Table 2, may be determined between midpoint line 366 and shaft axis 367.

Figure 3G:
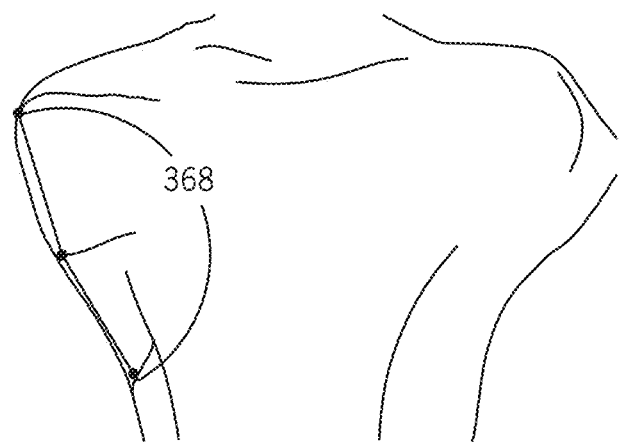
FIG. 3G is another image of a proximal section of a tibia with measurement lines shown.

Referring to FIG. 3G, the angle of the MPT in a coronal view, the XZ plane, may be measured. A second MPT angle 368, listed as MPT angle 2 in Table 2, may be created by determining the angle between the midpoint of medial tibial plateau width 360, the midpoint of second MPT width 361, and the midpoint of third MPT width 362.

Figure 3H:
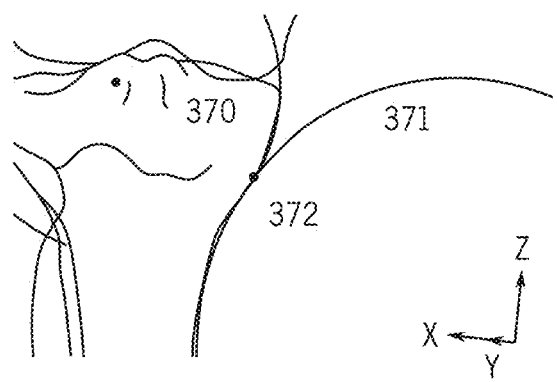
FIG. 3H is another image of a proximal section of a tibia with radius of curvature lines shown.

Referring to FIG. 3H, a radius of curvature analysis for the medial tibial epicondyle is shown. Arc 370 defines the radius of curvature of the medial tibial epicondyle on the coronal view, which is labeled as MPT ROC 1 in Table 2. Arc 371 defines the radius of curvature for the medial groove, which is labeled as MPT ROC 2 in Table 2. The arc intersection point 372 is the intersection of arcs 370 and 371.

Figure 3I:
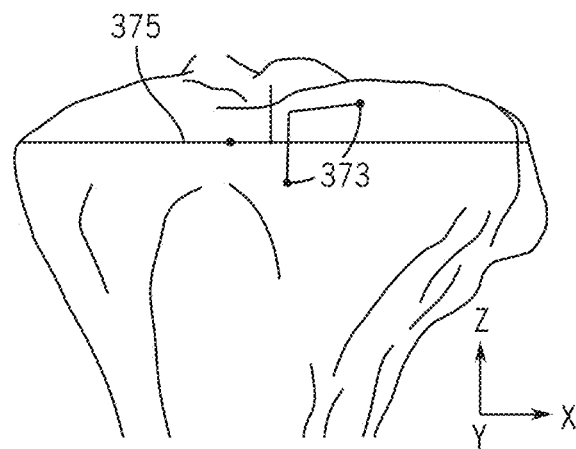
FIG. 3I is yet another image of a proximal section of a tibia with measurement lines shown.

Referring to FIG. 3I, a medial tibia shaft angle 373 may be measured by creating a plateau line 375 from the most medial to the most lateral point on the tibia plateau. The medial tibia shaft angle 373, labelled as MTS angle in Table 3, may be determined by measuring the angle between the plateau line 375 and the shaft axis in the XZ plane.

Figure 3J:
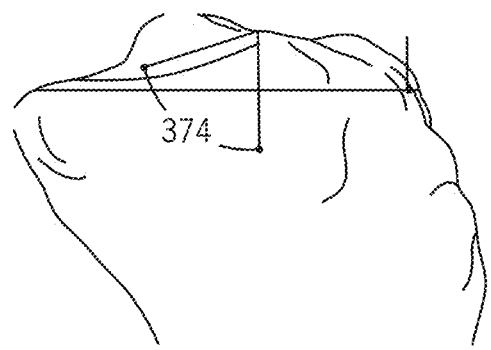
FIG. 3J is yet another image of a proximal section of a tibia with measurement lines shown.

Referring to FIG. 3J, a medial tibia plateau angle 374 may be determined. A plane may be fit to the medial tibia plateau and a line following the tibia shaft angle may be created. The medial tibia plateau angle 374, labelled as MTP angle in Table 3, may be determined between these two lines in the YZ plane.

Figure 3K:
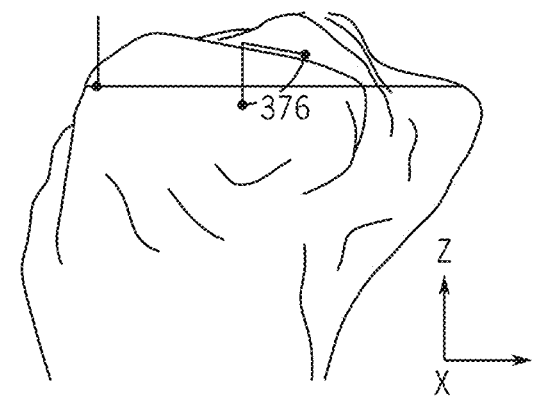
FIG. 3K is yet another image of a proximal section of a tibia with measurement lines shown.
Figure 4C:
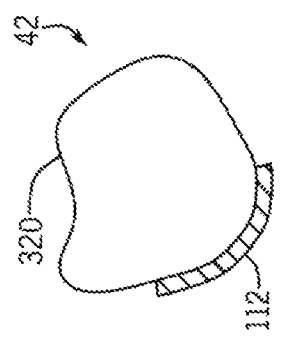
FIG. 4C shows a traced computed tomography (CT) two-dimensional (2D) CT slice in an axial viewing plane of a bone along the line 4C-4C in FIG. 2 with a periprosthetic bone plate installed.
Figure 4F:
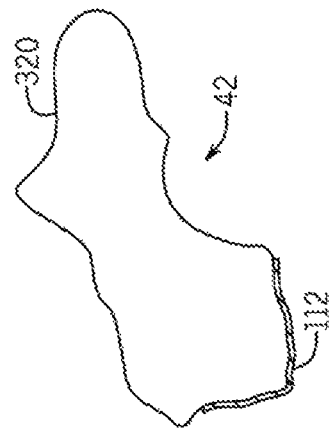
FIG. 4F shows a traced computed tomography (CT) two-dimensional (2D) CT slice in an axial viewing plane of a bone along the line 4F-4F in FIG. 2 with a periprosthetic bone plate installed.
Figure 4B:
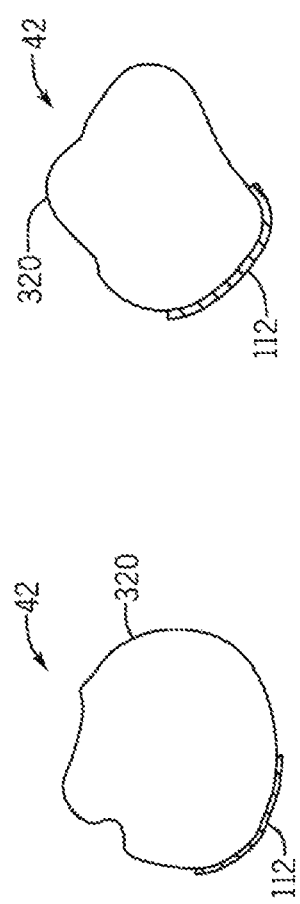
FIG. 4B shows a traced computed tomography (CT) two-dimensional (2D) CT slice in an axial viewing plane of a bone along the line 4B-4B in FIG. 2 with a periprosthetic bone plate installed.
Figure 4E:
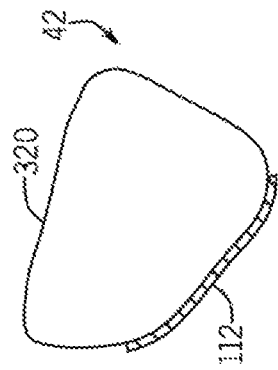
FIG. 4E shows a traced computed tomography (CT) two-dimensional (2D) CT slice in an axial viewing plane of a bone along the line 4E-4E in FIG. 2 with a periprosthetic bone plate installed.
Figure 4A:
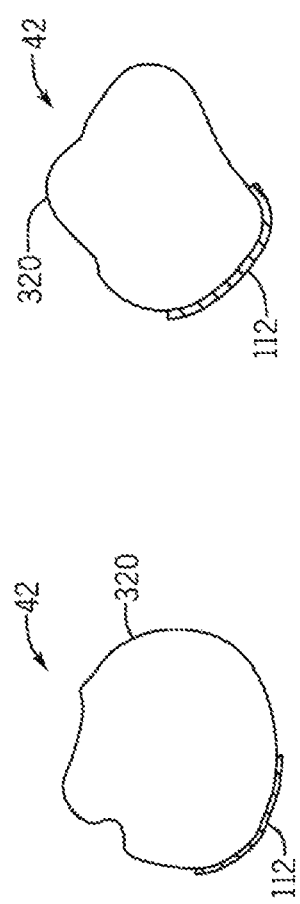
FIG. 4A shows a traced computed tomography (CT) two-dimensional (2D) CT slice in an axial viewing plane of a bone along the line 4A-4A in FIG. 2 with a periprosthetic bone plate installed.
Figure 4D:
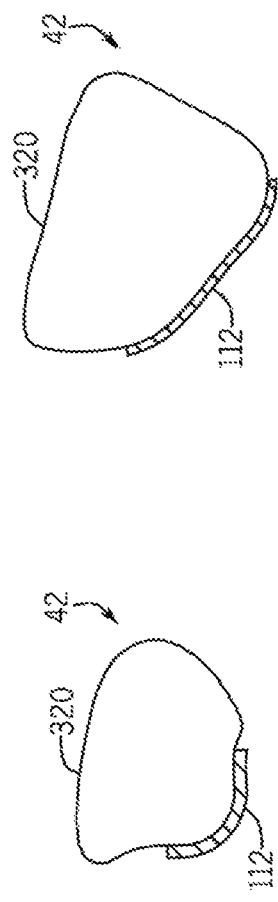
FIG. 4D shows a traced computed tomography (CT) two-dimensional (2D) CT slice in an axial viewing plane of a bone along the line 4D-4D in FIG. 2 with a periprosthetic bone plate installed.

Referring to FIG. 3K, a lateral tibia plateau angle 376 may be determined. A plane may be fit to the lateral tibia plateau and a line may be created following the tibia shaft angle. The lateral tibia plateau angle 376, labelled as LTP angle in Table 3, may be determined between the plane and line in the YZ plane.

This study was performed to further define the femur, tibia, and fibula anatomy to facilitate the design shape and size distribution of implants or plates to fix fractures, such as periprosthetic fractures. A similar methodology can be used for non-periprosthetic fractures. It is also evident that implants and plates based on the true anatomy would be beneficial in other anatomical areas including hip, knee, ankle, elbow, wrist, hand, and spine including side specific implants.

Various combinations of these measurements are used for manufacturing a prosthetic component, such as an implant or a plate in a subject (e.g., mammal). The prosthetic component may be formed from, for example: (i) a metal or metal alloy such as a titanium alloy (e.g., titanium-6-aluminum-4-vanadium), a cobalt alloy, a stainless steel alloy, or tantalum; (ii) a nonresorbable ceramic such as aluminum oxide or zirconia; (iii) a nonresorbable polymeric material such as polyethylene; or (iv) a nonresorbable composite material such as a carbon fiber-reinforced polymers (e.g., polysulfone), or a resorbable material, such as polyglycolic acid (PGA), and/or polylactic acid (PLA). The prosthetic component can be manufactured by machining an article formed from these materials, or by molding these materials in a suitable mold.

Looking at FIG. 2B, the anatomic shape can be determined by a number of steps. An image 240 of a bone 42 of a subject can be obtained in a sagittal viewing plane; in some embodiments the image 240 can be a CT image; in other embodiments the image can be an X-ray image, an ultrasonic image, a magnetic resonance image (MRI), a positron emission tomography (PET) image, or the like. The bone 42 can be a femur, tibia, fibula, and the like. In other embodiments the bone can be a radius, an ulna, or any other bone.

A longitudinal bone axis 254 can be oriented on the image 240. The longitudinal bone axis 254 may extend from intersection point 41a from FIG. 2 along a length of the bone 42 between a first border 248 and a second border 250. FIG. 2C shows one embodiment where the longitudinal bone axis 254 can follow the centerline of bone 42, defined as being a constant equal distance between the cortical bone first border 248 and the second border 250. Alternatively, longitudinal bone axis 254 may be the centerline of bone 42, being defined as a constant equal distance between the borders of the cancellous bone, which would take into account any differences with cortical bone thickness. When bone axis 254 is the centerline of the bone 42, the nonlinear shape of the axis line 254 defines the radius of curvature for the bone 42, which can be assessed at various points along the length of the bone axis line 254. The nonlinear shape of the axis line 254 can provide a number of different radii of curvature. In one non-limiting example, a first radius of curvature can transition to a second radius of curvature, and the second radius of curvature can transition to a third radius of curvature. The first radius of curvature and the third radius of curvature can be concave, while the second radius of curvature can be convex. Each radius of curvature can feature a different radius. Any number of changes in radius of curvature can be provided such that the axis line 254 is a constant equal distance between the first border 248 and the second border 250 within the intramedullary canal 90 of the cancellous bone. In one embodiment, the deviation from the straight longitudinal bone axis 254 (FIG. 2B) from the centerline following bone axis 254 (FIG. 2C) may be determined in order to indicate where over the length of the bone the area or areas of greatest bending or deflection take place. This may be used when designing plates, intramedullary nails, stems, or other implants for bends that may be needed to conform to the anatomy.

A plurality of lateral lines 258a, 258b, 258c, 258d, 258e, 258f, 258g, 258h, 258i, 258j can be oriented on the image 240 at different distances from the proximal end 243, or from point 41a. Each of the plurality of lateral lines 258a to 258j can extend perpendicularly from one of a plurality of first intersection points 262a, 262b, 262c, 262d, 262e, 262f, 262g, 262h, 262i, 262j on the first border 248 of the bone 42 to one of a plurality of second intersection points 264a, 264b, 264c, 264d, 264e, 264f, 264g, 264h, 264i, 264j intersecting the longitudinal bone axis 254 at one of a plurality of second intersection points 264a to 264j. Each of the plurality of lateral lines 258a to 258j can further extend perpendicularly from one of a plurality of second intersection points 264a to 264j on the longitudinal bone axis 254 to one of a plurality of third intersection points 268a, 268b, 268c, 268d, 268e, 268f, 268g, 268h, 268i, 268j on the second border 250 of the bone 42. The anatomic shape of the bone 42 can be extrapolated based on the plurality of first intersection points 262a to 262j, and the plurality of second intersection points 264a to 264j. Specifically, the anatomic shape of the first border 248 of the bone 42 can be extrapolated from the plurality of first intersection points 262a to 262j and the plurality of second intersection points 264a to 264j. The anatomic shape of the second border 250 of the bone 42 can be extrapolated from the plurality of second intersection points 264a to 264j and the plurality of third intersection points 268a to 268j.

In some embodiments, the plurality of lateral lines 258a to 258j can be placed at equidistant intervals distally from the proximal end 243. In some embodiments, the equidistant interval can be in a range from 0.1 to 50 millimeters. In a non-limiting embodiment, the equidistant interval can be 25 millimeters. As such, example measurements can be made at 25 millimeters, 50 millimeters, 75 millimeters, 100 millimeters, 125 millimeters, 150 millimeters, 175 millimeters, and 200 or more millimeters distal to the proximal end 243. One can add more lines to provide for determining the contour of the bone with higher resolution.

In a non-limiting example embodiment, a first reference distance can be measured for a first line 271b extending perpendicularly from a first point 262b of the plurality of first intersection points 262a to 262h to a first point 264b of the plurality of second intersection points 264a to 264h. A second reference distance can be measured of a second line 271e extending perpendicularly from a second point 262e of the plurality of first intersection points 262a to 262h to a second point 264e of the plurality of second intersection points 264a to 264h. A third reference distance can be measured of a third line 271h extending perpendicularly from a third point 262h of the plurality of first intersection points 262a to 262h to a third point 264h of the plurality of second intersection points 264a to 264h.

The anatomic shape of the first border 248 can be extrapolated based on the first reference distance of the first line 271b, the second reference distance of the second line 271e, and the third reference distance of the third line 271h. A first curvature of the anatomic shape can be extrapolated between the first point 262b of the plurality of first intersection points 262a to 262h and the second point 262e of the plurality of first intersection points 262a to 262h based on the first reference distance and the second reference distance. A second curvature of the anatomic shape can be extrapolated between the second point 262e of the plurality of first intersection points 262a to 262h and the third point 262h of the plurality of first intersection points 262a to 262h based on the second reference distance and the third reference distance.

In another version of the method of the disclosure, the anatomic shape of the first border 248 and the second border 250 together can be extrapolated based on a fourth reference distance of the lateral line 258b, a fifth reference distance of the lateral line 258e, and a sixth reference distance of the lateral line 258h. A first curvature of the anatomic shape can be extrapolated between the first point 262b of the plurality of first intersection points 262a to 262j and the second point 262e of the plurality of first intersection points 262a to 262j based on the fourth reference distance and the fifth reference distance. A second curvature of the anatomic shape can be extrapolated between the second point 262e of the plurality of first intersection points 262a to 262j and the third point 262h of the plurality of first intersection points 262a to 262j based on the fifth reference distance and the sixth reference distance.

The methods described above can facilitate the design of anatomically appropriate periprosthetic plates as well as mid-shaft plates for the femur, tibia, fibula, and the like with an appropriate shape, width, and length. The methods revealed a specific pattern and shape of the bones as noted in the figures and tables.

FIGS. 4A-4F show a series of traced computed tomography (CT) axial two-dimensional (2D) CT slices in axial viewing planes of a non-limiting example bone along the lines 4A-4A, 4B-4B, 4C-4C, 4D-4D, 4E-4E, 4F-4F respectively in FIG. 2 with an example plate, such as periprosthetic bone plate 112 installed at each location. As shown, the axial two-dimensional (2D) CT slices in axial viewing planes transition from a most proximal location in FIG. 4A to a most distal location in FIG. 4F. As shown, an outer profile 320, viewed in an axial viewing plane, of the bone 42 changes dramatically from FIG. 4A to FIG. 4F (i.e. proximal to distal). Lines 4A-4A, 4B-4B, 4C-4C, 4D-4D, 4E-4E, and 4F-4F each have corresponding planes P4A, P4B, P4C, P4D, P4E, and P4F respectively extending outwardly along the same path of lines 4A-4A, 4B-4B, 4C-4C, 4D-4D, 4E-4E, and 4F-4F respectively as depicted in FIG. 2.

One of skill in the art will appreciate that although FIGS. 4A-4F show the bone plate 112 present at each axial location, the bone plate 112 may be present in any of FIGS. 4A-4F, and may also not be present in any of FIGS. 4A-4F. The bone plate 112 can further be in some but not all views FIGS. 4A-4F. A non-limiting example could include the bone plate 112 in FIGS. 4A to 4C, and not include the bone plate 112 in FIGS. 4D to 4F. The bone plate 112 may also appear in a different location in the views or between the views of FIGS. 4A-4F due to the curvature of the plate and the desired location in regard to the associated anatomy.

The methods described above can facilitate the design of anatomically appropriate plates and/or periprosthetic plates as well as mid-shaft plates for the femur, tibia, fibula, and the like, with an appropriate shape, width, and length. This method can be automated where images are sent to a control system having a processor configured to execute a program stored thereon to automatically extract measurements of the bone 42 of the subject. An automated system may use machine learning routines to perform the measurements or to analyze the measurements for the design of plates or implants. The measurements of the bone 42 can be referenced to manufacture a 3D plate or implant that is created for a specific patient. In some embodiments, the 3D plate can be three-dimensionally manufactured using an additive manufacturing system. In some embodiments, the plate can be metal. A surgeon can then implant this patient specific implant/plate. For fracture applications, image data from an opposite extremity, e.g. an opposite, arm can be mirrored to create the plate/implant for the repair. For an implant, the stem can be similarly designed to fit the interior aspect of the bone rather than forcing a uniform cylinder into a patient's bone.

Proximal Plates

Figure 5A:
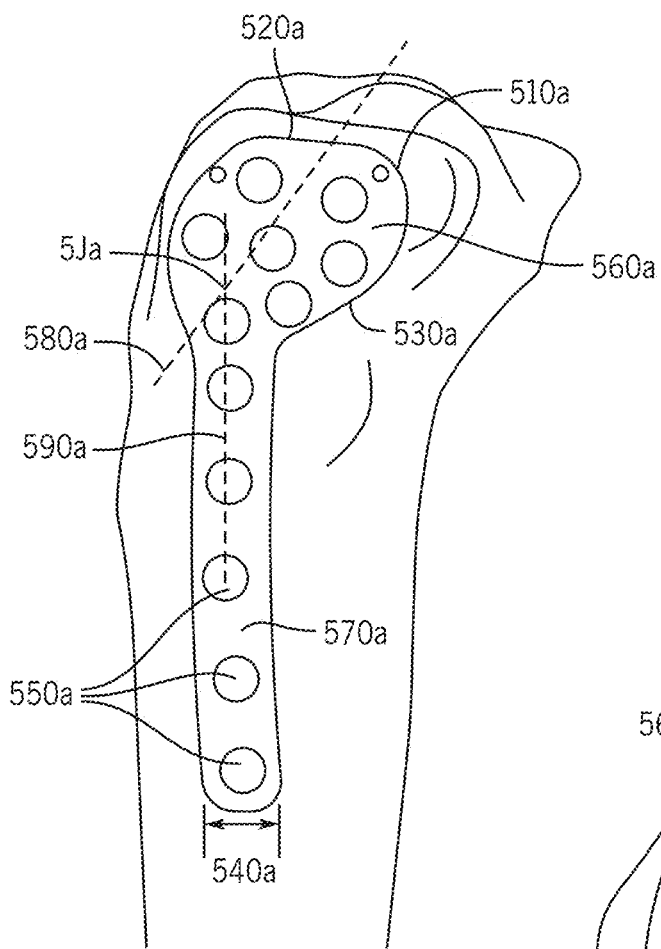
FIG. 5A shows one embodiment of a bone plate used with a tibia prosthesis.
Figure 5B:
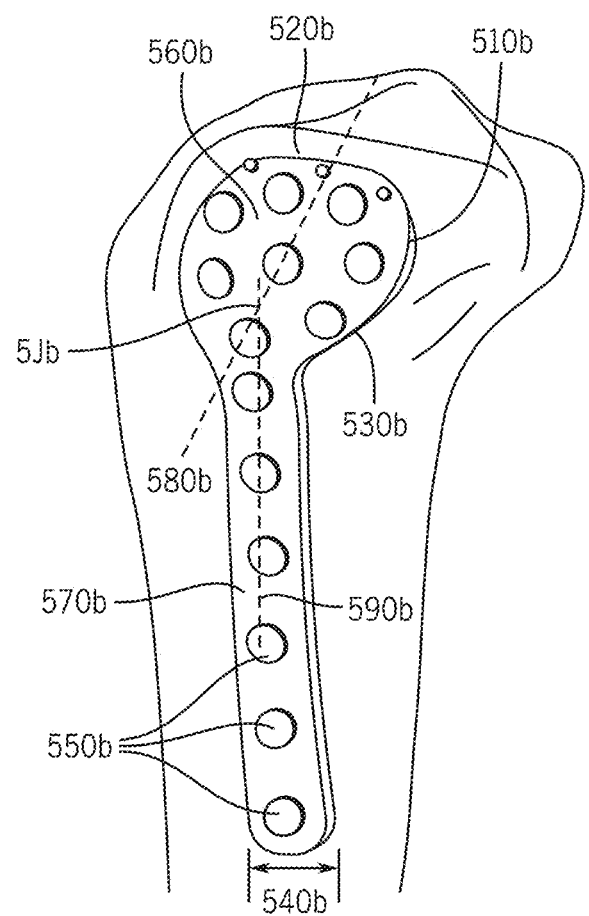
FIG. 5B shows another embodiment of a bone plate used with a tibia prosthesis.

Referring to FIGS. 5A, and 5B, in one embodiment a detailed analysis of the measurements provides for developing a plurality of different size models of plates for proximal lateral tibia plates, such as two different sizes shown in FIGS. 5A and 5B. FIG. 5A depicts the smallest size for a non-limiting example proximal lateral tibia plate, FIG. 5B depicts a largest size proximal lateral tibia plate. The models were created to test the methodology. The methodology resulted in a model that is left and right side specific. The curvature of the superior aspect of the plates 510a, and 510b, was designed to match the curvature of the anatomy at the location of the tibial plateau in such a way as to maximize contact between the plate and the bone and to prevent interference or pinching of soft tissue when a subject implanted with such a plate moves their limb. Sloped flat portion 520a, and 520b follows the anatomy of the tibial plateau where the angle was developed so that the distal aspect of the plate sits more in line with the shaft, thereby decreasing the need for muscle or tendon stripping and soft tissue detachment. Curvature 530a, and 530b blends the proximal plate portion 560a, and 560b with the distally extending plate portion 570a, and 570b that extends down the tibia distally. Proximal plate portion 560a, and 560b includes longitudinal axis 580a, and 580b and distal extending plate portion 570a, and 570b includes longitudinal axis 590a, and 590b respectively. In one configuration, axis 590a, and 590b intersects axis 580a, and 580b respectively at junction 5Ja, and 5Jb and the angle between proximal plate portion axis 580a, and 580b and distal plate portion axis 590a, and 590b is determined by the angles noted in Table 1. The location of junctions 5Ja and 5Jb may be determined by the range of lengths noted in FIG. 3A, such as being in the range of 20-52 mm, as measured from the tibia plateau to the transition from the tibia head to the tibia shaft. The location of the junctions 5Ja and 5Jb, or any other feature of the plates may be determined based upon optimizing fixation, minimizing soft tissue stripping, and the like. One aspect of the models was the ability to maximize proximal bone fixation with a plate that is anatomic in shape and in the appropriate size distribution.

Figure 5C:
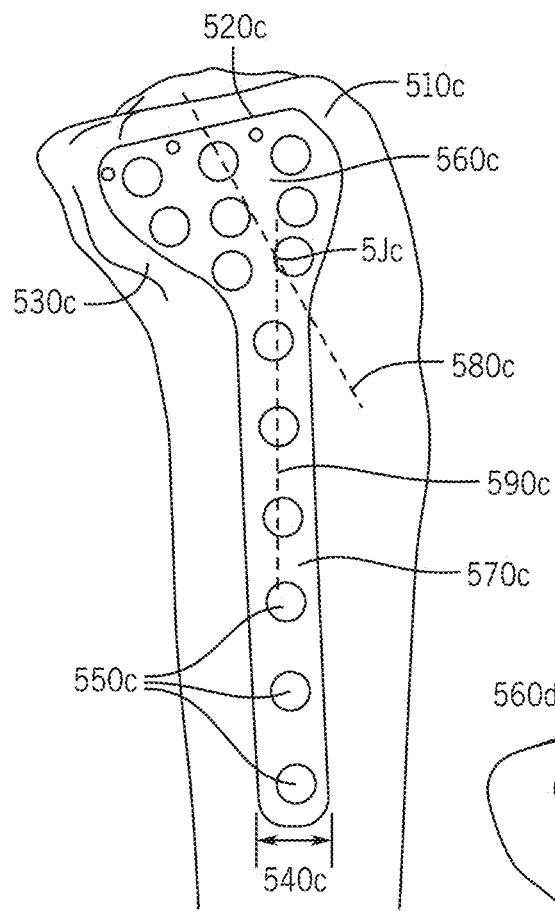
FIG. 5C shows one embodiment of a bone plate used with a tibia prosthesis.
Figure 5D:
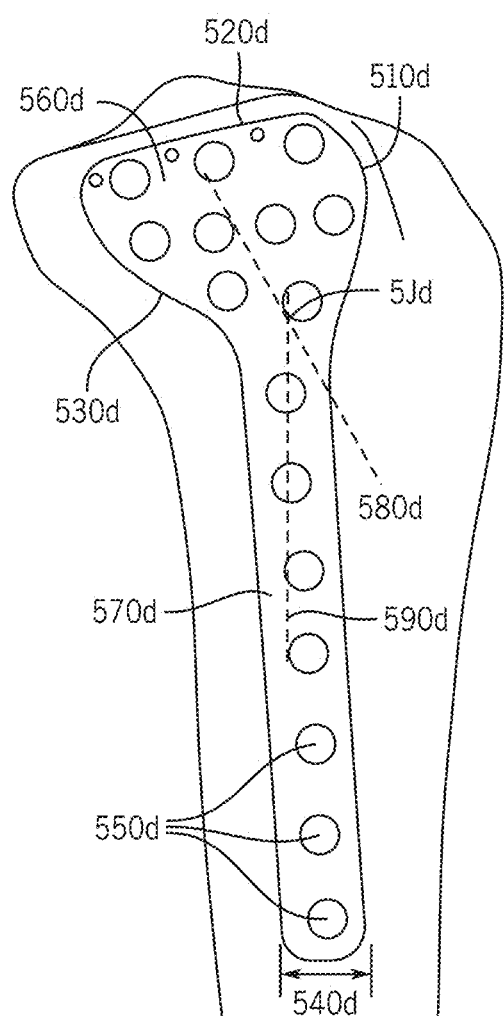
FIG. 5D shows another embodiment of a bone plate used with a tibia prosthesis.

Referring to FIGS. 5C and 5D, in one embodiment a detailed analysis of the measurements provides for developing a plurality of different size models of plates for proximal medial tibia plates, such as the two different sizes shown in FIGS. 5C and 5D. FIG. 5C depicts the smallest size for a non-limiting example proximal medial tibia plate, FIG. 5D depicts a largest size proximal medial tibia plate. The models were created to test the methodology. The methodology resulted in a model that is left and right side specific. The curvature of the superior aspect of the plates 510c, and 510d, was designed to match the curvature of the anatomy at the location of the tibial plateau in such a way as to maximize contact between the plate and the bone and to prevent interference or pinching of soft tissue when a subject implanted with such a plate moves their limb. Sloped flat portion 520c, and 520d follows the anatomy of the tibial plateau where the angle was developed so that the distal aspect of the plate sits more in line with the shaft, thereby decreasing the need for muscle or tendon stripping and soft tissue detachment. Curvature 530c, and 530d blends the proximal plate portion 560c, and 560d with the distally extending plate portion 570c, and 570d that extends down the tibia distally. Proximal plate portion 560c, and 560d includes longitudinal axis 580c, and 580d and distal extending plate portion 570c, and 570d includes longitudinal axis 590c, and 590d respectively. In one configuration, axis 590c, and 590d intersects axis 580c, and 580d respectively at junction 5Jc, and 5Jd and the angle between proximal plate portion axis 580c, and 580d and distal plate portion axis 590c, and 590d is determined by the angles noted in Table 2. The location of junctions 5Jc and 5Jd may be determined by the range of lengths noted in FIG. 3E, such as being in the range of 21-40 mm, as measured from the tibia plateau to the transition from the tibia head to the tibia shaft. The location of the junctions 5Jc and 5Jd, or any other feature of the plates may be determined based upon optimizing fixation, minimizing soft tissue stripping, and the like. One aspect of the models was the ability to maximize proximal bone fixation with a plate that is anatomic in shape and in the appropriate size distribution.

An important aspect of fixation of proximal tibia fractures is related to the ability to maximize fixation in the proximal tibia region corresponding to proximal plate portion 560a, 560b, 560c, and 560d. Holes for providing attachment to the bone include screw holes 550a, 550b, 550c, and 550d, which aid in providing fixation between the plate and the bone. Screws, pins, bolts, cerclage, and the like may be used to attach the plate to the bone and may use the screw holes 550a, 550b, 550c, and 550d. It will be appreciated that different numbers and sizes of screw holes could be used depending upon the desired amount of fixation and hardware available. The large majority of available plates only have one size plate width for the proximal tibia region. This is the area where fracture fixation most commonly fails. In addition, this is the region where non-anatomic plates contribute to malposition of the fragments as well as the need for more soft tissue disruption to place the plates. The proximal shape of the models can be extended a variable distance distally down the shaft, corresponding to distally extending plate portion 570a, 570b, 570c, and 570d, based on the length of fracture propagation distally and the length of the plate desired by the company or surgeon. Width 540a, 540b, 540c, and 540d may also be selected to address a distal fracture.

In one embodiment, the anterior to posterior slope 520a, 520b, 520c, and 520d of the most proximal aspect of the plate was designed based on the natural curvature of the tibia plateau. This anatomic shape optimizes plate-bone contact, maximizes the ability of the plate to cradle and support the proximal tibia region, increases the number of proximal screws to improve fixation while at the same time minimizing impingement. In FIGS. 5A-D, each of the plates has an optimized number of screw holes 550a, 550b, 550c, and 550d located proximally to maximize fixation in the appropriately sized patient. FIG. 5A features 6 screw holes 550a in the proximal plate portion 560a, while FIG. 5B features 7 screw holes 550b in proximal portion 560b. FIG. 5C and FIG. 5D reflect a similar increase in screw holes with increasing size of the proximal plate portion. A user has flexibility in choosing the specific screw holes 550a, 550b, 550c, and 550d utilized. The non-limiting examples shown in FIGS. 5A-D highlight the benefits of the methodology and the potential to maximize fixation and tailor to different size patients.

In one embodiment, the methodology also resulted in defining the arcs of curvature of the proximal tibia region, improving the ability of the plate to be appropriately placed on the bone minimizing the need for plate bending and importantly, malpositioning the fracture in regard to angulation. This can be seen in FIG. 3D.

Figure 6:
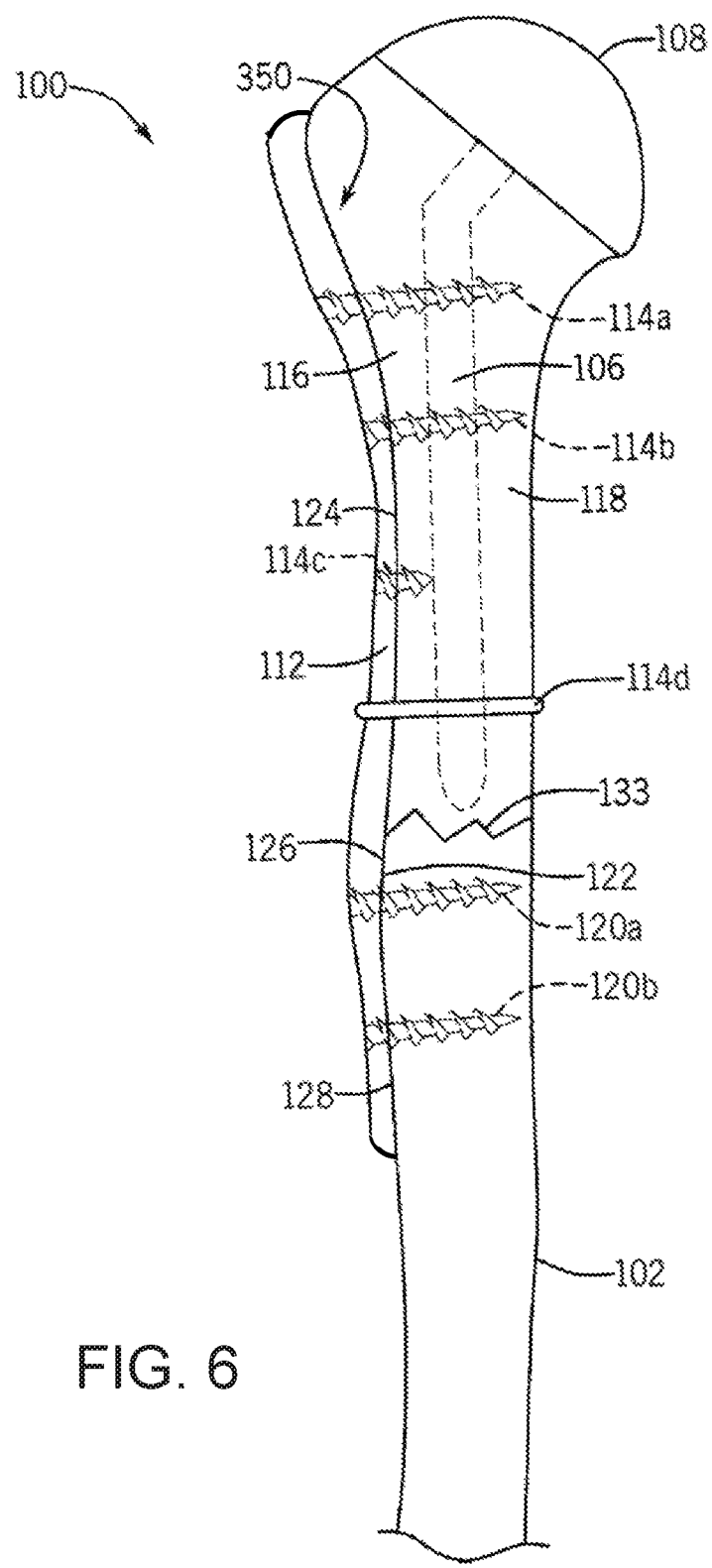
FIG. 6 shows one embodiment of a bone plate used with a prosthesis in a profile viewing plane.

Referring to FIG. 6, a non-limiting embodiment of a periprosthetic bone plate 112 that can be designed using the method of the disclosure viewed in a profile viewing plane is shown. An example periprosthetic treatment system 100 is shown in a bone 102 having a fracture 133. The periprosthetic treatment system 100 includes a stem 106 that extends into a bore formed within the bone 102. The bone 102 can be the tibia, femur, fibula, and the like. Typically, the stem 106 is fixed within the bore formed within the bone 102. A generally hemispherical head 108 is connected to the stem 106. The stem 106 can be monolithic with the head 108, or the stem 106 and the head 108 can be formed as separate parts. The hemispherical head 108 can articulate with a complementary concave section of a component that is fixed within an opposing bone cavity using cemented or uncemented posts. One skilled in the art would appreciate that other prostheses, such as reverse arthroplasty, hemi arthroplasty, stemless arthroplasty, resurfacing, elbow prostheses and the like may be suitable for use with example bone plate 112.

The periprosthetic treatment system 100 further includes a periprosthetic bone plate 112. The periprosthetic bone plate 112 may be formed according to any of the methods described above such that the periprosthetic bone plate 112 is formed to conform to the anatomy of the subject. The periprosthetic bone plate 112 may further include openings for receiving one or more periprosthetic fasteners 114a-114d. The one or more periprosthetic fasteners 114a-114d can extend through the periprosthetic bone plate 112, through a first portion 116 of the bone 102, to the side of the stem 106, and may extend into a second portion 118 of the bone 102. The one or more periprosthetic fasteners 114a-114d may also be short enough to only extend into a first portion 116 of the bone 102. In some embodiments, at least one of the one or more periprosthetic fasteners 114a-114d may also be a cable that extends around the periprosthetic bone plate 112 and the bone 102. As shown, the periprosthetic fasteners 114 are configured to secure the periprosthetic bone plate 112 to the bone 102. The periprosthetic treatment system 100 may also include one or more fasteners 120a, 120b that extend through the periprosthetic bone plate 112 into the bone 102. In some non-limiting embodiments, the one or more fasteners 120a, 120b can be positioned distally to the one or more periprosthetic fasteners 114a-114d. In other embodiments, the fasteners 120a, 120b can be positioned proximally to the periprosthetic fasteners 114a-114d. The periprosthetic fasteners 114a-114d and the fasteners 120a, 120b can be any appropriate mechanical fastening elements, for example, bone screws, wires, cables etc.

As shown, the periprosthetic plate 112 is designed to be anatomically correct for the bone depicted. A bone interface surface 122 of the periprosthetic plate 112 at a proximal portion 124 of the periprosthetic plate 112 may be convex to accommodate the shape of the bone 102. The bone interface surface 122 can transition from convex at the proximal portion 124 to be concave at an intermediate portion 126 of the periprosthetic plate 112 to accommodate the shape of the bone. The bone interface surface 122 can transition from concave at the intermediate portion 126 to be convex at a distal portion 128 of the periprosthetic plate 112 to accommodate the shape of the bone. In one embodiment, periprosthetic plate 112 is designed to be anatomically correct using the curvature analysis information according to FIG. 3D to maximize contact between the bone 102 and the plate 112 and thereby minimizing the bone interface surface 122.

Figure 7:
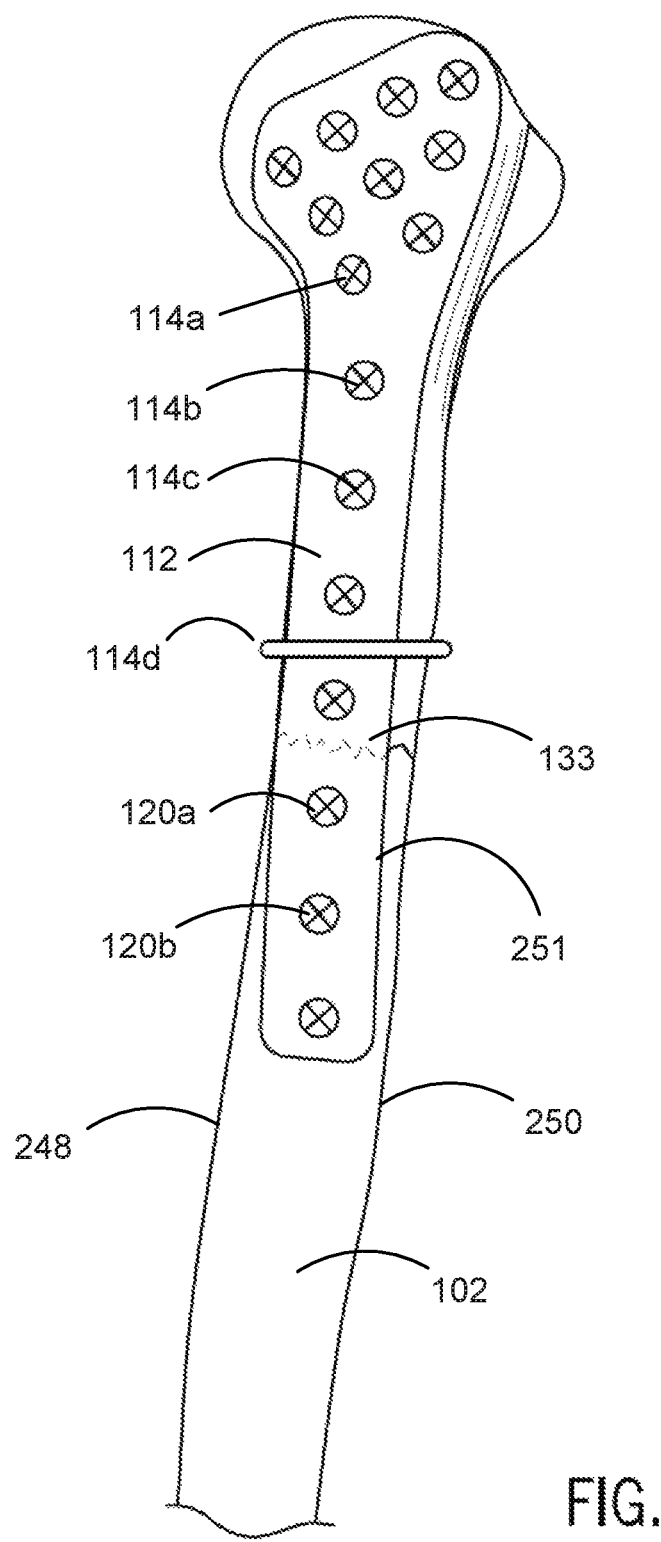
FIG. 7 shows one embodiment of a bone plate used with a prosthesis in a face-viewing plane.

FIG. 7 shows the non-limiting embodiment of a periprosthetic bone plate 112 that can be designed using the method of the disclosure of FIG. 6 viewed in a face-viewing plane.

Figure 8:
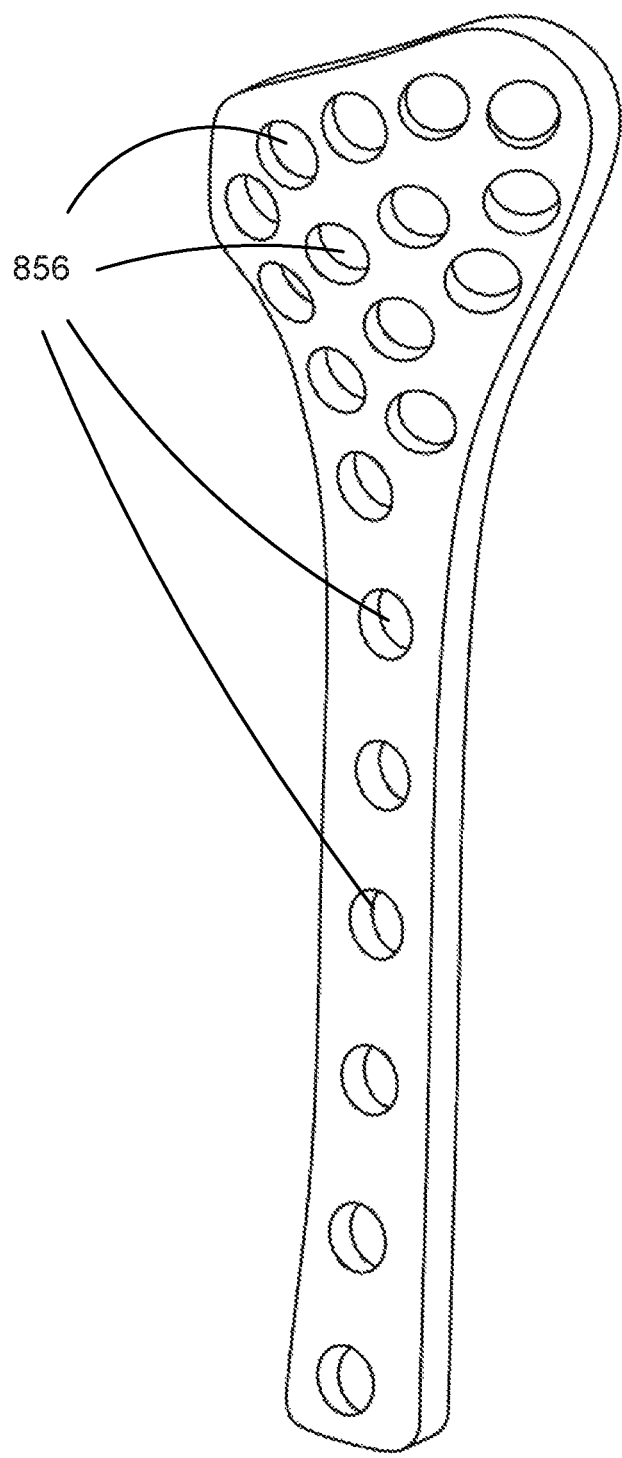
FIG. 8 shows a perspective view of one embodiment of a plate, such as a periprosthetic bone plate.

Looking at FIGS. 6 to 8, the periprosthetic bone plate 112 can be contoured in multiple degrees of freedom. Specifically, the three-dimensional (3D) anatomy of the bone 42 of the subject is taken into account with the contours of the periprosthetic bone plate 112 as well as the relevant soft-tissue anatomy. The periprosthetic bone plate 112 may be contoured in multiple degrees of freedom. Non limiting examples of shapes that can characterize the periprosthetic bone plate include spiral, double curve, bone wrapping/hugging, and others. Accordingly, the periprosthetic bone plate 112 can have varying thickness at different locations along the plate (see also FIGS. 4A-4F). In some embodiments, it may be desirable to have a greater thickness of a periprosthetic bone plate generally for male subjects and a generally thinner thickness periprosthetic bone plate for female subjects.

In some embodiments the periprosthetic plate 112 can be an elongated plate dimensioned for placement on the bone 42 across the fracture 133, the periprosthetic plate 112 having a bone interface surface 251 that faces the bone 42 when the plate 112 is placed on the bone 42 across the fracture 133.

In a non-limiting embodiment, the bone interface surface 251 can have a proximal region proximal to a first plane transverse to the elongated plate (e.g., P4C as shown in FIG. 2), a distal region distal to a second plane transverse to the elongated plate (e.g., P4D as shown in FIG. 2), and a midshaft region positioned between the first plane (e.g., P4C) and the second plane (e.g., P4D).

The bone interface surface 251 can have a shape that transitions from a first curvature that is convex or concave at a proximal portion of the plate 112 to a second curvature at a second portion of the plate 112 longitudinally adjacent to the proximal portion of the plate. The second curvature can be convex when the first curvature is concave, and the second curvature being concave when the first curvature is convex. In some embodiments, the first curvature can be convex. The shape of the bone interface surface 251 can transition from the second curvature to a third curvature at a distal portion of the plate 112 longitudinally adjacent to the second portion of the plate 112, the third curvature being convex when the second curvature is concave, and the third curvature being concave when the second curvature is convex.

The proximal region of the bone interface surface 251 can conform to a bone surface proximal to the first plane (e.g., P4C). The distal region of the bone interface surface 251 can conform to a bone surface distal to the second plane (e.g., P4D). The midshaft region of the bone interface surface 251 can conform to a bone surface between the first plane (e.g., P4C) and the second plane (e.g., P4D). A second proximal region of the bone interface surface 251 can conform to a bone surface proximal to the first plane (e.g., P4C) and distal to the proximal region (e.g., between P4B and P4C). A second distal region of the bone interface surface 251 can conform to a bone surface distal to the second plane (e.g., P4D) and proximal to the distal region (e.g., between P4D and P4E). As such, the proximal region can be positioned proximal to the second proximal region (e.g., between P4A and P4B), and the distal region can be positioned distal to the second distal region (e.g., between P4E and P4F).

In some embodiments, the plate 112 can include a plurality of openings 856 for receiving bone engaging fasteners (periprosthetic fasteners 114a-114d) therethrough. The plate 112 can be a proximal short periprosthetic plate formed for a short stem of the prosthesis with a minimal distal fracture extension. Additional openings 856 for receiving bone engaging fasteners are depicted in FIG. 8.

In some embodiments, the plate 112 can be a proximal long periprosthetic plate formed for at least one of short stems of the prosthesis with a distal fracture extension and a regular length stem of the prosthesis with a minimal distal extension.

In some embodiments, the plate 112 can be a short distal periprosthetic plate formed for a short stem of the prosthesis, with a minimal proximal fracture extension.

In some embodiments, the plate 112 can be a long distal periprosthetic plate, formed for a short stem of the prosthesis used with at least one of a total arthroplasty with a proximal fracture extension and a regular length stem of the prosthesis used with a total arthroplasty with a minimal proximal fracture extension.

In some embodiments, the plate 112 can be a midshaft periprosthetic plate formed for at least one of a regular length stem of the prosthesis with a minimal fracture extension and a midshaft non-periprosthetic fracture.

In some embodiments, the plate 112 can be a full-length periprosthetic plate formed for fractures that encompass a significant portion of the bone, including highly comminuted fractures.

In some embodiments, a device for treating a fracture between a proximal section of a bone and a distal section of the bone is provided. The device can comprise a prosthesis 100 configured to be implanted in a bone 42; and an elongated plate 112 dimensioned for placement on the bone 42 across the fracture 133. The plate 112 can have a bone interface surface 251 that faces the bone 42 when the plate 112 is placed on the bone 42 across the fracture 133. The bone interface surface 251 can have a shape that transitions from a first curvature that is convex or concave at a proximal portion of the plate 112 to a second curvature at a second portion of the plate 112 longitudinally adjacent to the proximal portion of the plate 112, the second curvature being convex when the first curvature is concave, and the second curvature being concave when the first curvature is convex.

Distal Tibia Measurements

The methods described above can facilitate the design of anatomically appropriate periprosthetic plates as well as mid-shaft bone plates for the femur, tibia, fibula, and the like with an appropriate shape, width, and length. The method may be applied to the distal tibia, as well as the distal femur and distal fibula, and the like. One skilled in the art will understand that the measurement provided here can be obtained in any order and not all measurements may be needed depending upon the device being designed or the intervention being considered. Table 4 includes non-limiting example anterolateral distal tibia measurements. Table 5 includes non-limiting example anteromedial distal tibia measurements.

area to the end of the anterior surface and is also normal to the shaft axis. Third ALDT width 379, labelled as ALDT width 3 in Table 4, may be located following second ALDT Width 378 from the medial edge to the point where the medial malleolus ends.

The length between the midpoints of anterolateral distal tibial width 377 and second ALDT width 378 may be measured as first ALDT length 380, which is labelled as ALDT length 1 in Table 4. The length between the midpoint of third ALDT width 379 and the most distal point on the bone may be measured as second ALDT length 381, which is labelled as ALDT length 2 in Table 4. Using the min and max data from Table 4, the range of values for an overall length of first ALDT length 380 added to second ALDT length 381 may be 17-34 mm. This overall length value may be used to determine a location of a bend or junction in a plate or implant.

Figure 9A:
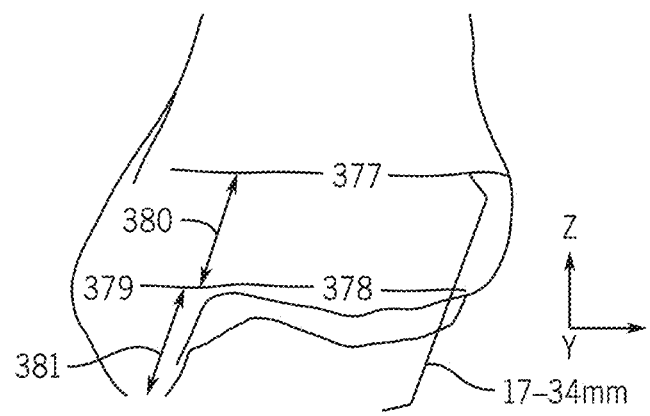
FIG. 9A shows a non-limiting example anterolateral distal tibia with measurement lines shown.
Figure 9B:
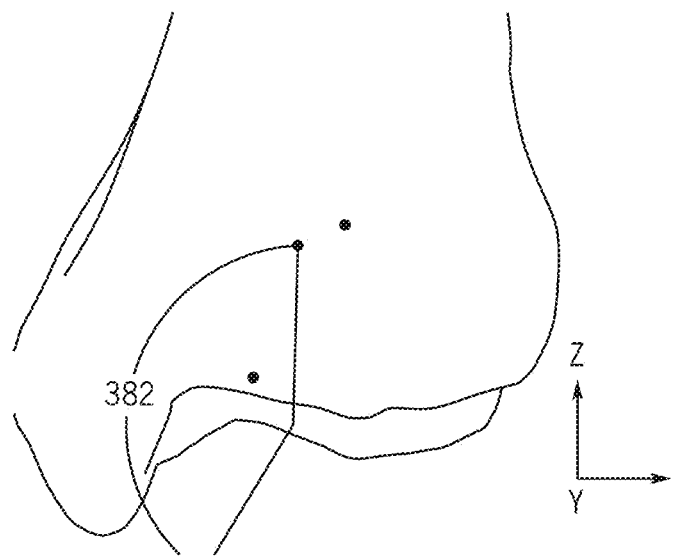
FIG. 9B shows the non-limiting example anterolateral distal tibia of FIG. 9A with the angle measurement lines shown.

Referring to FIG. 9B, the angle of the ALDT 382 may be measured. Angle of the ALDT 382, labelled as ALDT angle 1 in Table 4, may be created using the anterolateral distal tibial width 377 midpoint, the second ALDT width 378 midpoint, and the shaft axis in the XZ plane.

Figure 9C:
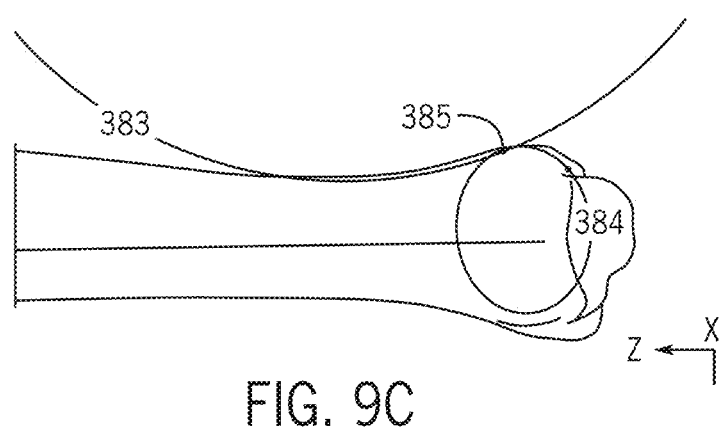
FIG. 9C shows the non-limiting example anterolateral distal tibia of FIG. 9A with the radius of curvature measurement lines shown.

Referring to FIG. 9C, a radius of curvature analysis for the ALDT is shown. Arc 383 defines the radius of curvature of the ALDT in a coronal view, which is labeled as ALDT ROC 1 in Table 4. Arc 384 defines the radius of curvature for the

TABLE 4

Anterolateral Distal Tibia Measurements

|  | 25% | 50% | 75% | Min | Max | Mean | STDEV |
|---|---|---|---|---|---|---|---|
| ALDT Width 1 [mm] | 47.76 | 52.03 | 54.66 | 39.32 | 65.54 | 51.81 | 5.63 |
| ALDT Width 2 [mm] | 48.92 | 51.12 | 53.39 | 42.06 | 67.92 | 51.55 | 5.06 |
| ALDT Width 3 [mm] | 14.14 | 15.25 | 16.45 | 10.63 | 22.35 | 15.35 | 2.17 |
| ALDT Length 1 [mm] | 10.85 | 12.53 | 13.50 | 6.73 | 16.03 | 12.24 | 2.25 |
| ALDT Length 2 [mm] | 11.90 | 13.33 | 14.37 | 10.90 | 17.76 | 13.48 | 1.81 |
| ALDT Angle 1 [°] | 150.38 | 153.93 | 156.37 | 139.77 | 165.94 | 153.63 | 5.31 |
| ALDT ROC 1 [mm] | 120.52 | 162.74 | 233.20 | 83.79 | 975.32 | 207.41 | 162.98 |
| ALDT ROC 2 [mm] | 17.04 | 15.00 | 13.01 | 9.31 | 24.27 | 15.36 | 3.13 |

TABLE 5

Anteromedial Distal Tibia Measurements

|  | 25% | 50% | 75% | Min | Max | Mean | STDEV |
|---|---|---|---|---|---|---|---|
| AMDT Width 1 [mm] | 25.64 | 27.74 | 30.34 | 22.69 | 35.23 | 28.32 | 3.29 |
| AMDT Width 2 [mm] | 19.41 | 21.21 | 23.62 | 15.67 | 29.94 | 21.67 | 3.02 |
| AMDT Length 1 [mm] | 10.84 | 12.16 | 13.53 | 6.69 | 16.25 | 12.16 | 2.18 |
| AMDT Length 2 [mm] | 12.56 | 13.88 | 14.70 | 10.96 | 18.50 | 13.92 | 1.69 |
| AMDT Angle 1 [°] | 131.22 | 135.24 | 139.34 | 119.60 | 159.61 | 135.52 | 7.23 |
| AMDT Angle 2 [°] | 144.40 | 150.35 | 154.99 | 125.48 | 167.17 | 149.33 | 8.99 |
| AMDT Angle 3 [°] | 165.54 | 167.27 | 168.72 | 159.83 | 172.41 | 166.92 | 2.70 |
| AMDT ROC 1 [mm] | 77.61 | 103.85 | 115.58 | 48.45 | 158.91 | 103.27 | 28.40 |
| AMDT ROC 2 [mm] | 13.61 | 15.38 | 17.66 | 9.95 | 27.75 | 16.32 | 4.14 |

Anterolateral Distal Tibia Measurements

Referring to FIG. 9A, anterolateral distal tibia (ALDT) measurements may be made according to one configuration. The anterolateral distal tibial width 377, labelled as ALDT width 1 in Table 4, extends from the most lateral edge of the anterior distal tibia to the opposite side of the bone and is normal to the shaft axis. Second ALDT width 378, labelled as ALDT width 2 in Table 4, may be located at the widest part of medial malleolus by passing along the ankle contact end of the bone, which is labeled as ALDT ROC 2 in Table 4. The arc intersection point 385 is the intersection of arcs 383 and 384.

Anteromedial Distal Tibia Measurements

Figure 9D:
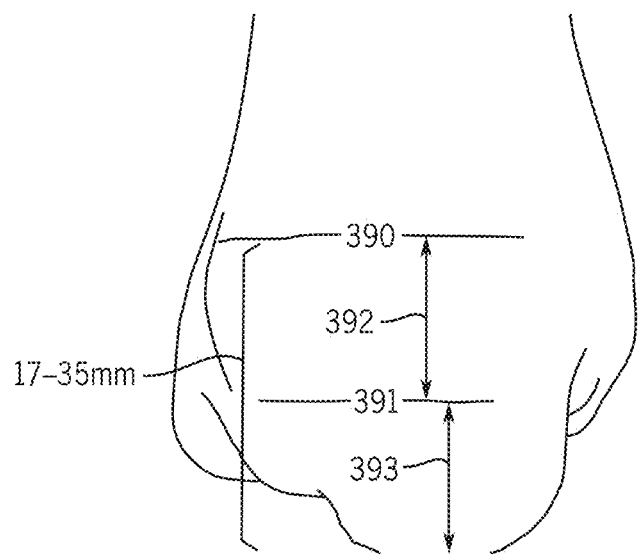
FIG. 9D shows a non-limiting example anteromedial distal tibia with measurement lines shown.

Referring to FIG. 9D, anteromedial distal tibia (AMDT) measurements may be made according to one configuration. The anteromedial distal tibial width 390, labelled as AMDT width 1 in Table 5, measures across the widest portion of the distal anteromedial tibia. Second AMDT width 391, labelled as AMDT width 2 in Table 5, may be located across the area just proximal to the medial malleolus.

The length between the midpoints of anteromedial distal tibial width 390 and second AMDT width 391 may be measured as first AMDT length 392, which is labelled as AMDT length 1 in Table 5. The length between the midpoint of second AMDT width 391 and the most distal point of the medial malleolus may be measured as second AMDT length 393, which is labelled as AMDT length 2 in Table 5. Using the min and max data from Table 5, the range of values for an overall length of first AMDT length 392 added to second AMDT length 393 may be 17-35 mm. This overall length value may be used to determine a location of a bend or junction in a plate or implant.

Figure 9E:
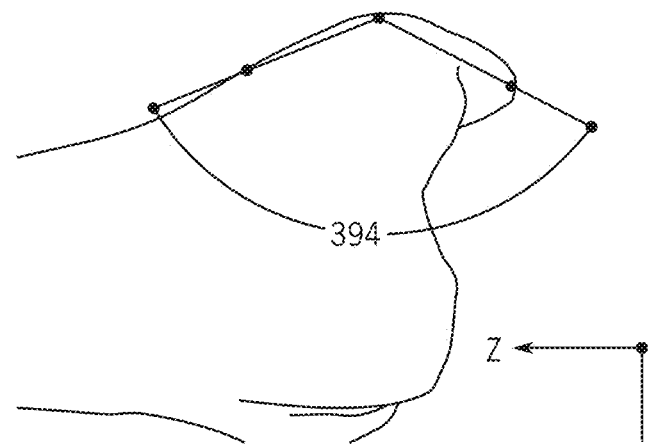
FIG. 9E shows the non-limiting example anteromedial distal tibia of FIG. 9D with the angle measurement lines shown.

Referring to FIG. 9E, the angle of the medial malleolus may be measured as AMDT medial malleolus angle 394. AMDT medial malleolus angle 394, labelled as AMDT angle 1 in Table 5, may be created following the bend in the medial malleolus from the anteromedial distal tibial width 390 midpoint, the second AMDT width 391 midpoint, and the most distal point measured in the XZ plane.

Figure 9F:
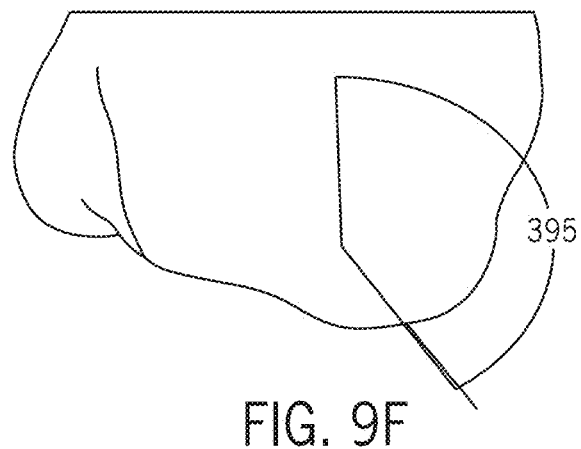
FIG. 9F shows another view of the non-limiting example anteromedial distal tibia of FIG. 9D with the angle measurement lines shown.

Referring to FIG. 9F, the angle of the medial malleolus in another view may be measured as second AMDT medial malleolus angle 395. Second AMDT medial malleolus angle 395, labelled as AMDT angle 2 in Table 5, may be created from the second AMDT width 391 midpoint, the most distal point of the medial malleolus, and the shaft axis in the YZ plane.

Figure 9G:
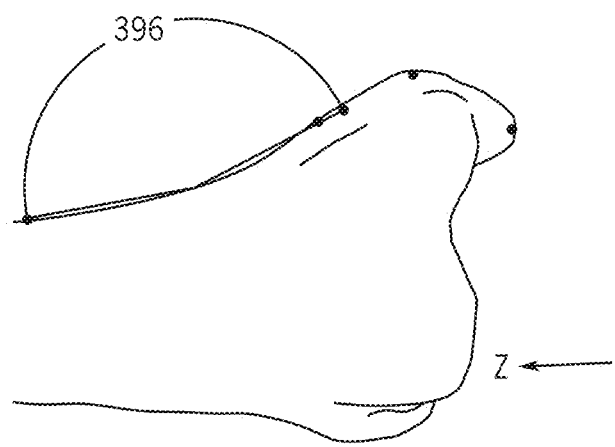
FIG. 9G shows yet another view of the non-limiting example anteromedial distal tibia of FIG. 9D with the angle measurement lines shown.

Referring to FIG. 9G, the angle of the medial malleolus in yet another view may be measured as third AMDT medial malleolus angle 396. Third AMDT medial malleolus angle 396, labelled as AMDT angle 3 in Table 5, may be created from the shaft to the proximal medial malleolus measured in the XZ plane.

Figure 9H:
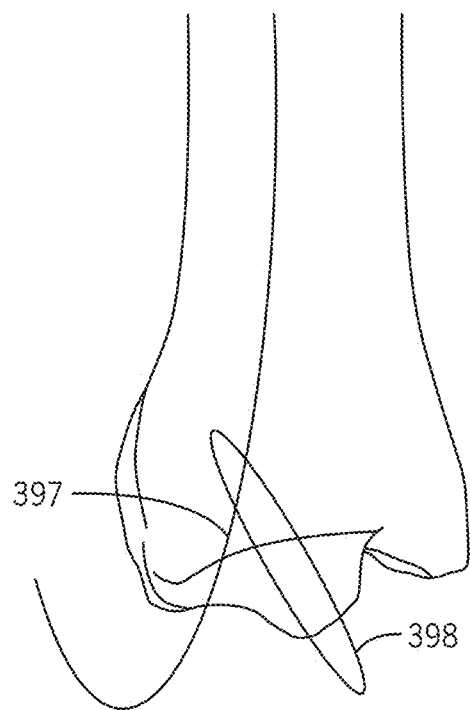
FIG. 9H shows the non-limiting example anteromedial distal tibia of FIG. 9D with the radius of curvature measurement lines shown.

Referring to FIG. 9H, a radius of curvature analysis for the AMDT is shown. Arc 397 defines the radius of curvature of the AMDT along the side of the bone, which is labeled as AMDT ROC 1 in Table 5. Arc 398 defines the radius of curvature for the end of the bone, which is labeled as AMDT ROC 2 in Table 5.

Distal Femur Measurements

As described above, the method may be applied to the distal femur. Table 6 includes non-limiting example lateral distal femur measurements.

as FLE width 1 in Table 6, measures across the femoral lateral epicondyle and may be created by forming two circles on the posterior side using concave up and concave down curves. The point of inflection between the curves may then be used to draw first FLE width 1010 perpendicular to the shaft axis. Second FLE width 1020, labelled as FLE width 2 in Table 6, may be parallel to the first FLE width 1010 and located at the most anterior point of the lateral distal femur from the most anterior point to the most lateral point of the lateral condyle.

The length between the midpoint of first FLE width 1010 and the midpoint of second FLE width 1020 may be measured as first FLE length 1030, which is labelled as FLE length 1 in Table 6. The length between the midpoint of second FLE width 1020 and the most distal point of the lateral condyle may be measured as second FLE length 1040, which is labelled as FLE length 2 in Table 6. Using the min and max data from Table 6, the range of values for an overall length of first FLE length 1030 added to second FLE length 1040 may be 37-76 mm. This overall length value may be used to determine a location of a bend or junction in a plate or implant.

Figure 10A:
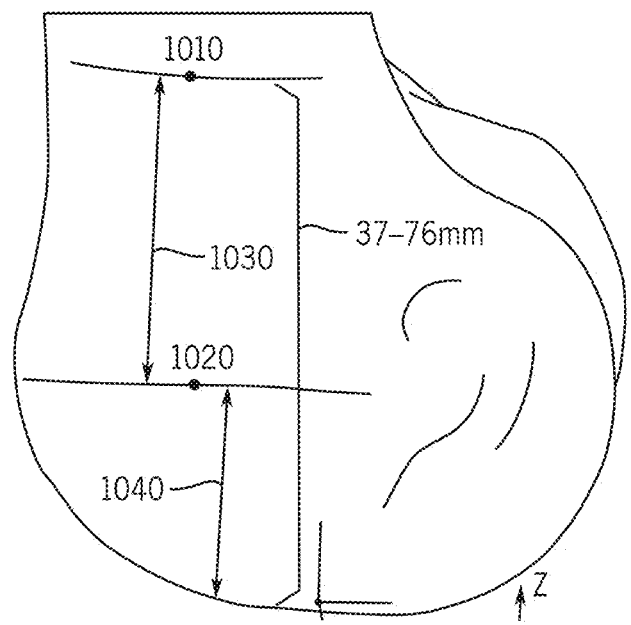
FIG. 10A shows a non-limiting example distal femur with measurement lines shown.
Figure 10B:
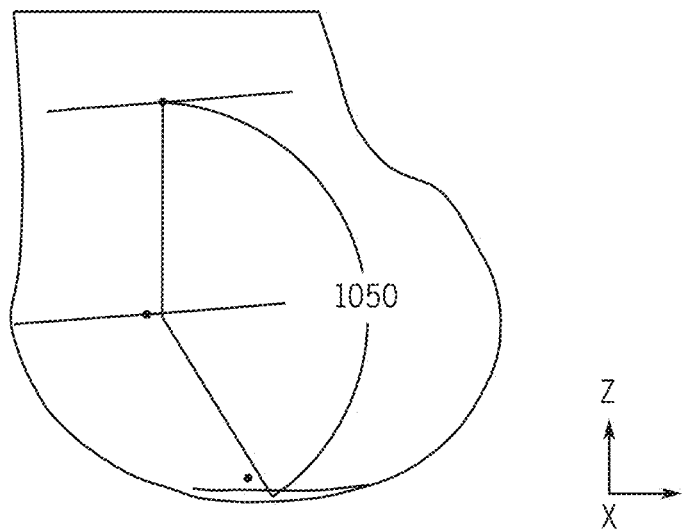
FIG. 10B shows the non-limiting example distal femur of FIG. 10A with angle measurement lines shown.

Referring to FIG. 10B, a first angle of the femoral lateral condyle may be measured as first FLE angle 1050. First FLE angle 1050, labelled as FLE angle 1 in Table 6, may be created following the shaft axis and from the second FLE width 1020 midpoint and the most distal point of the femur measured in the YZ plane.

Figure 10C:
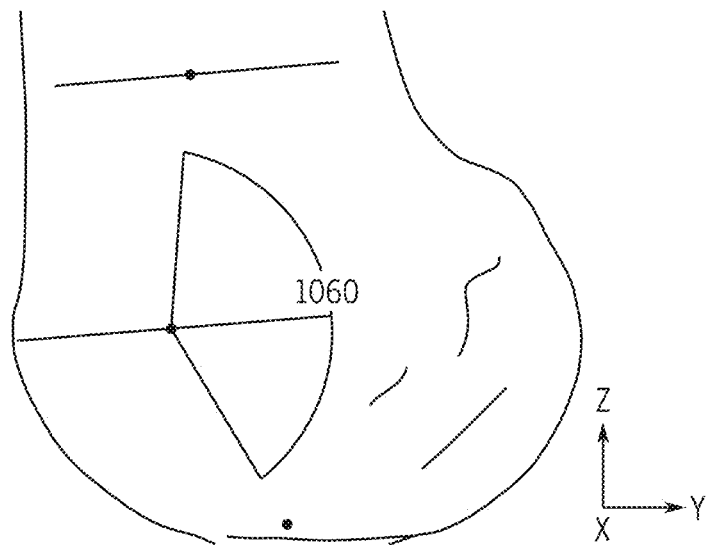
FIG. 10C shows another view of the non-limiting example distal femur of FIG. 10A with angle measurement lines shown.

Referring to FIG. 10C, a second angle of the femoral lateral condyle may be measured as second FLE angle 1060. Second FLE angle 1060, labelled as FLE angle 2 in Table 6, may be created using the first FLE width 1010 midpoint, the second FLE width 1020 midpoint, and the most distal point of the femur.

Figure 10D:
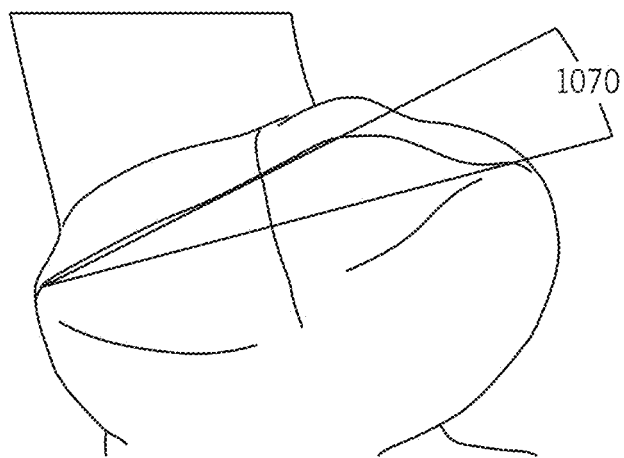
FIG. 10D shows yet another view of the non-limiting example distal femur of FIG. 10A with angle measurement lines shown.

Referring to FIG. 10D, a first FLE tilt angle 1070 may be measured. First FLE tilt angle 1070, labelled as FLE angle 4 in Table 6, may be created by using second FLE Width 1020 and measuring the angle of the medial condyle up to the most medial point, as depicted in FIG. 10D.

Figure 10E:
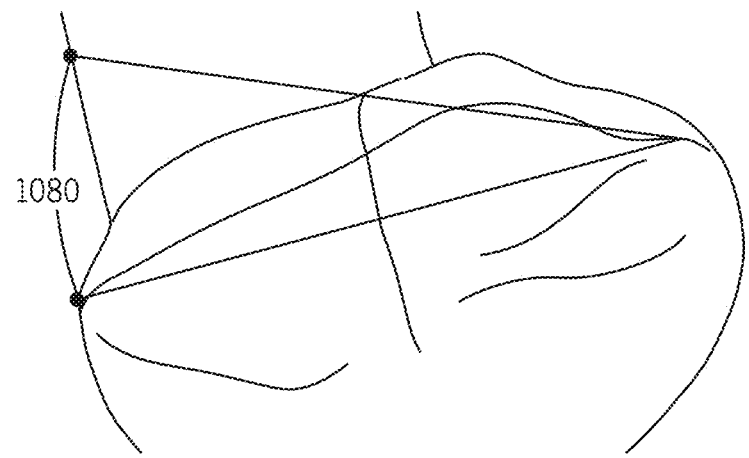
FIG. 10E shows yet another view of the non-limiting example distal femur of FIG. 10A with angle measurement lines shown.

Referring to FIG. 10E, a second FLE tilt angle 1080 may be measured. Second FLE tilt angle 1080, labelled as FLE angle 5 in Table 6, may be created by using second FLE Width 1020 and measuring the angle of the medial condyle from the posterior side to the most medial point, as depicted in FIG. 10E.

TABLE 6

| Lateral Distal Femur Measurements | | | | | | | |
|---|---|---|---|---|---|---|---|
| | 25% | 50% | 75% | Min | Max | Mean | STDEV |
| Total Femur Length [mm] | 411.06 | 434.38 | 468.34 | 371.23 | 511.61 | 438.48 | 36.16 |
| FLE Width 1 [mm] | 25.63 | 28.06 | 31.19 | 21.86 | 41.10 | 28.65 | 4.39 |
| FLE Width 2 [mm] | 42.92 | 45.49 | 48.99 | 38.11 | 56.50 | 46.30 | 4.32 |
| FLE Length 1 [mm] | 28.58 | 32.30 | 35.11 | 22.67 | 44.50 | 32.56 | 5.07 |
| FLE Length 2 [mm] | 19.96 | 21.43 | 23.53 | 14.43 | 30.69 | 22.01 | 3.19 |
| FLE Angle 1 [°] | 151.15 | 155.07 | 158.32 | 142.50 | 168.23 | 154.96 | 5.20 |
| FLE Angle 2 [°] | 144.40 | 147.73 | 151.72 | 139.62 | 155.25 | 147.97 | 4.19 |
| FLE Angle 4 [°] | 12.69 | 13.71 | 15.10 | 8.97 | 17.32 | 13.76 | 1.89 |
| FLE Angle 5 [°] | 26.90 | 29.01 | 32.60 | 21.16 | 39.48 | 29.74 | 4.20 |
| FLE ROC 1 [mm] | 117.78 | 139.74 | 166.89 | 67.38 | 305.94 | 149.65 | 50.91 |
| FLE ROC 2 [mm] | 41.64 | 47.28 | 54.89 | 29.44 | 82.43 | 49.30 | 10.95 |

Figure 10F:
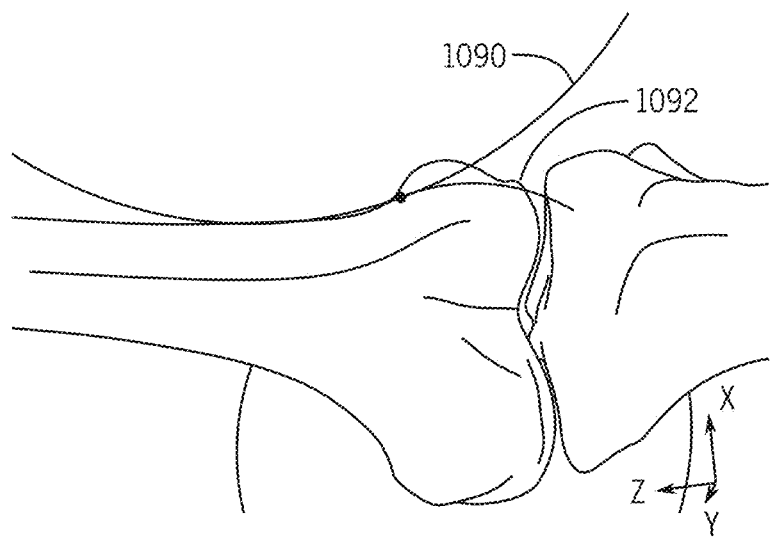
FIG. 10F shows the non-limiting example distal femur of FIG. 10A with the radius of curvature measurement lines shown.

Referring to FIG. 10A, femoral lateral epicondyle (FLE) measurements may be made according to one configuration of the present disclosure. The first FLE width 1010, labelled Referring to FIG. 10F, a radius of curvature analysis for the FLE is shown. Arc 1090 defines the radius of curvature of the distal FLE along the side of the bone, which is labeled as FLE ROC 1 in Table 6. Arc 1092 defines the radius of curvature for the end of the bone, which is labeled as FLE ROC 2 in Table 6.

Distal Fibula Measurements

As described above, the method may be applied to the distal fibula. Table 7 includes non-limiting example distal fibula measurements.

TABLE 7

Distal Fibula Measurements

|  | 25% | 50% | 75% | Min | Max | Mean | STDEV |
|---|---|---|---|---|---|---|---|
| Total Length [mm] | 341.99 | 359.90 | 392.81 | 312.33 | 438.88 | 368.10 | 33.28 |
| FIB Width 1 [mm] | 39.65 | 42.79 | 47.10 | 36.11 | 53.98 | 43.71 | 4.47 |
| FIB Width 2 [mm] | 33.90 | 36.26 | 39.28 | 29.14 | 44.83 | 36.52 | 3.84 |
| FIB Length 1 [mm] | 9.41 | 10.58 | 11.52 | 7.07 | 15.71 | 10.76 | 1.68 |
| FIB Length 2 [mm] | 8.00 | 8.88 | 9.87 | 5.13 | 12.95 | 9.06 | 1.70 |
| FIB Angle 1 [°] | 141.87 | 147.66 | 153.85 | 129.52 | 176.29 | 148.20 | 9.12 |
| FIB Angle 2 [°] | 146.09 | 155.11 | 160.28 | 122.55 | 179.62 | 153.33 | 12.12 |
| FIB ROC 1 [mm] | 13.10 | 13.76 | 15.04 | 10.23 | 18.20 | 14.01 | 1.69 |
| FIB ROC 2 [mm] | 10.42 | 11.37 | 12.11 | 8.68 | 14.68 | 11.40 | 1.25 |

Figure 11A:
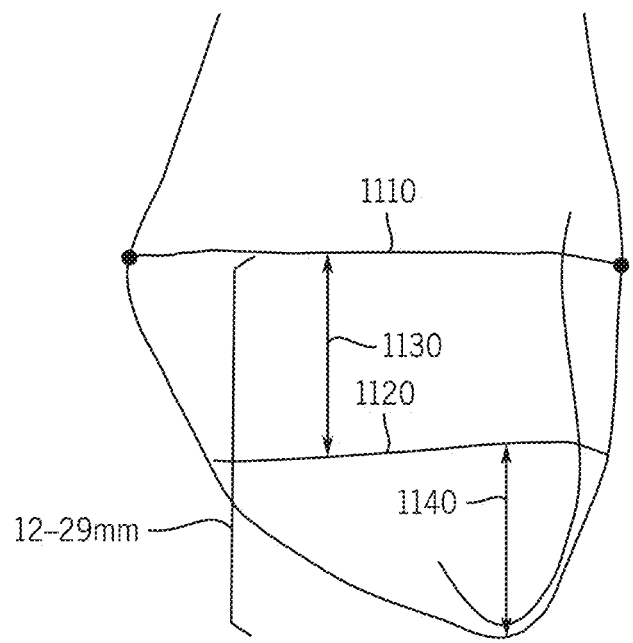
FIG. 11A shows a non-limiting example fibula with measurement lines shown.

Referring to FIG. 11A, distal fibula (FIB) measurements may be made according to one configuration of the present disclosure. The first FIB width 1110, labelled as FIB width 1 in Table 7, may be created by a line from the most anterior point on the lateral face to the most medial point on the posterior face, with the line being normal to the shaft axis at the widest point of the bone. Second FIB width 1120, labelled as FIB width 2 in Table 7, may be parallel to the first FIB width 1110 and located at the lowest point of the malleolar fossa from the most anterior point on the lateral face to the most medial point on the posterior face that is normal to the shaft axis.

The length between the midpoint of first FIB width 1110 and the midpoint of second FIB width 1120 may be measured as first FIB length 1130, which is labelled as FIB length 1 in Table 7. The length between the midpoint of second FIB width 1120 and the most distal point of the bone in the z plane may be measured as second FIB length 1140, which is labelled as FIB length 2 in Table 7. Using the min and max data from Table 7, the range of values for an overall length of first FIB length 1130 added to second FIB length 1140 may be 12-29 mm. This overall length value may be used to determine a location of a bend or junction in a plate or implant.

Figure 11B:
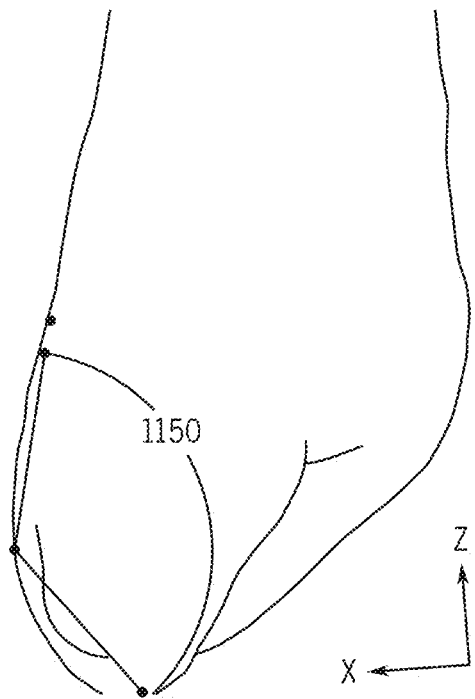
FIG. 11B shows the non-limiting example fibula of FIG. 11A with angle measurement lines shown.

Referring to FIG. 11B, a first angle of the fibula may be measured as first FIB angle 1150. First FIB angle 1150, labelled as FIB angle 1 in Table 7, may be created using the first FIB width 1110 midpoint, the second FIB width 1120 midpoint, and the most distal point of the fibula measured in the XZ plane.

Figure 11C:
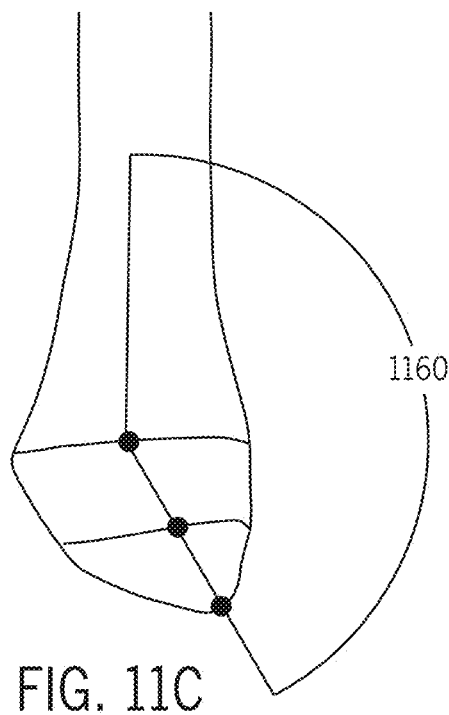
FIG. 11C shows another view of the non-limiting example fibula of FIG. 11A with angle measurement lines shown.

Referring to FIG. 11C, a second angle of the fibula may be measured as second FIB angle 1160. Second FIB angle 1160, labelled as FIB angle 2 in Table 7, may be created following the shaft axis and from the first FIB width 1110 midpoint and the most distal point of the fibula measured in the YZ plane.

Figure 11D:
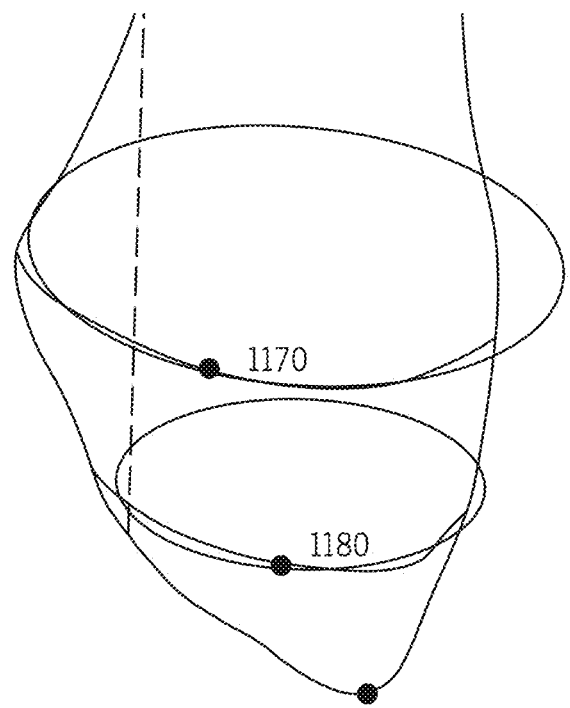
FIG. 11D shows the non-limiting example fibula of FIG. 11A with radius of curvature measurement lines shown.

Referring to FIG. 11D, a radius of curvature analysis for the fibula is shown. Arc 1170 defines the radius of curvature for a circle fit to the first FIB width 1110, which is labeled as FIB ROC 1 in Table 7. Arc 1180 defines the radius of curvature for a circle fit to second FIB width 1120, which is labeled as FIB ROC 2 in Table 7.

Distal Plates

Figure 13C:
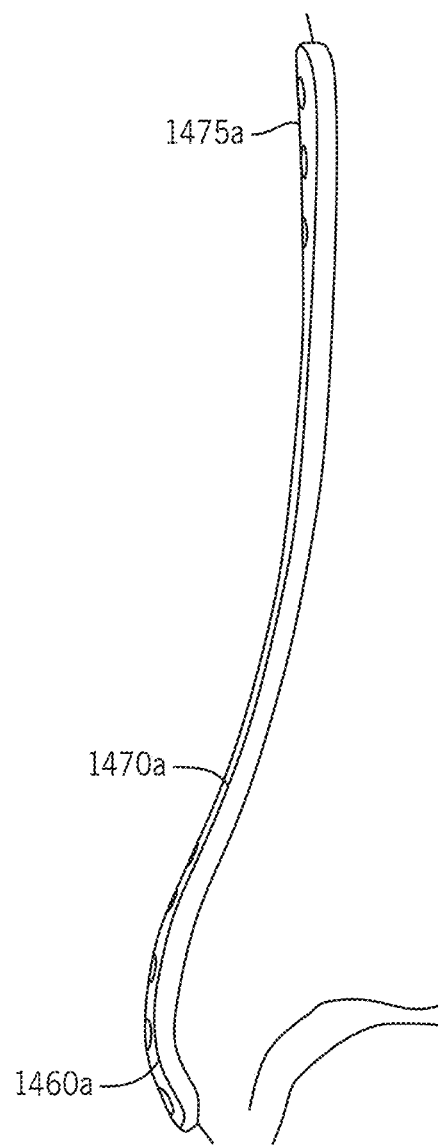
FIG. 13C shows a profile view of the non-limiting example plate of FIG. 13A.
Figure 14C:
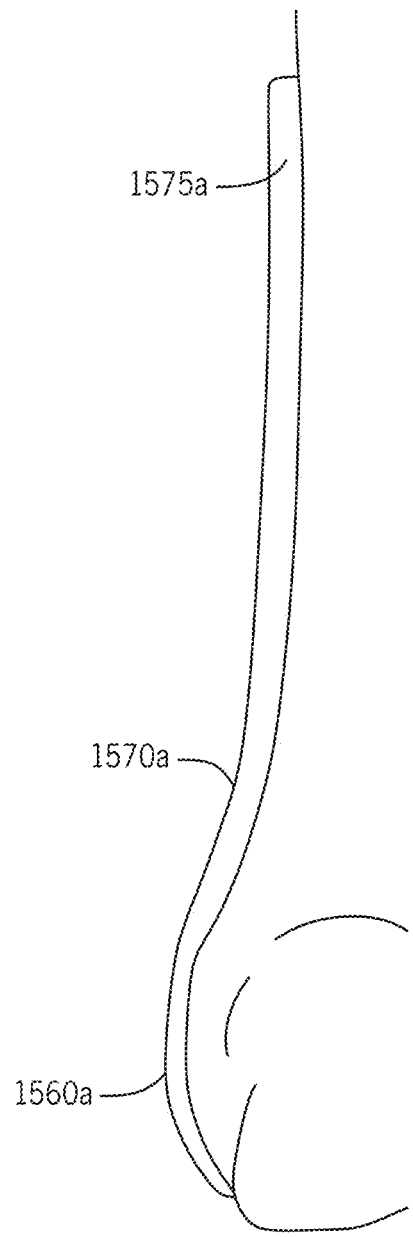
FIG. 14C shows a profile view of the non-limiting example plate of FIG. 14A.
Figures 15A, 15B:
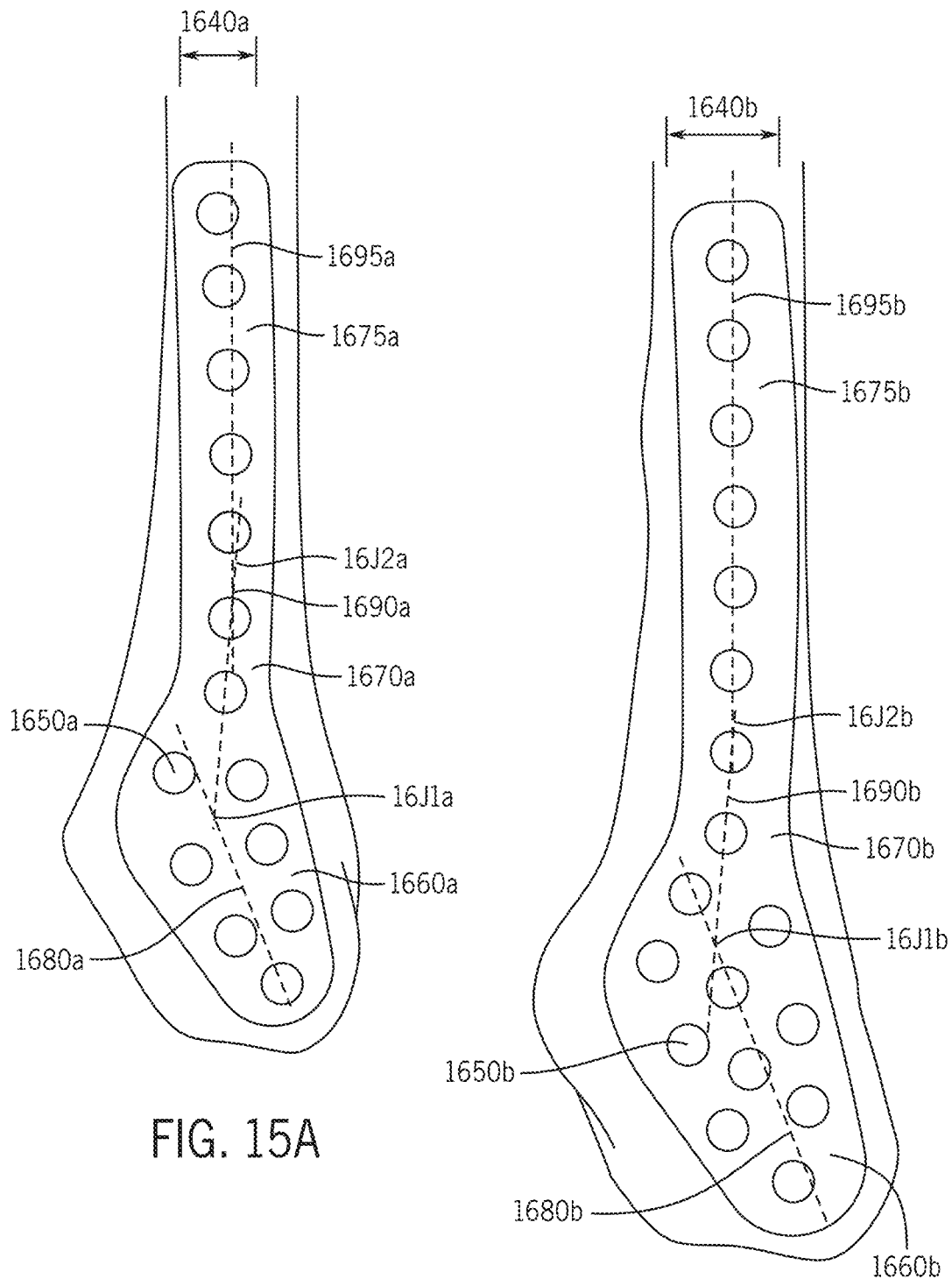
FIG. 15A shows a non-limiting example plate for use with a distal fibula.
FIG. 15B shows a larger size of the non-limiting example plate of FIG. 15A for use with a distal fibula.
Figure 15C:
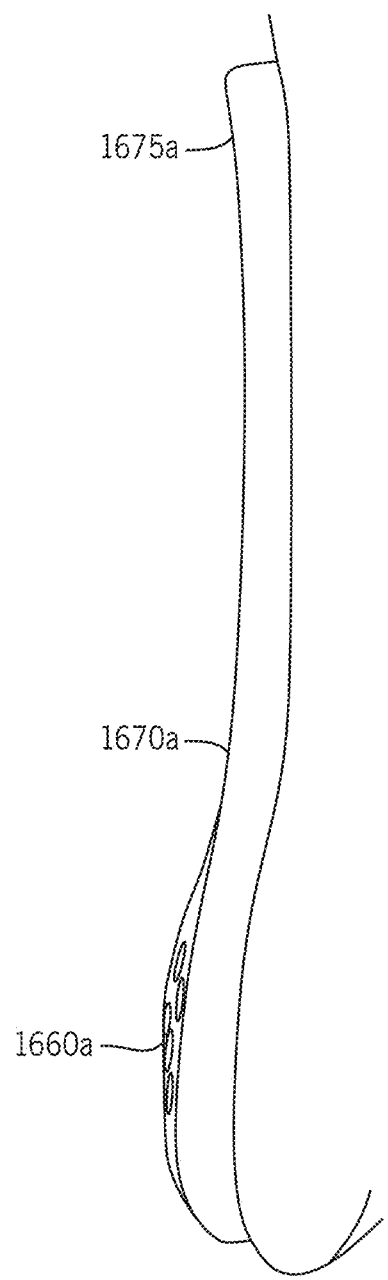
FIG. 15C shows a profile view of the non-limiting example plate of FIG. 15A.

Referring to FIGS. 12A-15C, in one configuration the methodology facilitates developing different size plate models for the distal femur, tibia, and fibula: anterolateral tibia (FIGS. 12A-12C), anteromedial tibia (FIGS. 13A-13C), femur (FIGS. 14A-14C), and fibula (FIGS. 15A-15C). The non-limiting example models were created to test the methodology. In the present example, the methodology resulted in a model that is left and right side specific. One aspect of the models was the ability to maximize distal bone fixation with a plate that is anatomic in shape and in the appropriate size distribution.

One aspect of fixation of distal fractures is related to the ability to maximize fixation in the distal region, corresponding to distal plate portions 1360a and 1360b, 1460a and 1460b, 1560a and 1560b, and 1660a and 1660b respectively. This is the area where fracture fixation most commonly fails. In addition, this is the region where non-anatomic plates contribute to malposition of the fragments, painful prominence of the plates under the skin, as well as the need for more soft tissue disruption to place the plates. The shape of the models can be extended a variable distance proximally up the bone shaft with plate extension portion 1370a and 1370b, 1470a and 1470b, 1570a and 1570b, and 1670a and 1670b based on the length of fracture propagation and the length of the plate desired by the company or surgeon.

The shape of the most distal aspect of the plates was designed based on the natural curvature of the bone. This anatomic shape optimizes plate-bone contact, maximizes the ability of the plate to cradle and support the distal bone region, increases the number of distal screws to improve fixation while at the same time minimizing plate which can cause soft tissue pain and nerve irritation. One can see that each of the two size plates has an optimized number of distal screw holes to maximize fixation in the appropriately sized patient. This is a significant improvement in current designs that have only one size width plate.

The methodology also resulted in defining the arcs of curvature of the distal bone region improving the ability of the plate to be appropriately placed on the bone minimizing the need for plate bending or importantly, malpositioning the fracture in regard to angulation. In addition, specific angles were developed so that the proximal aspect of the plate sits more in line with the bone shaft, thereby decreasing the need for soft tissue detachment.

Figure 12A:
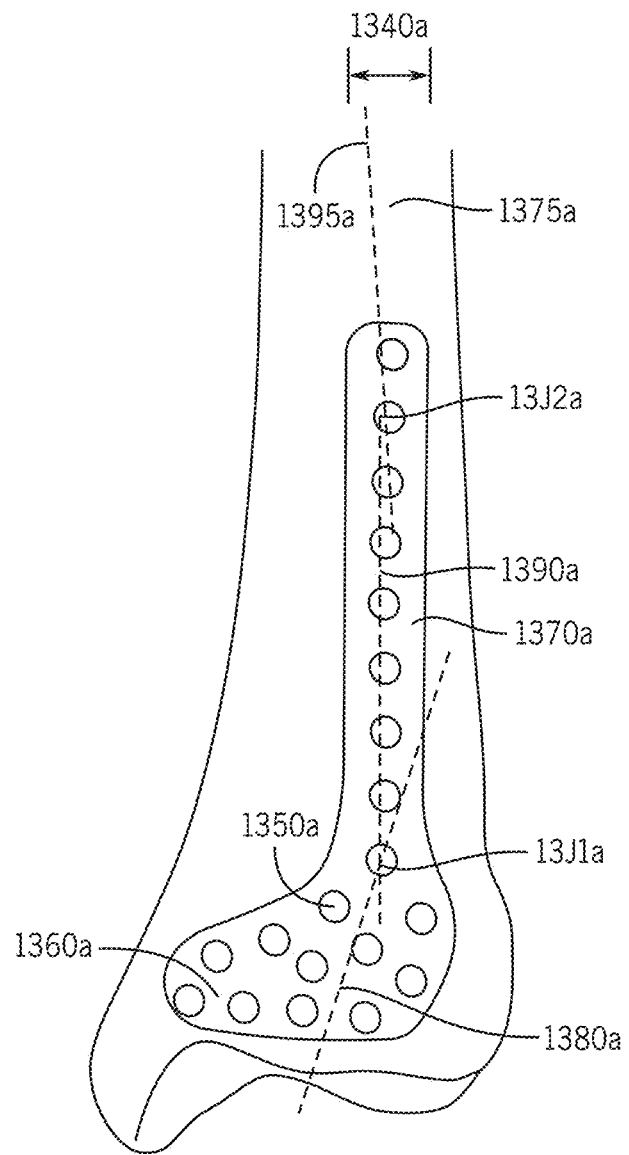
FIG. 12A shows a non-limiting example plate for use with an anterolateral distal tibia.
Figure 12B:
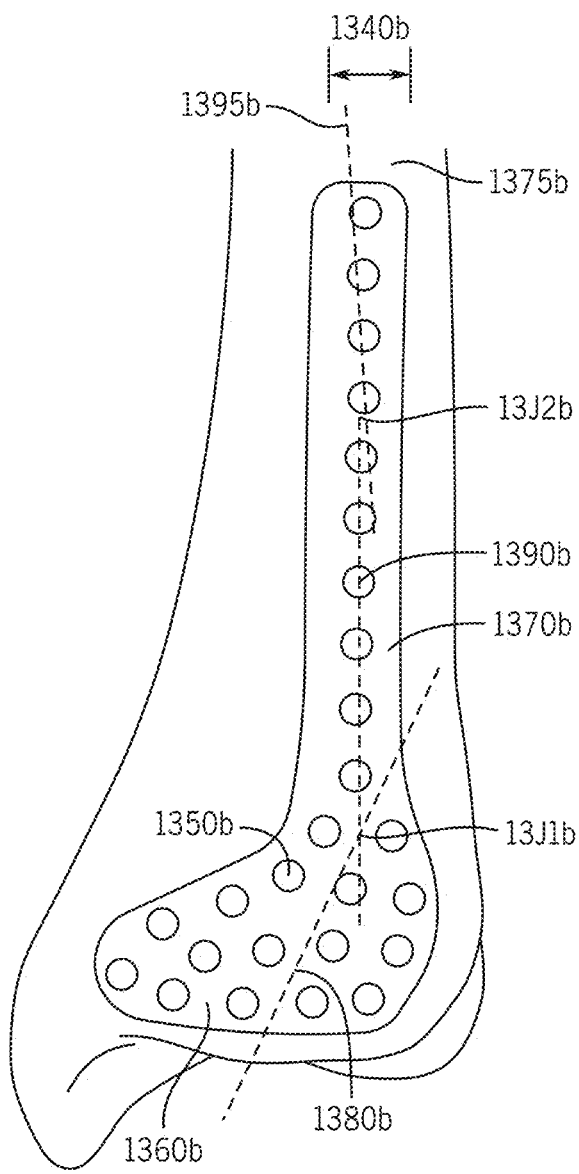
FIG. 12B shows a larger size of the non-limiting example plate of FIG. 12A for use with an anterolateral distal tibia.

Referring to FIG. 12A-B, a distal anterolateral tibia plate is shown in two different sizes. Plate extension portion 1370a and 1370b has a longitudinal axis 1390a and 1390b and distal plate portion 1360a and 1360b includes a longitudinal axis 1380a and 1380b. In one embodiment, axis 1390a and axis 1380a intersect at junction 13J1a, and axis

Figure 12C:
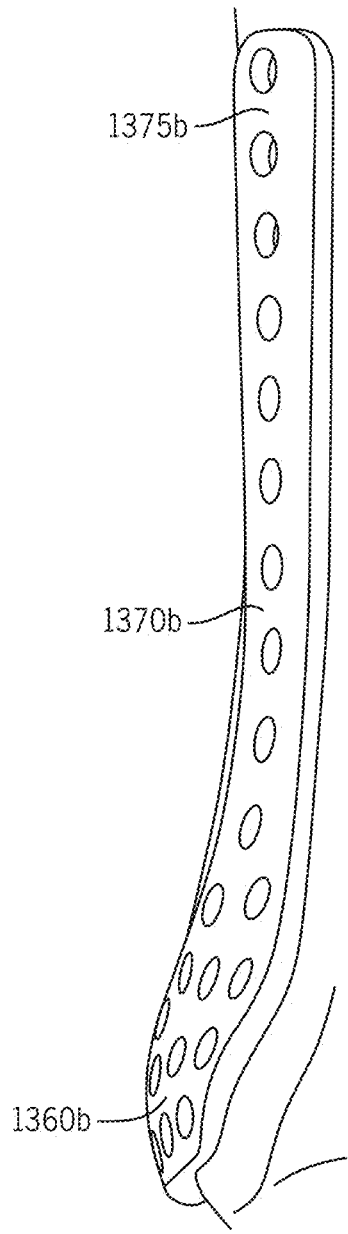
FIG. 12C is a profile view of the non-limiting example plate of FIG. 12B.

1390*b* and axis 1380*b* intersect at junction 13J1*b*. The angle between axis 1390*a* and axis 1380*a*, and the angle between axis 1390*b* and axis 1380*b*, may be determined by angle 382 in FIG. 9B. In some embodiments, a second plate extension portion 1375*a* and 1375*b* may extend further up the bone and include a longitudinal axis 1395*a* and 1395*b*. Axis 1395*a* and axis 1390*a* intersect at junction 13J2*a*, and axis 1395*b* and axis 1390*b* intersect at junction 13J2*b*. In some embodiments, the dimensions of the plate, such as the length and width of 1360*a* and 1360*b*, may be determined from FIG. 9A. The location of junctions 13J1*a* and 13J1*b* may be determined by the range of lengths noted in FIG. 9A, such as being in the range of 17-34 mm, as measured from the most distal aspect of the tibia to the transition from the anterolateral distal tibia to the tibia shaft. The location of the junctions, or any other feature of the plates may be determined based upon optimizing fixation, minimizing soft tissue stripping, and the like. Alternatively, angles, lengths, widths, curvature, and other parameters of the plate may be based upon fitting to the anatomy, where a designer may adjust a parameter in order to accommodate a particular patient's or a population's group anatomy. A designer may also take into account both the parameters provided by the method and also engineering (such as material considerations and edge configurations) or anatomic parameters in a design. Bone fixation may be provided by screws, such as through non-limiting example screw holes like 1350*a* and 1350*b*. Referring to FIG. 12C, the lateral plate from FIGS. 12A and 12B is shown in a profile view.

Referring to FIG. 13A-B, a distal posteromedial tibia plate is shown in two different sizes. Plate extension portion 1470*a* and 1470*b* has a longitudinal axis 1490*a* and 1490*b* and distal plate portion 1460*a* and 1460*b* includes a longitudinal axis 1480*a* and 1480*b*. In one embodiment, axis 1490*a* and axis 1480*a* intersect at junction 14J1*a*, and axis 1490*b* and axis 1480*b* intersect at junction 14J1*b*. The angle between axis 1490*a* and axis 1480*a*, and axis 1490*b* and axis 1480*b*, may be determined by angle 395 in FIG. 9F. In some embodiments, a second plate extension portion 1475*a* and 1475*b* may extend further up the bone and include a longitudinal axis 1495*a* and 1495*b*. Axis 1490*a* and axis 1495*a* intersect at junction 14J2*a*, and axis 1490*b* and axis 1495*b* intersect at junction 14J2*b*. In some embodiments, dimensions of the plate may be determined by FIGS. 9D-9H, such as the length and width of 1460*a* and 1460*b* may be determined by FIG. 9D. The location of junctions 14J1*a*, 14J1*b*, or 14J2*a* and 14J2*b* may be determined by the range of lengths noted in FIG. 9D, such as being in the range of 17-35 mm, as measured from the most distal aspect of the tibia to the transition from the medial distal tibia to the tibia shaft. The location of the junctions, or any other feature of the plates may be determined based upon optimizing fixation, minimizing soft tissue stripping, and the like. Alternatively, angles, lengths, widths, curvature, and other parameters of the plate may be based upon fitting to the anatomy, where a designer may adjust a parameter in order to accommodate a particular patient's or a population's group anatomy. A designer may also take into account both the parameters provided by the method and also engineering (such as material considerations and edge configurations) or anatomic parameters in a design. Bone fixation may be provided by screws, such as through non-limiting example screw holes like 1450*a* and 1450*b*. Referring to FIG. 13C, the plate from FIGS. 13A and 13B is shown in a profile view.

Referring to FIG. 14A-B, a distal femur plate is shown in a sagittal view in two different sizes. Plate extension portion 1570*a* and 1570*b* has a longitudinal axis 1590*a* and 1590*b* and distal plate portion 1560*a* and 1560*b* includes a longitudinal axis 1580*a* and 1580*b*. In one embodiment, axis 1590*a* and axis 1580*a* intersect at junction 15J1*a*, and axis 1590*b* and axis 1580*b* intersect at junction 15J1*b*. The angle between axis 1590*a* and axis 1580*a*, and between axis 1590*b* and axis 1580*b*, may be determined by FIG. 10B or 10C. In some embodiments, a second plate extension portion 1575*a* and 1575*b* may extend further up the femur and include a longitudinal axis 1595*a* and 1595*b*. Axis 1590*a* and axis 1595*a* intersect at junction 15J2*a*, and axis 1590*b* and axis 1595*b* intersect at junction 15J2*b*. In some embodiments, the length and width of 1560*a* and 1560*b* may be determined by FIG. 10A. The location of junctions 15J1*a* and 15J1*b* may be determined by the range of lengths noted in FIG. 10A, such as being in the range of 37-76 mm, as measured from the most distal aspect of the femur to the transition from the distal femur to the femur shaft. The location of the junctions, or any other feature of the plates may be determined based upon optimizing fixation, minimizing soft tissue stripping, and the like. Alternatively, angles, lengths, widths, curvature, and other parameters of the plate may be based upon fitting to the anatomy, where a designer may adjust a parameter in order to accommodate a particular patient's or a population's group anatomy. A designer may also take into account both the parameters provided by the method and also engineering (such as material considerations and edge configurations) or anatomic parameters in a design. Bone fixation may be provided by screws, such as through non-limiting example screw holes like 1550*a* and 1550*b*. Referring to FIG. 14C, the lateral plate from FIGS. 14A and 14B is shown in a profile view.

Referring to FIG. 15A-C, a distal fibula plate is shown in two different sizes. Plate extension portion 1670*a* and 1670*b* has a longitudinal axis 1690*a* and 1690*b* and distal plate portion 1660*a* and 1660*b* includes a longitudinal axis 1680*a* and 1680*b*. In one embodiment, axis 1690*a* and axis 1680*a* intersect at junction 16J1*a*, axis 1690*b* and axis 1680*b* intersect at junction 16J1*b*. The angle between axis 1690*a* and axis 1680*a*, and axis 1690*b* and axis 1680*b*, may be determined by angle 1160 in FIG. 11C. In some embodiments, a second plate extension portion 1675*a* and 1675*b* may extend further up the fibula and include a longitudinal axis 1695*a* and 1695*b*. Axis 1690*a* and axis 1695*a* intersect at junction 16J2*a*, and axis 1690*b* and axis 1695*b* intersect at junction 16J2*b*. In some embodiments, the length and width of 1660*a* and 1660*b* may be determined by FIG. 11A. The location of junctions 16J1*a* and 16J1*b* may be determined by the range of lengths noted in FIG. 11A, such as being in the range of 12-29 mm, as measured from the most distal aspect of the fibula to the transition from the distal fibula to the fibula shaft. The location of the junctions, or any other feature of the plates may be determined based upon optimizing fixation, minimizing soft tissue stripping, and the like. Alternatively, angles, lengths, widths, curvature, and other parameters of the plate may be based upon fitting to the anatomy, where a designer may adjust a parameter in order to accommodate a particular patient's or a population's group anatomy. A designer may also take into account both the parameters provided by the method and also engineering (such as material considerations and edge configurations) or anatomic parameters in a design. Bone fixation may be provided by screws, such as through non-limiting example screw holes like 1650*a* and 1650*b*. Referring to FIG. 15C, the lateral plate from FIGS. 15A and 15B is shown in a profile view.

Intramedullary Nails

Figures 16A, 16B:
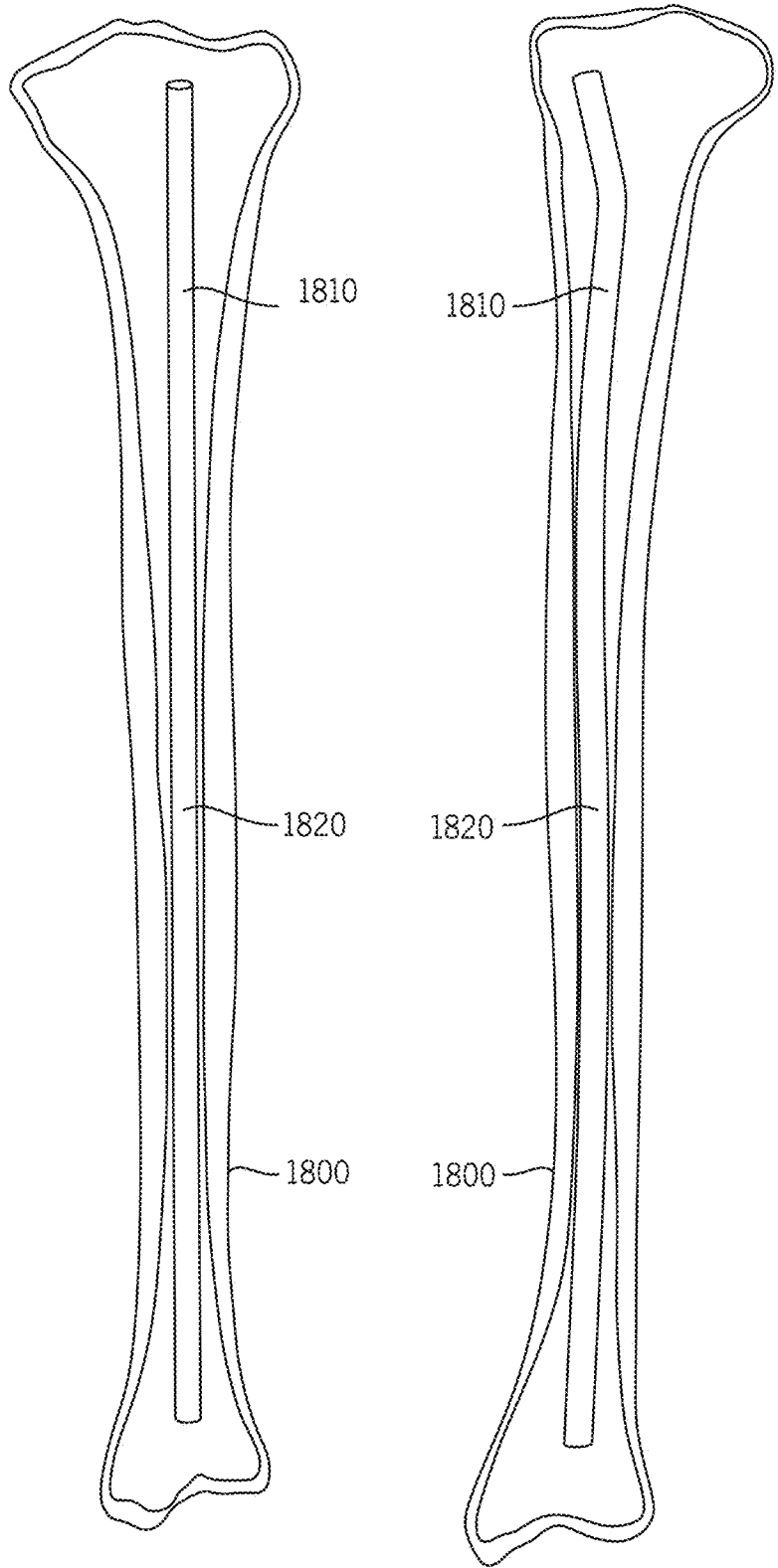
FIG. 16A shows an embodiment of a non-limiting example tibia nail.
FIG. 16B is another view of the non-limiting example tibia nail of FIG. 16A.

Referring to FIGS. 16A, 16B, 17A and 17B, in one embodiment the analysis of the measurements derived from the methodology resulted in developing an idealized shape of an intramedullary (IM) nail. FIGS. 16A and 16B depict two different views of a non-limiting example small size tibia nail. FIGS. 17A and 17B depict two different views of a non-limiting example large size tibia nail. The tibia nail 1810 includes at least one bent portion 1820 in order to conform to the bends in the bone 1800. The methodology of comparing a cancellous centerline and a straight centerline was used in the design, such that the deviation from the straight longitudinal bone axis 254 (FIG. 2B) from the centerline following longitudinal bone axis 254 (FIG. 2C) may be determined in order to indicated where over the length of the bone the area or areas of greatest bending or deflection take place.

Non-Limiting Example Data

Figure 18A:
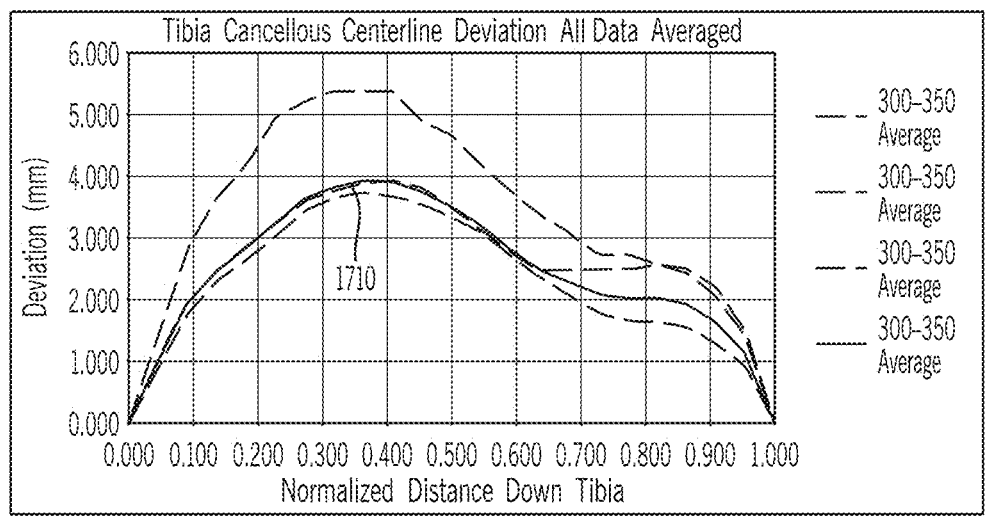
FIG. 18A shows a graphical representation of non-limiting example width measurements acquired for tibia bones.
Figure 18B:
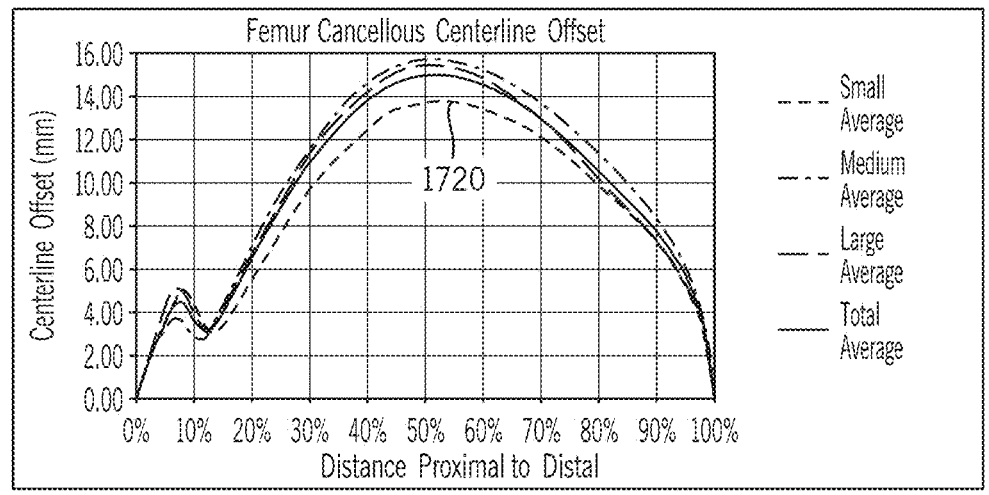
FIG. 18B shows a graphical representation of non-limiting example width measurements acquired for femur bones.
Figure 18C:
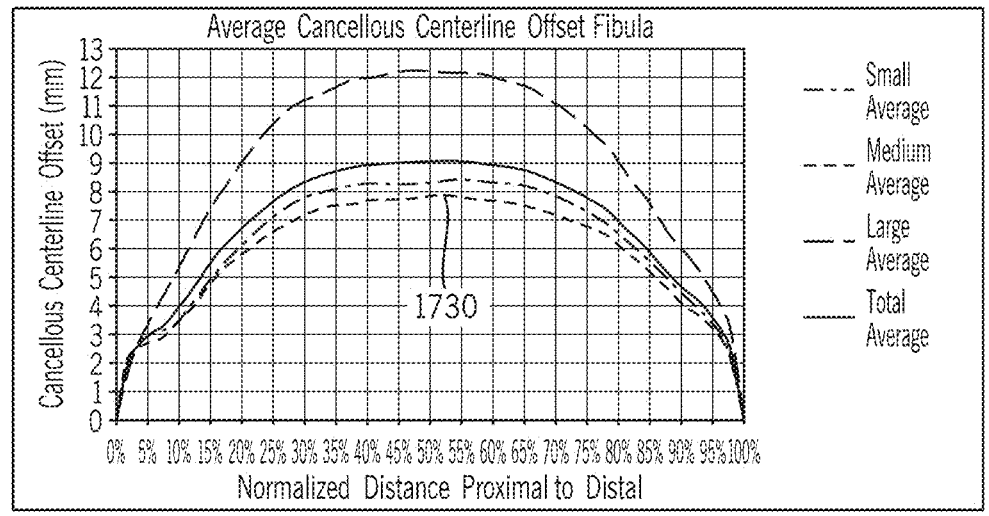
FIG. 18C shows a graphical representation of non-limiting example width measurements acquired for fibula bones.

Referring to FIGS. 18A, 18B, and 18C, non-limiting example graphical representations of the averaged offsets are shown for the tibia dataset in FIG. 18A, the femur dataset in FIG. 18B, and the fibula dataset in FIG. 18C. The location of the maximum deviation of the cancellous bone from the centerline 1710 in FIG. 18A, 1720 in FIG. 18B, and 1730 in FIG. 18C may provide design considerations for a developer to locate a bend in an IM nail at that location. This may be used when designing plates, intramedullary nails, stems, or other implants for bends that may be needed to conform to the anatomy. Determining the specific coordinates of the centerlines allows one to know the offset of the two centerlines in direction and magnitude. A summary of the maximum bend locations for different size patients, small, medium, and large, is shown in Table 8 for the tibia dataset of 50 patients, in Table 9 for the femur dataset of 50 patients, and in Table 10 for the fibula dataset of 50 patients.

TABLE 8

Location of Maximum Cancellous Bone Offset - Tibia

|  | 300-350 Average | 351-400 Average | 401-450 Average | Total Average |
| --- | --- | --- | --- | --- |
| Max Offset [mm] | 3.74 | 3.91 | 5.37 | 3.89 |
| Location [%] | 36.40 | 41.20 | 36.40 | 39.30 |

TABLE 9

Location of Maximum Cancellous Bone Offset - Femur

|  | Location of Bend [%] | Offset at Bend [mm] |
| --- | --- | --- |
| Small | 52 | 13.74 |
| Medium | 54 | 15.69 |
| Large | 50 | 15.43 |
| Total | 52 | 14.98 |

TABLE 10

Location of Maximum Cancellous Bone Offset - Fibula

|  | Location of Max [%] | Max Offset [mm] |
| --- | --- | --- |
| Small | 54 | 8.405 |
| Medium | 52 | 7.865 |
| Large | 48 | 12.237 |
| Total | 52 | 9.066 |

In one embodiment, three different length nails were created to highlight the potential of the methodology to optimize design. The models were created to test the methodology. The methodology may result in an intramedullary nail model that is left and right side specific.

One aspect of placement of an IM nail is related to the ability to maximize contact with the inner bone to maximize stability and place the nail without causing a more distal fracture. These are areas where non-anatomic intramedullary nails most commonly fail. The shape of the intramedullary nail models can be normalized to length of the nail desired by the company or surgeon.

Figure 19A:
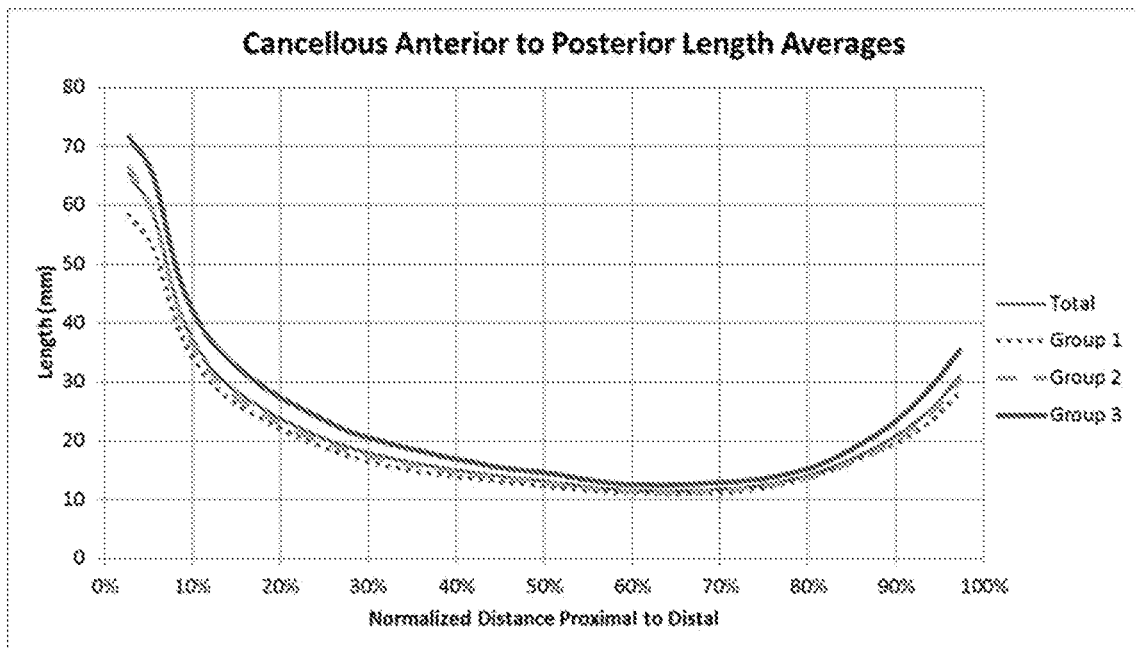
FIG. 19A shows a graphical representation of non-limiting example cancellous bone anterior to posterior measurements acquired for a tibia bone dataset.
Figure 19B:
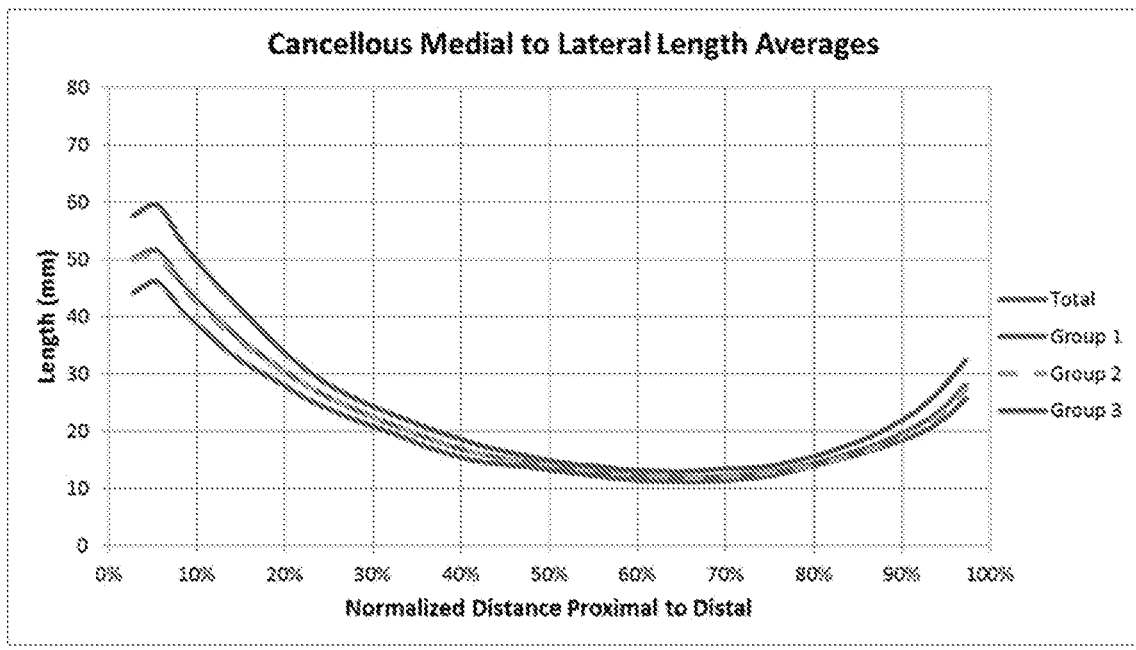
FIG. 19B shows a graphical representation of non-limiting example cancellous bone medial to lateral measurements acquired for a tibia bone dataset
Figure 19C:
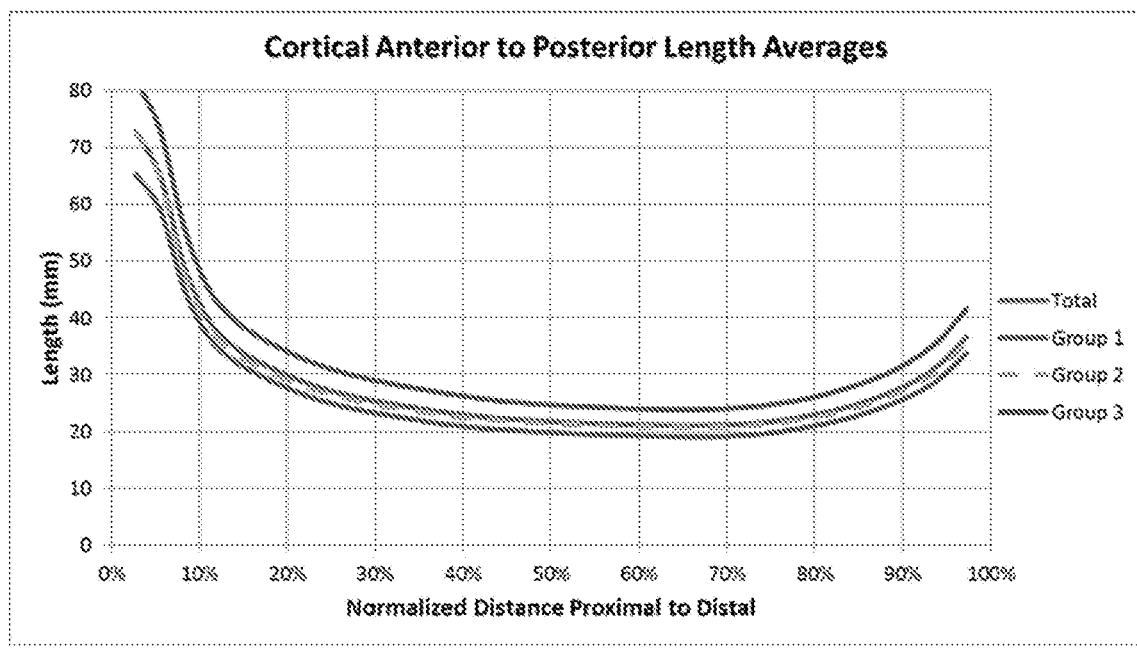
FIG. 19C shows a graphical representation of non-limiting example cortical bone anterior to posterior measurements acquired for a tibia dataset.
Figure 19D:
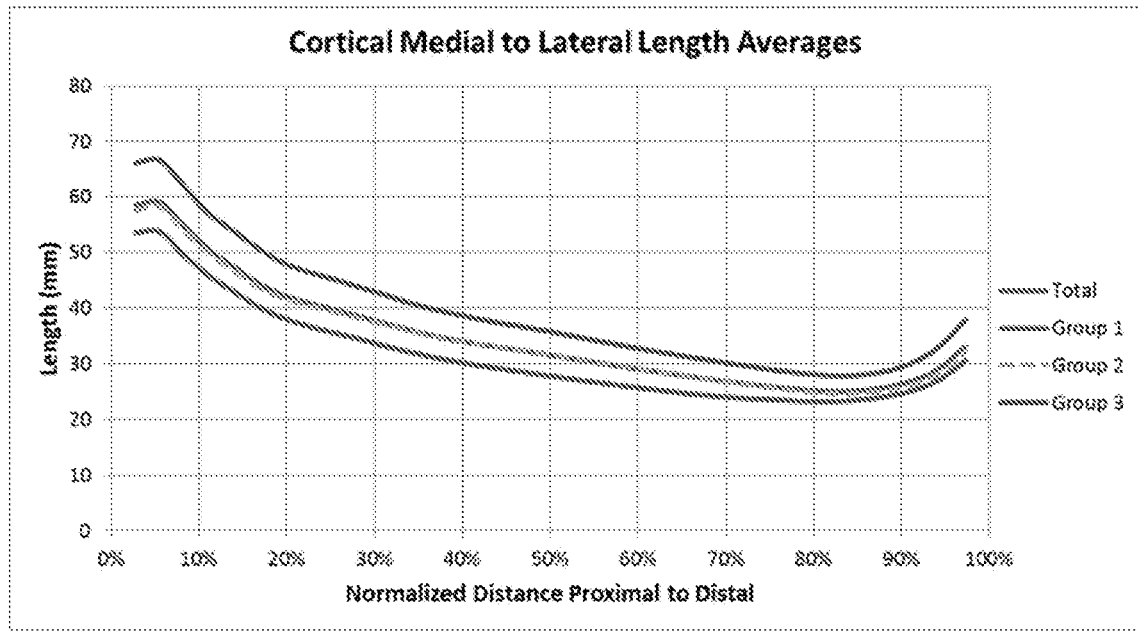
FIG. 19D shows a graphical representation of non-limiting example cortical bone medial to lateral measurements acquired for a tibia dataset.

Referring to FIGS. 19A-19D, graphs of non-limiting example tibia cancellous and cortical bone average lengths in different planes are shown for 3 size groups plotted as length vs. the normalized distance proximal to distal. FIGS. 19A and 19B display cancellous non-limiting example data. FIGS. 19C and 19D display cortical non-limiting example data.

Figure 20A:
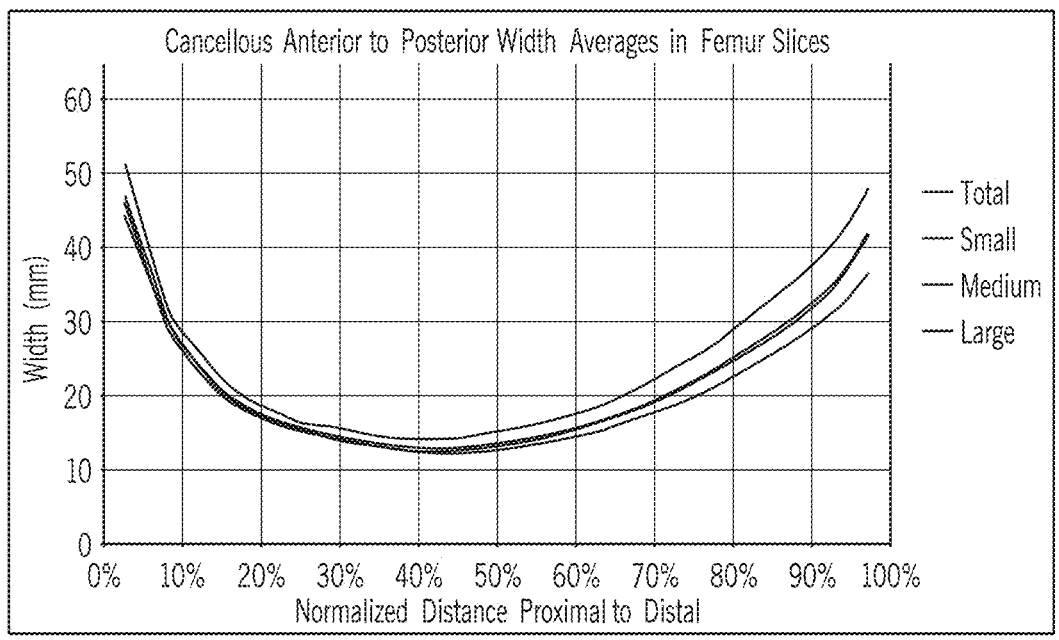
FIG. 20A shows a graphical representation of non-limiting example cancellous bone anterior to posterior measurements acquired for a femur dataset.
Figure 20B:
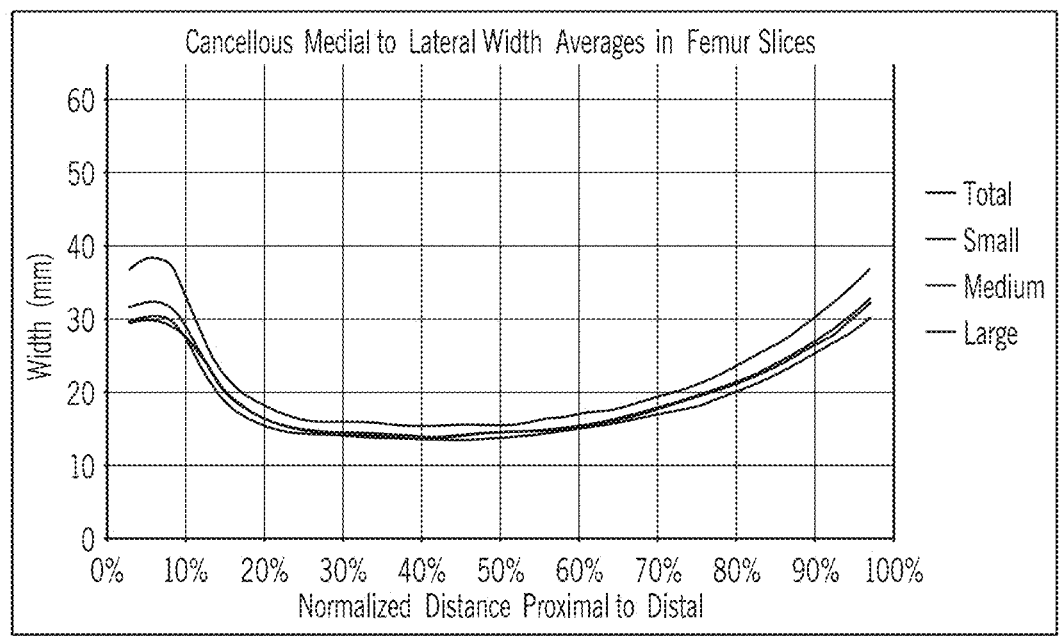
FIG. 20B shows a graphical representation of non-limiting example cancellous bone medial to lateral measurements acquired for a femur dataset.
Figure 20C:
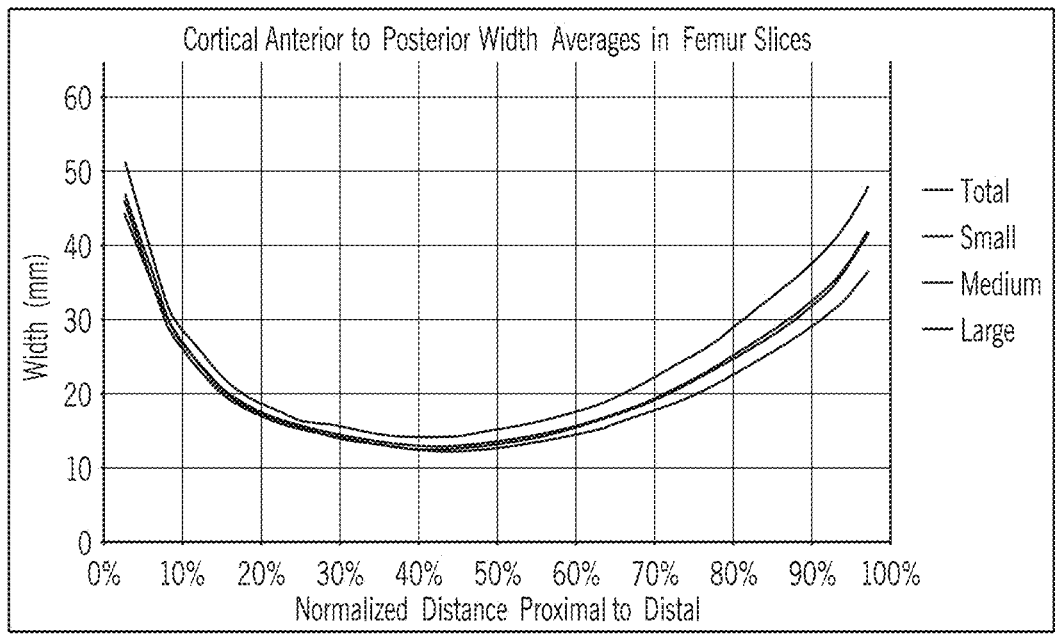
FIG. 20C shows a graphical representation of non-limiting example cortical bone anterior to posterior measurements acquired for a femur dataset.
Figure 20D:
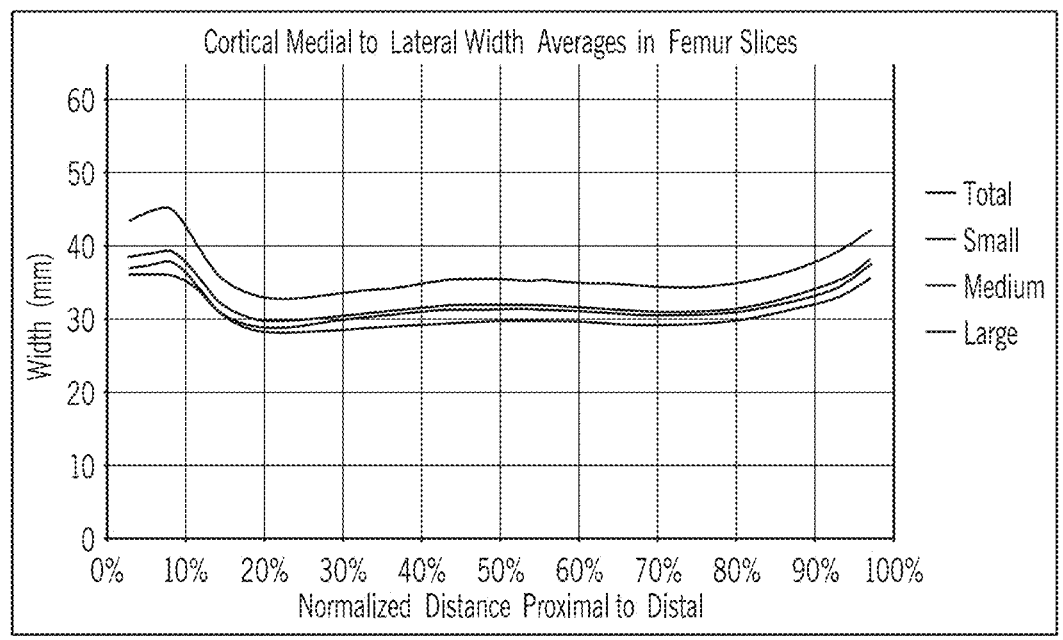
FIG. 20D shows a graphical representation of non-limiting example cortical bone medial to lateral measurements acquired for a femur dataset.

Referring to FIGS. 20A-20D, graphs of non-limiting example femur cancellous and cortical bone average lengths in different planes are shown for 3 size groups plotted as length vs. the normalized distance proximal to distal. FIGS. 20A and 20B display cancellous non-limiting example data. FIGS. 20C and 20D display cortical non-limiting example data.

Figure 21A:
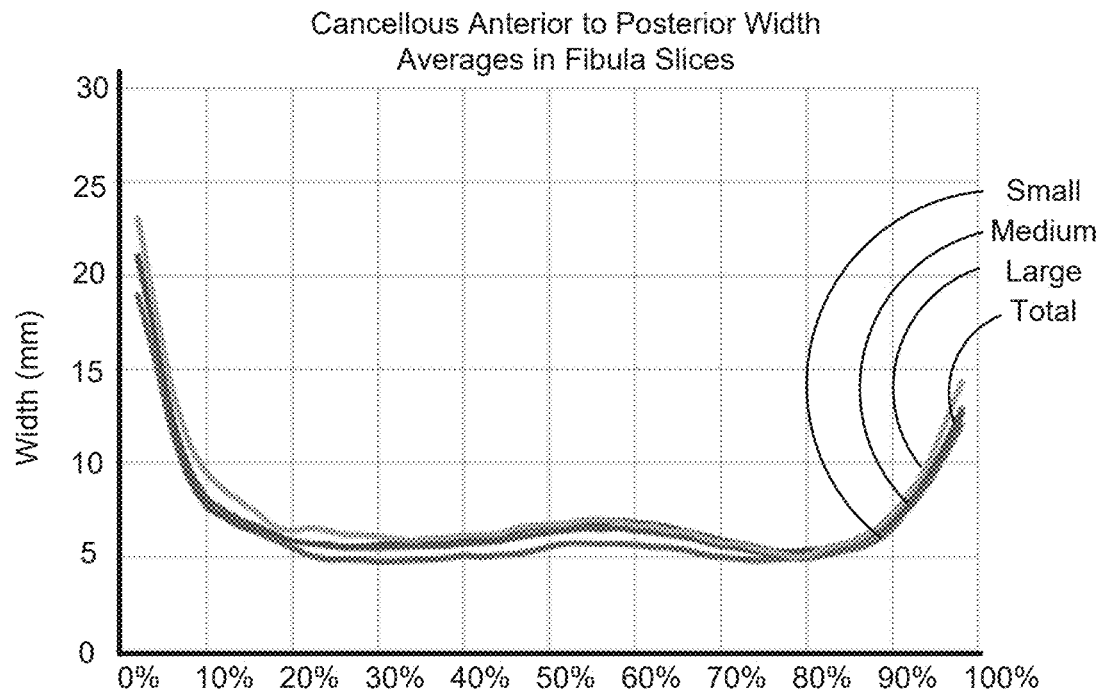
FIG. 21A shows a graphical representation of non-limiting example cancellous bone anterior to posterior measurements acquired for a fibula dataset.
Figure 21B:
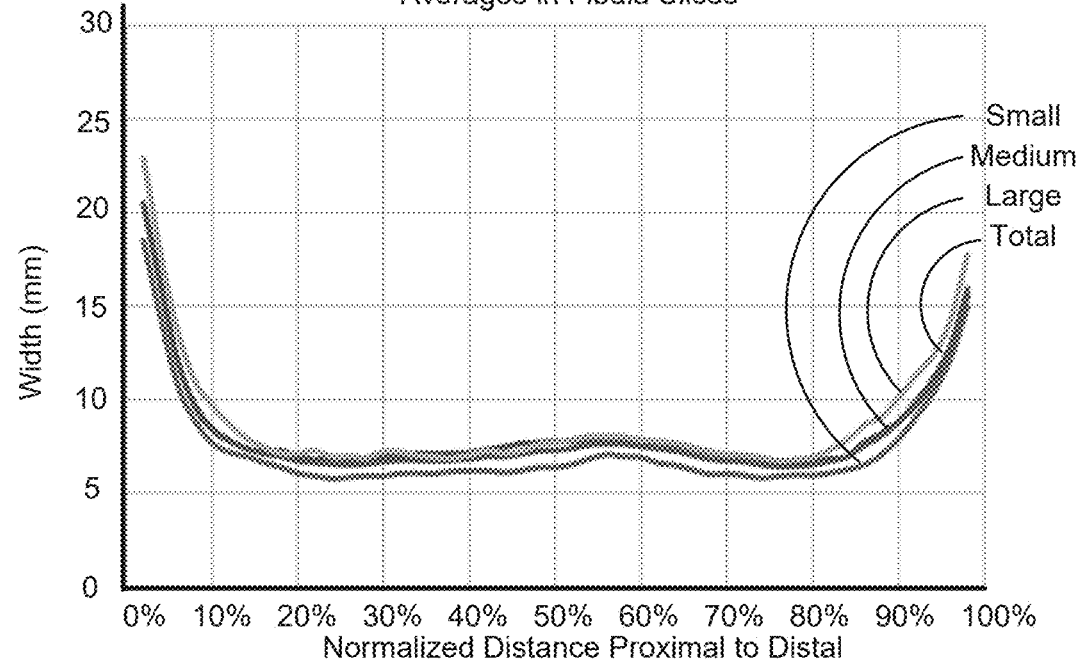
FIG. 21B shows a graphical representation of non-limiting example cancellous bone medial to lateral measurements acquired for a fibula dataset.
Figure 21C:
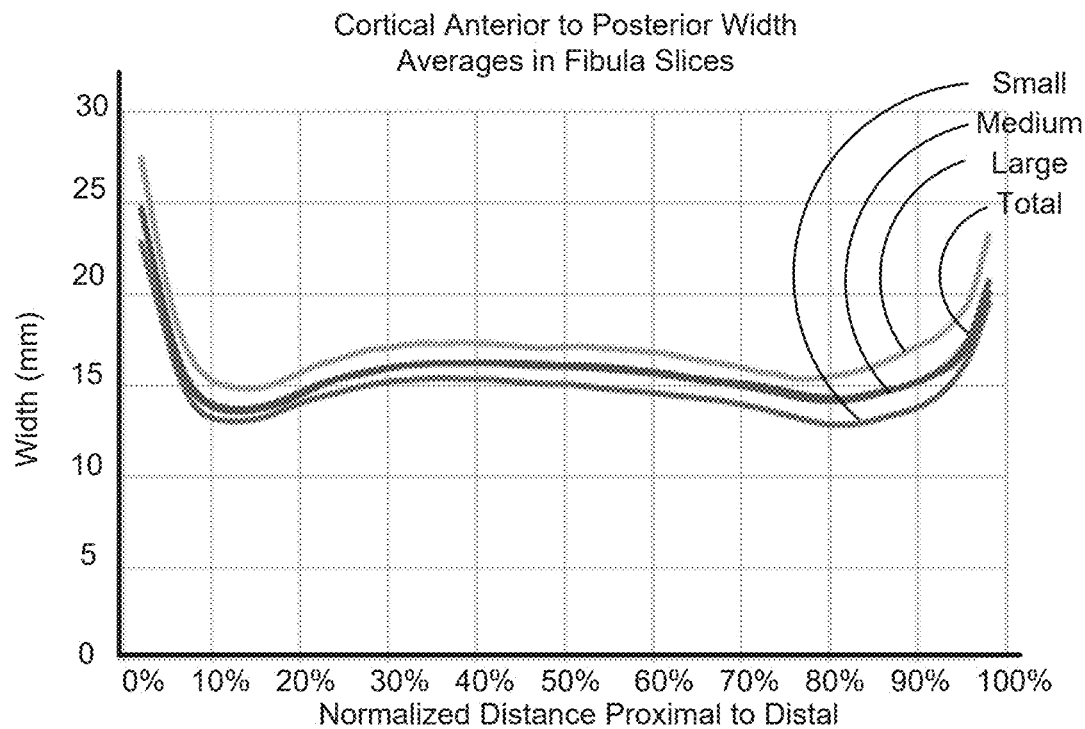
FIG. 21C shows a graphical representation of non-limiting example cortical bone anterior to posterior measurements acquired for a fibula dataset.
Figure 21D:
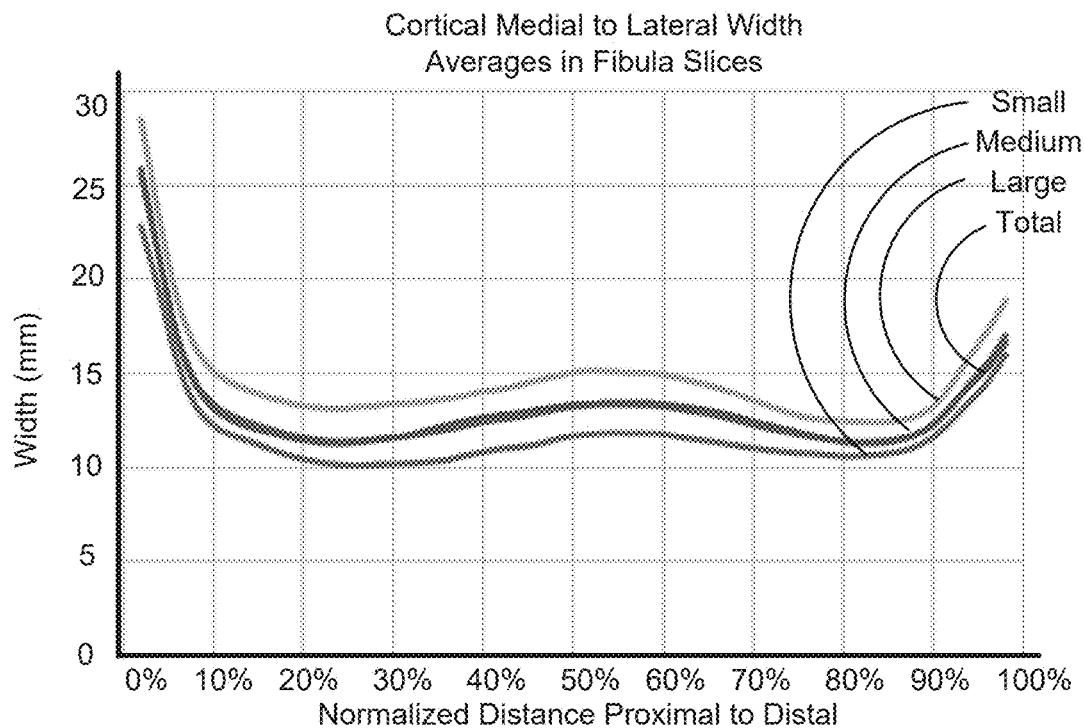
FIG. 21D shows a graphical representation of non-limiting example cortical bone medial to lateral measurements acquired for a fibula dataset.

Referring to FIGS. 21A-21D, graphs of non-limiting example fibula cancellous and cortical bone average lengths in different planes are shown for 3 size groups plotted as length vs. the normalized distance proximal to distal. FIGS. 21A and 21B display cancellous non-limiting example data. FIGS. 21C and 21D display cortical non-limiting example data.

Figure 22A:
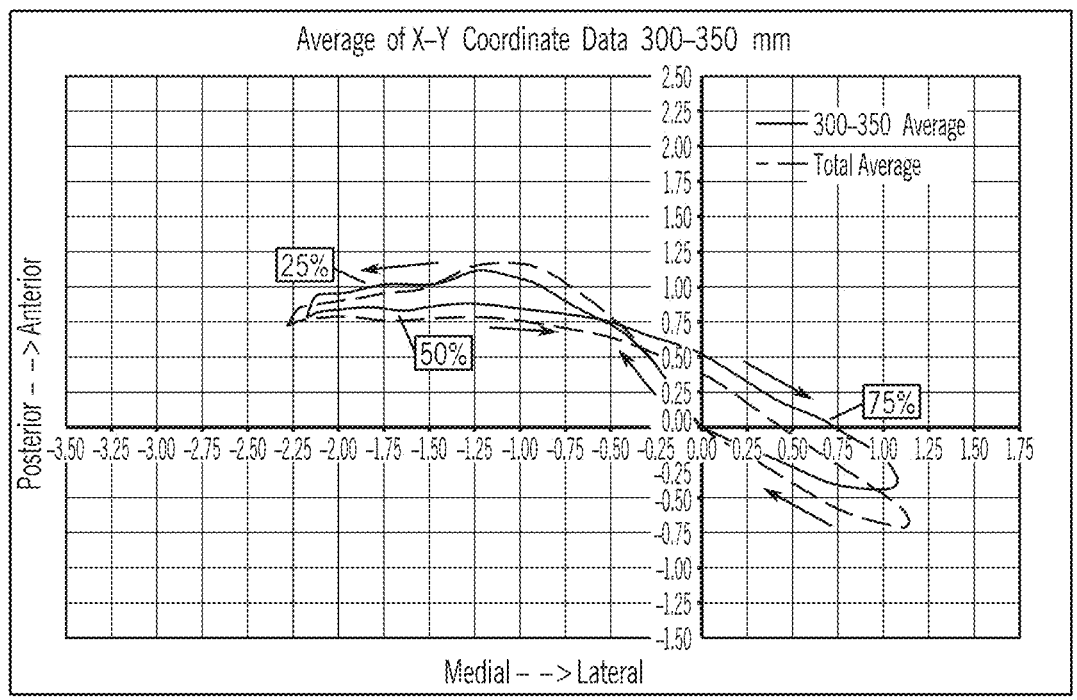
FIG. 22A shows a graphical representation of non-limiting example Tibia cancellous bone coordinate offsets between a cancellous center point and a straight centerline point at the same bone height for a small sized bone group.
Figure 22B:
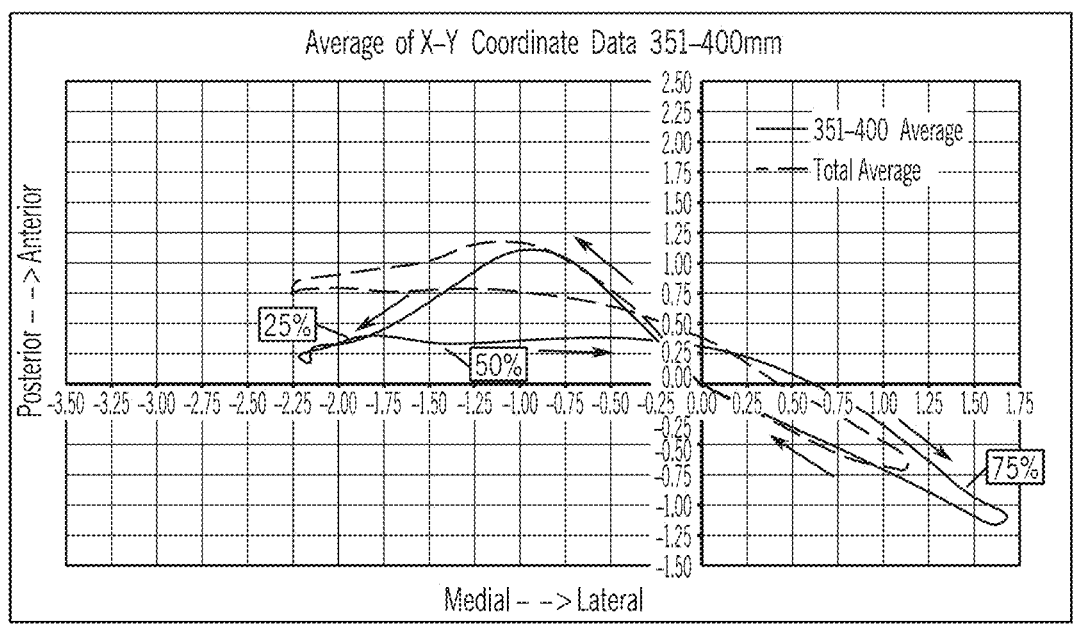
FIG. 22B shows a graphical representation of non-limiting example Tibia cancellous bone coordinate offsets between a cancellous center point and a straight centerline point at the same bone height for a medium sized bone group.
Figure 22C:
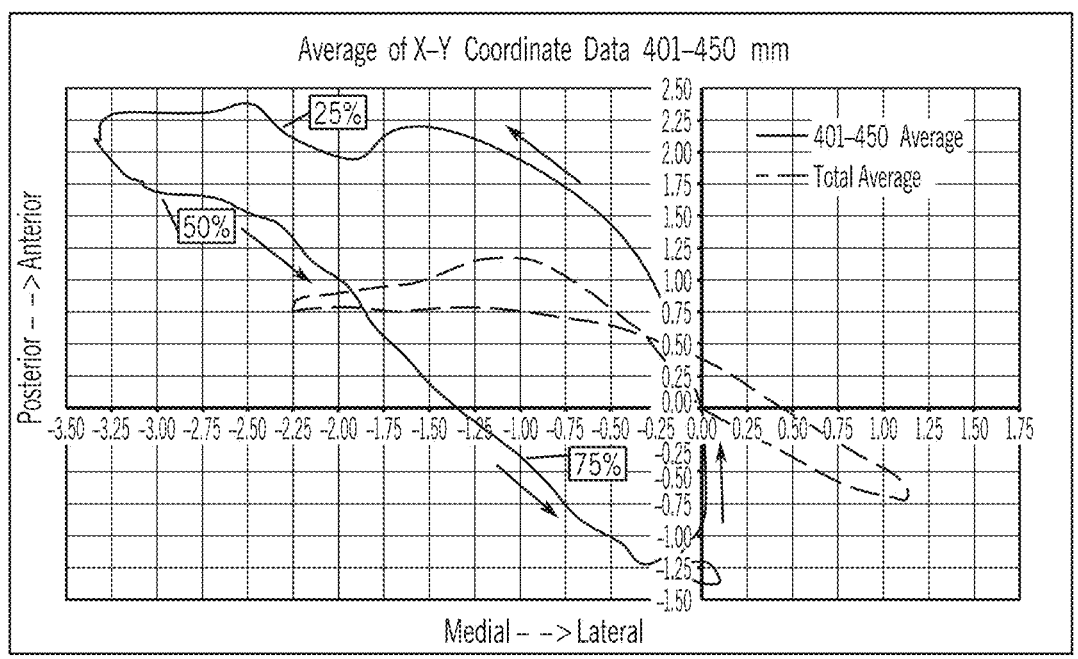
FIG. 22C shows a graphical representation of non-limiting example Tibia cancellous bone coordinate offsets between a cancellous center point and a straight centerline point at the same bone height for a large sized bone group.

Referring to FIGS. 22A, 22B, and 22C, graphs of non-limiting example tibia cancellous bone coordinate offsets between a cancellous center point and a straight centerline point at the same bone height for a small sized bone group, a medium sized bone group, and a large sized bone group are shown in each figure respectively. The distance of the cancellous center point to a point on a straight center line at the same height of the bone may be quantified in terms of the distance in the anterior-posterior and medial-lateral planes. Since the straight center line starts and ends at the first and last slice, the coordinate data may start and end at the origin. Following the arrows on the coordinate graphs shows the offset around the center with the percent location down the tibia labeled. That is, the deviation from the center of a straight bone follows the graph as one moves proximally to distally down the bone, such that the graphs provide a directionality to the deviation in addition to the amount of the deviation at a specified location in the bone. This information may be used to design an orientation to a bend or angle in a plate, IM nail, or other device in addition to the magnitude of the deviation that may be required.

External Bone Anatomy: Proximal Plates and Distal Plates

The methodology has provided specific insight into both the proximal and distal external tibia, femur, and fibula anatomy. The methodology revealed a specific pattern and shape of these bones. The specific lengths, widths, angles, and arcs provide a detailed understanding of the anatomy and can facilitate a truly anatomic plate design. Moreover, the data from this methodology defines a specific range of anatomic sizes to accommodate patients. Rather than forcing the anatomy to adapt to a plate with one width and a non-anatomic shape, the models used to test the methodology confirm an improved fit.

Internal Bone Anatomy: Intramedullary Nail and Long Stem Component

The methodology has also provided unique insight into the complex three dimensional intramedullary anatomy of the tibia, femur, and fibula. One can see that connecting the center of the proximal and distal ends of a bone in a straight line does not follow a path in the center of the medullary bone down the length of the bone. Therefore, this explains the challenges of trying to force a straight intramedullary nail or long stem in a bone canal and the risk of further fracturing. The specific offset from the two centerlines can facilitate the design of a truly anatomic intramedullary design. The data from this methodology defines a specific range of anatomic sizes to accommodate patients.

Quality Control Applications

In one configuration, the statistical correlations that have been disclosed, including ratios and other relationships between measurements, could be used as an internal quality control for establishing a ground truth that segmentation has been done correctly. Laboratories must perform routine quality control tests, usually every day, and in many cases, several times a day. Quality control tests usually include normal and abnormal samples to ensure that the equipment, the technologist, and the reagents used in the test are performing to established standards. The laboratory must get the right result in order to be allowed to continue to test patient samples. If the lab repeatedly fails to get the right result, it is prohibited from continuing the performance of that test until it can demonstrate that it has corrected the problems that led to the unacceptable results.

For automated segmentation routines, the methodology can be used to keep the machine honest. When an automated routine segments a bone from the image, the methodology may establish what length or width the bone should be in that situation, which the automated routine can take into account and adjust its segmentation as needed. In one non-limiting example, an automated segmentation routine may segment based upon the intensity values of pixels or voxels in an image, but the threshold intensity value used to establish which pixels or voxels are identified as bone may be adjusted based upon input from the methodology presented here. In some configurations, adjusting the threshold lower in order to allow more pixels or voxels to qualify as a particular bone or tissue type may be done in order to lengthen or widen a bone in the image by allowing more pixels or voxels at the edge of the bone to qualify as bone material, whereas increasing the threshold value may decrease the length or width of the bone by removing pixels or voxels at the edge of the bone. By increasing or decreasing the number of pixels or voxels that qualify as bone, the length or width of a bone can be matched to a ratio of length to width that the method described above indicates would be appropriate for that anatomy. One skilled in the art will appreciate that instead of lengths and widths, angles, curves, bends, and other bone parameters as discussed above may be used. One skilled in the art will also appreciate that different classification routines may be used instead of intensity thresholds, such as using CT numbers, contrast to noise ratios, signal to noise ratios, texture analyses, and the like. In some configurations, correlations may be used to ensure that the testing and/or sample was appropriate.

Methods are provided according to the present disclosure to improve understanding of tibia, femur, fibula anatomy, and the like to facilitate the design and selection of anatomically correct implants and/or periprosthetic bone plates where understanding the periprosthetic fracture may be taken into account. Use of this method and the data that it provides gives unique insight into the number, size and shape of implants or periprosthetic bone plates for arthroplasty. This method also provides valuable information for the optimal design, shape, and size of implants or periprosthetic bone plates to maximize healing. In the course of new product development, this method is a valuable resource that can be used to radiographically evaluate each new component design to ensure optimal fit prior to component production and product launch. While the disclosure is described herein as a method for the optimization for tibia, femur, and fibula component design, it can be used for other joints (e.g., hip, knee, elbow, foot, ankle, etc. . . . ), such that the same methodology that was developed to understand the external and internal anatomy above can be similarly applied to other bones, including but not limited to the radius, ulna, and vertebral bodies. This methodology would substantially improve the ability to design truly anatomic plates, intramedullary nails, and long stem components for arthroplasty in the appropriate size distribution.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A device for treating a fracture in a bone of a subject, the device comprising:
   a first section having a first longitudinal axis;
   a second section having a second longitudinal axis, the second section defining a distal region of the device; and
   a third section having a third longitudinal axis, the third section defining a proximal region of the device,
   the first section being connected to the second section at a base of the second section, thereby defining a first junction between the first section and the second section;
   the first longitudinal axis and the second longitudinal axis forming an oblique angle at the first junction; and
   wherein the second section has a terminal end section having a width greater than the first section;
   wherein the first section and the second section are configured to provide fixation to a region of the bone and providing a plurality of screw holes,
   wherein the first section is connected to the third section thereby defining a second junction between the first section and the third section;
   wherein the first longitudinal axis and the third longitudinal axis form an oblique angle at the second junction, and
   wherein the oblique angle at the first junction is in a range of 122.55° to 179.62°, and
   wherein the device is monolithic.

2. The device of claim 1, wherein the bone is at least one of the tibia, femur, or fibula, and the terminal end of the second section is adapted to conform to an outer surface of a proximal end section of the at least one of tibia, femur, or fibula.

3. The device of claim 2, wherein the bone is the tibia, and a perimeter of the terminal end of the second section is dimensioned to conform to a tibial plateau of the proximal end section of the tibia.

4. The device of claim 2, wherein the oblique angle formed at the first junction is configured to match an angle of a tibial plateau from a centerline of the tibia.

5. The device of claim 2, wherein a length of the device is determined by a length of the at least one of tibia, femur, or fibula.

6. The device of claim 2, wherein the bone is the tibia and wherein the first junction is located at greater than 20 mm and less than 52 mm from a tibial plateau.

7. The device of claim 6, wherein the first junction is located at 35 mm from the tibial plateau.

8. The device of claim 2, wherein the bone is the tibia and wherein the first junction is located at greater than 21 mm and less than 40 mm from a tibial plateau.

9. The device of claim 8, wherein the first junction is located at 30 mm from the tibial plateau.

10. The device of claim 1, wherein a width of the first section is configured to provide fixation for a fracture in the bone.

11. The device of claim 1, further comprising a plurality of screw holes and wherein a number of the screw holes is correlated to the width of the terminal end of the second section.

12. The device of claim 1, wherein the device is configured to be specific for a left side and a right side of the subject.

13. The device of claim 1, wherein the bone is at least one of the tibia, femur, or fibula and the second end section is adapted to conform to an outer surface of a distal end section of the at least one of tibia, femur, or fibula.

14. The device of claim 13, wherein a perimeter of the terminal end of the second section is dimensioned to conform to at least one of a condyle, a medial malleolus, an anterolateral surface, or a lateral malleolus of the distal end section of the at least one of the tibia, femur, or fibula.

15. The device of claim 13, wherein the oblique angle formed at the first junction is configured to match an angle of at least one of a condyle, a medial malleolus, an anterolateral surface or a lateral malleolus from a centerline of the at least one of tibia, femur, or fibula.

16. The device of claim 13, wherein the oblique angle formed at the second junction is configured to match an angle of at least one of a condyle, a medial malleolus, an anterolateral surface or a lateral malleolus from a centerline of the at least one of tibia, femur, or fibula.

17. The device of claim 13, wherein a length of the device is determined by a length of the at least one of tibia, femur, or fibula.

18. The device of claim 13, wherein a length of the third section is configured to provide fixation for a fracture in the at least one of tibia, femur, or fibula.

19. The device of claim 13, wherein the bone is the tibia and wherein the first junction is located at greater than 17 mm and less than 34 mm from a most distal end of the tibia.

20. The device of claim 19, wherein the junction is located at 25 mm from the most distal end of the tibia.

21. The device of claim 13, wherein the bone is the tibia and wherein the first junction is located at greater than 17 mm and less than 35 mm from a most distal end of the tibia.

22. The device of claim 21, wherein the junction is located at 26 mm from the most distal end of the tibia.

23. The device of claim 13, wherein the bone is the femur and wherein the first junction is located at greater than 37 mm and less than 76 mm from a most distal end of the femur.

24. The device of claim 23, wherein the junction is located at 55 mm from the most distal end of the femur.

25. The device of claim 13, wherein the bone is the fibula and wherein the first junction is located at greater than 12 mm and less than 29 mm from a most distal end of the fibula.

26. The device of claim 25, wherein the first junction is located at 20 mm from the most distal end of the fibula.

27. A device for treating a fracture in a bone, the device comprising:
a first section having a first longitudinal axis;
a second section having a second longitudinal axis, the second section defining a distal region of the device; and
a third section having a third longitudinal axis, the third section defining a proximal region of the device;
the first section being connected to the second section at a base of the second section thereby defining a first junction between the first section and the second section;
the first junction defined by a transition portion that is curved and connects the first section to the second section,
the second section being connected to the third section at a second junction between the second section and the third section;
the second junction defined by a transition portion that is curved and connects the second section to the third section,
wherein the first longitudinal axis and the second longitudinal axis form an angle in a range of 122.55° to 179.62°, and
wherein the device is monolithic.

28. The device of claim 27, wherein the location of the first junction is determined by a location of greatest deviation from a straight centerline of the bone.

29. The device of claim 27, wherein the first section has a length that is greater than a length of the second section.

30. The device of claim 27, wherein the bone is at least one of a tibia, femur, or fibula.

31. The device of claim 27, wherein the location of the second junction is determined by a location of deviation from a straight centerline of the bone.

32. The device of claim 27, wherein the second section has a length that is greater than a length of the third section and the first section.

* * * * *